(12) United States Patent
Liu et al.

(10) Patent No.: US 11,895,634 B2
(45) Date of Patent: Feb. 6, 2024

(54) CONTROL RESOURCE SET (CORESET) CONFIGURATION FOR NARROWBAND NEW RADIO (NR)

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/248,555

(22) Filed: Jan. 28, 2021

(65) Prior Publication Data

US 2022/0240249 A1   Jul. 28, 2022

(51) Int. Cl.
- *H04W 72/0453* (2023.01)
- *H04W 24/08* (2009.01)
- *H04W 52/32* (2009.01)
- *H04L 5/00* (2006.01)
- *H04W 56/00* (2009.01)
- *H04W 72/23* (2023.01)

(52) U.S. Cl.
CPC ....... *H04W 72/0453* (2013.01); *H04L 5/0092* (2013.01); *H04L 5/0094* (2013.01); *H04W 24/08* (2013.01); *H04W 52/325* (2013.01); *H04W 56/001* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0037323 A1* | 1/2020 | Song | H04L 5/0091 |
| 2020/0112484 A1* | 4/2020 | Sun | H04L 5/003 |
| 2021/0410086 A1* | 12/2021 | Davydov | H04L 27/26 |
| 2022/0039158 A1* | 2/2022 | Awadin | H04W 72/23 |
| 2022/0078728 A1* | 3/2022 | Yi | H04W 48/16 |
| 2022/0225372 A1* | 7/2022 | Kim | H04L 1/0072 |

* cited by examiner

*Primary Examiner* — Srinivasa R Reddivalam
(74) *Attorney, Agent, or Firm* — QUALCOMM Incorporated

(57) ABSTRACT

Wireless communications systems and methods related to control resource set (CORESET) configuration for narrowband new radio (NR) are provided. A user equipment (UE) performs physical downlink control channel (PDCCH) monitoring in a first portion of a CORESET. The first portion is within a channel bandwidth, and the CORESET includes a second portion outside the channel bandwidth. The UE receives a system information block (SIB) based on the PDCCH monitoring.

30 Claims, 27 Drawing Sheets

CONTROL RESOURCE SET (CORESET) CONFIGURATION FOR NARROWBAND NEW RADIO (NR)

TECHNICAL FIELD

This application relates to wireless communication systems, and more particularly to control resource set (CORESET) configuration for narrowband new radio (NR).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR has enabled and/or expanded wireless network deployment uses cases and scenarios. In some use cases or scenarios, such as railway communication systems and/or utility grid private networks, communications may be over a narrow frequency band, for example, with a bandwidth that is less than 5 megahertz (MHz). Accordingly, communication improvements for narrowband NR may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE), the method including performing physical downlink control channel (PDCCH) monitoring in a first portion of a control resource set (CORESET), where the first portion is within a channel bandwidth, and where the CORESET includes a second portion outside the channel bandwidth; and receiving a system information block (SIB) based on the PDCCH monitoring.

In an additional aspect of the disclosure, a method of wireless communication performed by a base station (BS), the method including determining, based on a channel bandwidth, a first portion of a control resource set (CORESET), where the first portion is within a channel bandwidth, and where the CORESET includes a second portion outside the channel bandwidth; transmitting system information block (SIB) scheduling information in the first portion of the CORESET; and transmitting a SIB based on the SIB scheduling information.

In an additional aspect of the disclosure, a user equipment (UE) includes a processor configured to perform physical downlink control channel (PDCCH) monitoring in a first portion of a control resource set (CORESET), where the first portion is within a channel bandwidth, and where the CORESET includes a second portion outside the channel bandwidth; and a transceiver coupled to the processor, where the transceiver is configured to receive a system information block (SIB) based on the PDCCH monitoring.

In an additional aspect of the disclosure, a base station (BS) includes a processor configured to determine, based on a channel bandwidth, a first portion of a control resource set (CORESET), where the first portion is within a channel bandwidth, and where the CORESET includes a second portion outside the channel bandwidth; and a transceiver coupled to the processor, where the transceiver is configured to transmit system information block (SIB) scheduling information in the first portion of the CORESET; and transmit a SIB based on the SIB scheduling information.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
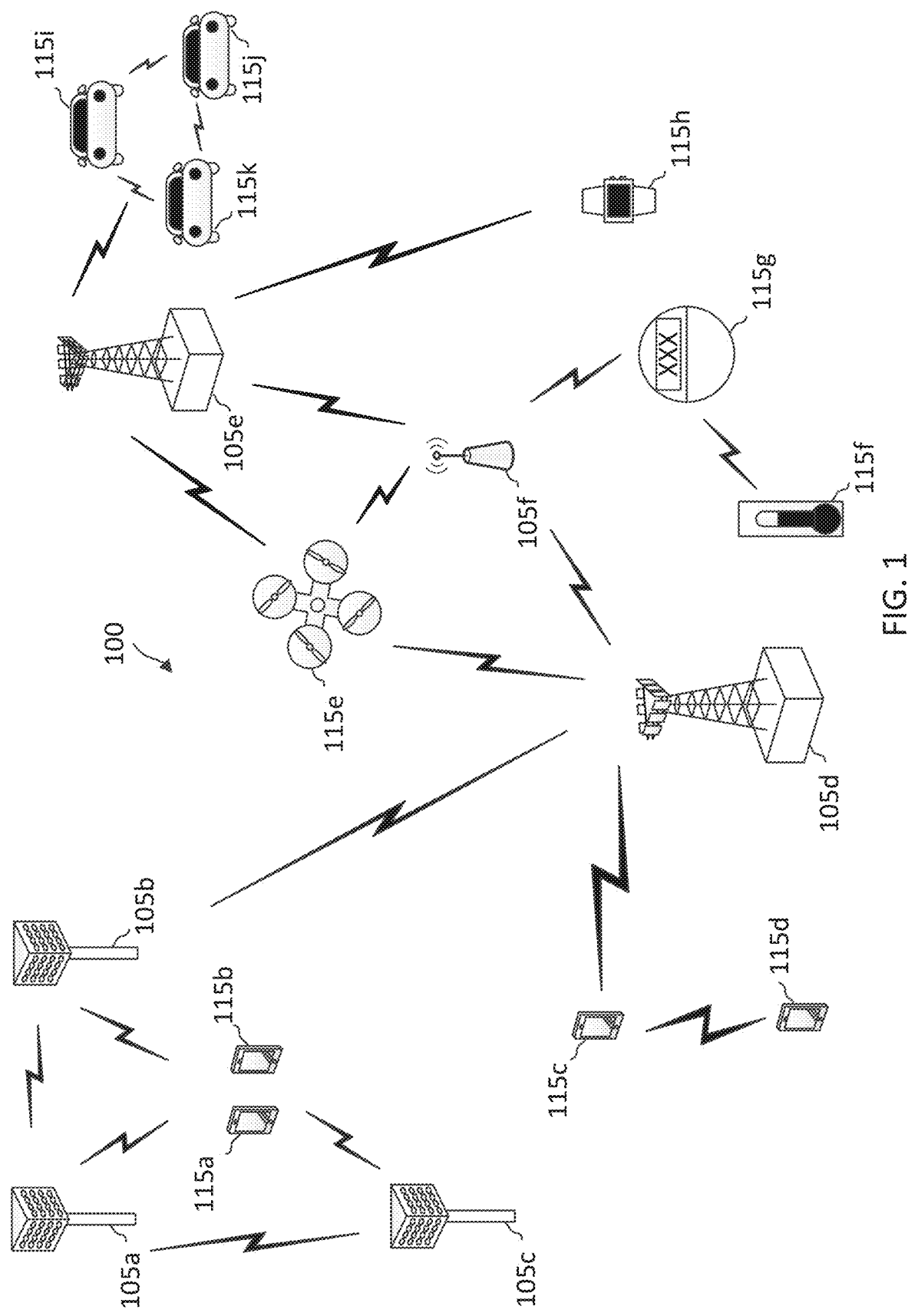
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Narrowband NR refers to the deployment of NR over a narrow frequency band, for example, with a bandwidth that is less than 5 MHz. One example NR narrowband use case may be railway communication systems. For instance, global system for mobile communications-railway (GSM-R) currently supports more than 100,000 km of railway tracks in Europe. There are plans to migrate the GSM-R to future railway mobile communication system (FRMCS), which may utilize NR or sixth generation (6G) technologies. The GSM-R currently utilizes two 5.6 MHz bands (2×5.6 MHz FDD bands) in the GSM 900 MHz spectrum. The 2×5.6 MHz FDD bands can be re-farmed (re-allocated) for FRMCS use. For instance, 2×3.6 MHz FDD bands within the current 2×5.6 MHz FDD bands may be used for FMRCS. Another example NR narrowband use case may be communications in infrastructure industries, such as utility grid private networks. Federal communications commission (FCC) has approved use of two 3 MHz FDD bands within the 900 MHz spectrum for infrastructure industries.

In a wireless communication network, a BS may transmit various system information to facilitate initial network access by UEs. For instance, the BS may periodically transmit synchronization signal blocks (SSB) including various synchronization signals and system information associated with the network. The SSB may also provide information associated with a control resource set (CORESET) where the BS may transmit scheduling information for additional system information, which may be referred to as remaining minimum system information (RMSI) and/or other system information (OSI) in 5G. Accordingly, the BS may transmit the scheduling information in the indicated CORESET and transmit the additional system information (e.g., in the form of system information blocks (SIBs)) according to the scheduling information.

In certain aspects, the minimum bandwidth for an NR SSB is 3.6 MHz, which may include about twenty resource blocks (RBs) at a subcarrier spacing (SCS) of 15 kHz, and the minimum bandwidth for an NR CORESET is 4.32 MHz, which may include about twenty-four RBs at an SCS of 15 kHz. The NR SSB and CORESET are not designed for narrowband deployments. For instance, for a channel bandwidth of 3.6 MHz, the NR SSB may fit within the channel bandwidth, but the NR CORESET may not fit within the channel bandwidth. For a narrower channel bandwidth, such as 3 MHz, both the NR SSB and the NR CORESET may not fit within the channel bandwidth.

The present disclosure describes mechanisms for configuring SSB and/or CORESET for narrowband communication. For example, a BS may transmit an SSB over a channel (a radio frequency band) to facilitate initial network access. The SSB may include a PSS, an SSS, and/or a MIB. The SSB may indicate a CORESET where the BS may transmit physical downlink control channel (PDCCH) downlink control information (DCI) carrying SIB scheduling information. The channel may have a channel bandwidth (a frequency bandwidth) that is narrower than the CORESET bandwidth (a frequency bandwidth). For instance, the CORESET may have a frequency bandwidth of about 4.32 MHz (with 24 RBs at an SCS of 15 kHz), and the channel bandwidth may be about 3 MHz or 3.6 MHz. In an aspect, the BS may determine a first portion of the CORESET that is within the channel bandwidth. Since the CORESET bandwidth is wider than the channel bandwidth, the CORESET includes a second portion outside the channel bandwidth. The BS may transmit SIB scheduling information in the first portion of the CORESET, and transmit a SIB in accordance with the SIB scheduling information. The SIB scheduling information may include a resource allocation for transmitting the SIB. Accordingly, a UE may receive the SSB and may perform PDCCH monitoring in the first portion of the CORESET. The UE may detect the SIB scheduling information and receive the SIB in accordance with the SIB scheduling information.

In some aspects, the CORESET includes a plurality of control resource elements (CCEs), and the first portion of the CORESET includes a subset of the plurality of CCEs less than all CCEs of the plurality of CCEs. A CCE may include six resource element groups (REGs), which each REG may correspond to one resource block in one symbol. As part of determining the first portion, the BS may select the subset of the plurality of CCEs from the first portion of the CORE-SET. The BS may place the CORESET relative to the SSB in frequency. In some aspects, the SSB may fit within the channel bandwidth. For instance, the channel bandwidth may be 3.6 MHz, and the SSB may include 20 RBs at an SCS of 15 kHz (corresponding to 3.6 MHz). In one aspect, the BS may align a lowest-frequency RB of the CORESET to a lowest-frequency RB of the SSB. In other words, there is a zero RB offset between the SSB and the CORESET at the low-frequency edge of the SSB and the CORESET. For instance, the SSB may indicate a starting RB offset of 0 for the CORESET relative to the SSB. Additionally, since the SSB fits within the channel bandwidth, the lowest-frequency RB of the CORESET and the lowest-frequency RB of the SSB are aligned to a low-frequency edge of the channel bandwidth. In such a configuration, the first portion of the CORESET (within the channel bandwidth) is at a lower frequency than the second portion of the CORESET (outside the channel bandwidth). In another aspect, the BS may align a highest-frequency RB of the CORESET to a highest-frequency RB of the SSB. Since the CORESET includes 24 RBs and the SSB includes 20 RBs, there is a 4 RB offset between the SSB and the CORESET at the low-frequency edge of the SSB and the CORESET. For instance, the SSB may indicate a starting RB offset of 4 for the CORESET relative to the SSB. In such a configuration, the first portion of the CORESET (within the channel bandwidth) is at a higher frequency than the second portion of the CORESET (outside the channel bandwidth). In yet another aspect, the BS may align the SSB to a central frequency portion of the CORESET. For instance, the BS may place the CORESET such that a lowest-frequency RB of the CORESET is offset from a lowest-frequency RB of the SSB by two RBs. For instance, the SSB may indicate a starting RB offset of 2 for the CORESET relative to the SSB. In such a configuration, the first portion of the CORESET is between a first sub-portion and a second sub-portion of the second portion of the CORESET in frequency. As part of transmitting the SIB scheduling information, the BS may transmit the SIB scheduling information using a PDCCH candidate in one or more CCEs in the subset of the plurality of CCEs based on a CCE aggregation level of 1, 2, 4, or 8. The BS may use a PDCCH candidate that is fully within the first portion of the CORESET (within the channel bandwidth).

In some aspects, as part of PDCCH monitoring, the UE may identify the subset of the plurality of CCEs in the first portion, and may decode a PDCCH candidate from one or more CCEs in the subset of the plurality of CCEs. The UE may perform blind decoding to decode the PDCCH candidate based on a CCE aggregation level of 1, 2, 4, or 8. The UE may decode a PDCCH candidate that is fully within the first portion of the CORESET (within the channel bandwidth).

In some aspects, the channel bandwidth may be narrower than the SSB bandwidth. For instance, the channel bandwidth may be 3 MHz, and the SSB may include 20 RBs at an SCS of 15 kHz (corresponding to a bandwidth of 3.6 MHz). Accordingly, the BS may transmit the SSB by puncturing a portion of the SSB. In one aspects, the BS may align a lowest-frequency RB of the SSB to a lowest-frequency RB in the channel bandwidth, and puncture a higher-frequency portion of the SSB that is outside the channel bandwidth. In another aspect, the BS may align a highest-frequency RB of the SSB to a highest-frequency RB in the channel bandwidth, and puncture a lower-frequency portion of the SSB that is outside the channel bandwidth.

Aspects of the present disclosure can provide several benefits. For example, the puncturing of a portion of the CORESET outside the channel bandwidth allows the BS to reuse a current CCE mapping for the CORESET instead of designing a new CCE mapping to accommodate a narrower bandwidth. The use of a new CCE mapping can cause compatibility issues and may require hardware and/or software update at the UEs and/or the BS. While the BS may utilize various frequency placements for the CORESET (e.g., aligning a low-frequency edge of the CORESET to a low-frequency edge of the channel bandwidth, aligning a high-frequency edge of the CORESET to a high-frequency edge of the channel bandwidth, or placing the CORESET such that a central frequency portion of the CORESET is within the channel bandwidth), the placement where the low-frequency edge of the CORESET aligned to the low-frequency edge of the channel bandwidth may provide the greatest flexibility (e.g., with a greatest number of PDCCH candidates fully within the channel bandwidth among the different placements) and/or the best coverage (e.g., with a greatest number of PDCCH candidates at a CCE aggregation level of 8 among the different placements). While the present disclosure is discussed using example SSB bandwidth of 3.6 MHz, CORESET bandwidth of 4.32 MHz, and channel bandwidth of 3 MHz or 3.6 MHz, the present disclosure may be applied to other channel bandwidths that is narrower than the SSB bandwidth and/or CORESET bandwidths.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
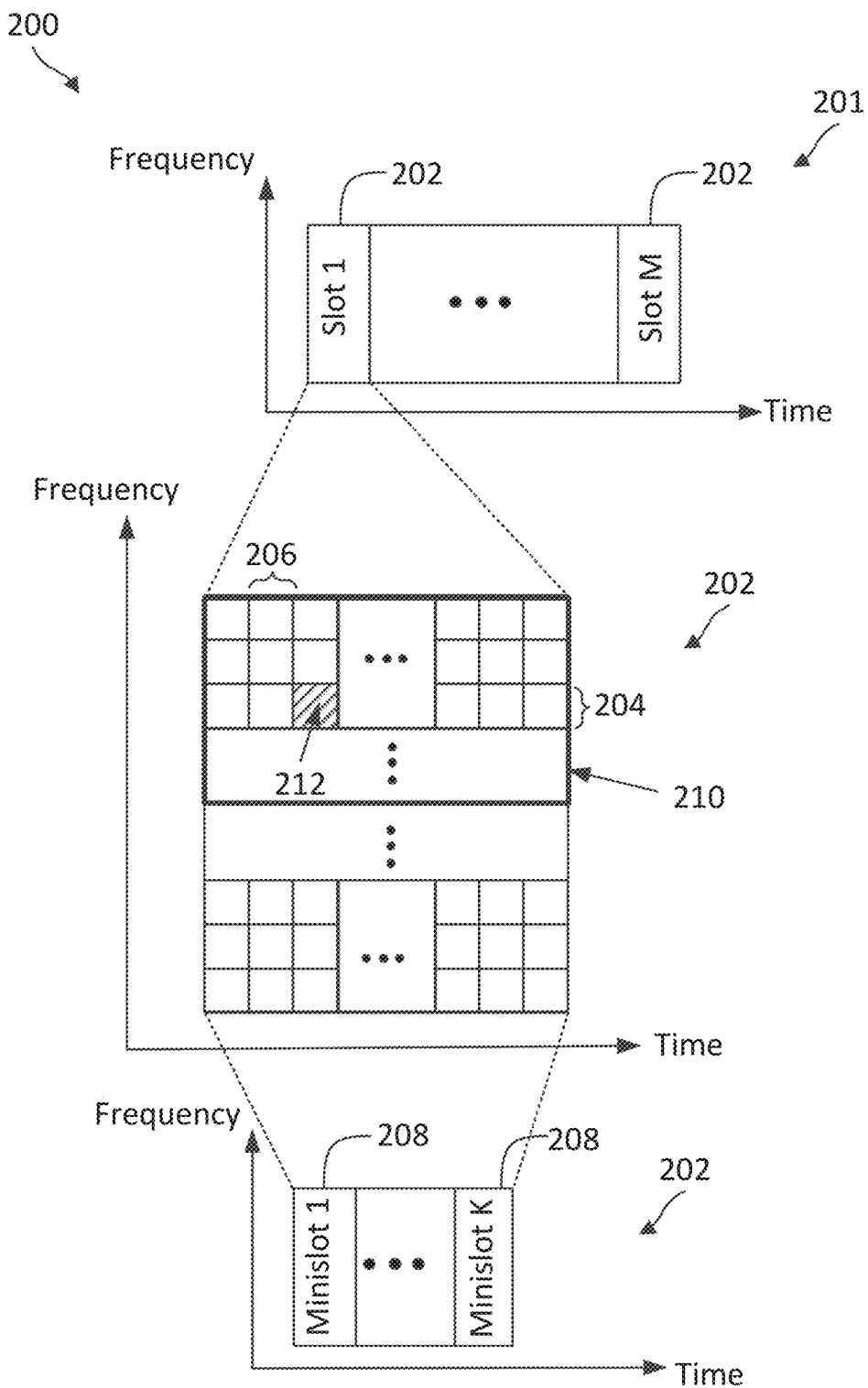
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , or 14 symbols).

In some aspects, the network 100 may operate over a narrow frequency band, for example, with a channel bandwidth of about 3.6 MHz. A BS 105 may transmit SSBs in the narrowband to facilitate a UE 115 in performing an initial network access. Each SSB includes a PBCH carrying a MIB indicating information associated with a CORESET (a CORESET #0) where a PDCCH type 0 may be located. PDCCH type 0 may be by the BS 105 to transmit SIB scheduling information. As discussed above, the minimum bandwidth of an NR SSB may be 3.6 MHz and the minimum bandwidth of an NR CORESET may be 4.32 MHz. According to aspects of the present disclosure, the BS 105 may transmit the NR SSB fully within the channel bandwidth, but may puncture at least a portion of the CORESET based on the channel bandwidth and a frequency placement of the CORESET or a frequency alignment of the CORESET relative to the SSB. In some aspects, the BS 105 may configure the CORESET such that a low-frequency edge of the CORESET is aligned to a low-frequency edge of the SSB, and may puncture a high-frequency portion of the CORESET that is outside the channel bandwidth (shown in FIG. 3 and FIGS. 4A-4C). In some aspects, the BS 105 may configure the CORESET such that the CORESET is offset from the SSB at the high-frequency edge and the low-frequency edge, and may puncture a high-frequency portion and a low-frequency portion of the CORESET outside the channel bandwidth (shown in FIG. 5 and FIGS. 6A-6C). In some aspects, the BS 105 may configure the CORESET such that a high-frequency edge of the CORESET is aligned to a high-frequency edge of the SSB, and may puncture a low-frequency portion of the CORESET outside of the channel bandwidth (shown in FIG. 7 and FIGS. 8A-8C).

In some aspects, the CORESET includes a plurality of control resource elements (CCEs), and the first portion of the CORESET includes a subset of the plurality of CCEs less than all CCEs of the plurality of CCEs. A CCE may include six resource element groups (REGs), where each REG may correspond to one resource block in one symbol. A PDCCH candidate may be formed from an aggregation of one CCE, two CCEs, four CCEs, or eight CCEs as will be discussed more fully below. The BS may transmit SIB scheduling information using a PDCCH candidate that is fully within the channel bandwidth.

Figure 3:
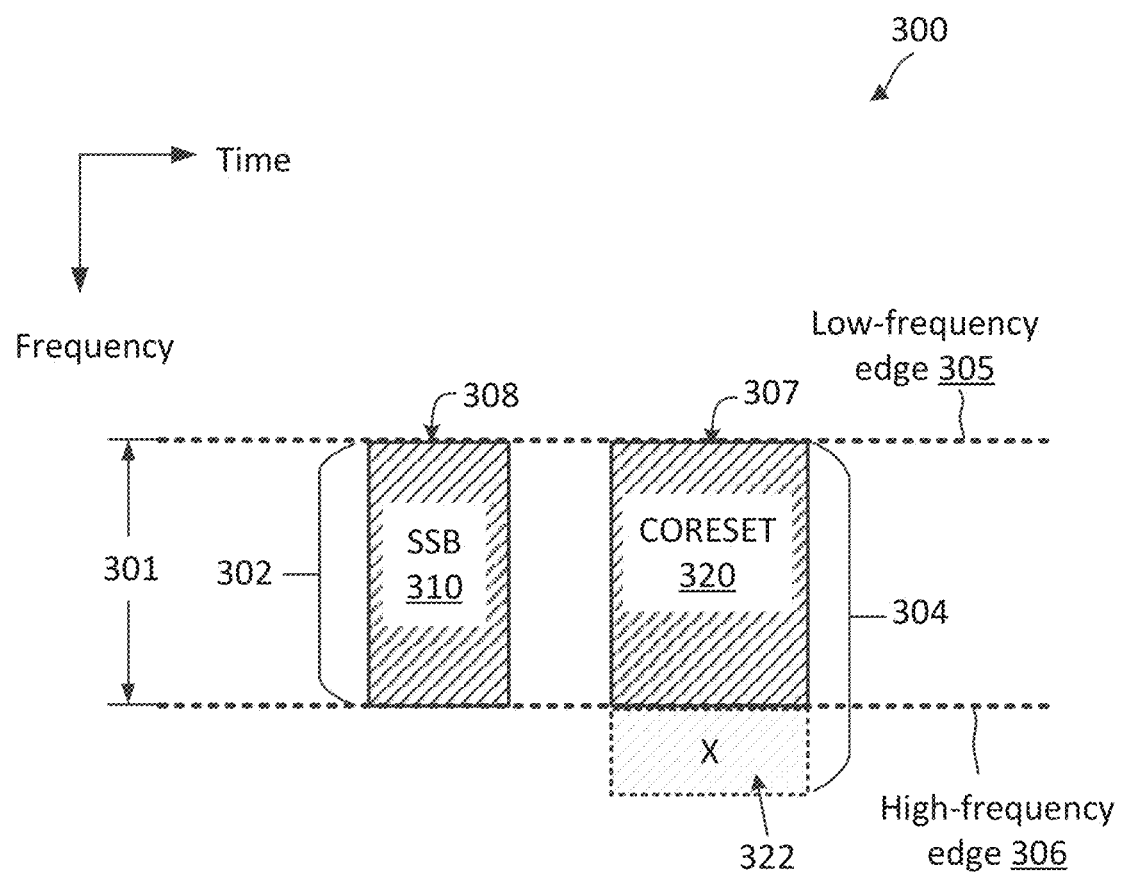
FIG. 3 illustrates a synchronization signal block (SSB) and control resource set (CORESET) configuration scheme according to some aspects of the present disclosure.

FIG. 3 illustrates an SSB and CORESET configuration scheme 300 according to some aspects of the present disclosure. The scheme 300 may be employed by the network 100. In particular, a BS 105 may operate over a narrowband (e.g., with a bandwidth of about 3.6 MHz) and configure and transmit an SSB and a CORESET as shown in the scheme 300. In FIG. 3, the x-axis represents time in some arbitrary units, and the y-axis represents frequency in some arbitrary units.

In the scheme 300, the BS 105 may transmit an SSB 310 in a channel bandwidth 301 with a low-frequency edge 305 and a high-frequency edge 306. The channel bandwidth 301 may be about 3.6 MHz. The SSB 310 may have a bandwidth 302 spanning 20 RBs (e.g., the RBs 210) at an SCS of 15 kHz, and thus the SSB bandwidth 302 is 3.6 MHz (the same as the channel bandwidth 301). The SSB 310 may include a PSS, an SSS, and a PBCH signal carrying a MIB. The MIB may include an indication of a CORESET 320. In the context of NR, the CORESET 320 may be referred to as CORESET #0 or a common CORESET. The CORESET 320 may have a bandwidth 304 spanning 24 RBs (e.g., the RBs 210) at an SCS of 15 kHz, and thus the CORESET bandwidth 304 is 4.32 MHz (which is greater than the channel bandwidth 301). The BS 105 may configure the CORESET 320 such that a low-frequency edge 307 of the CORESET 320 is aligned to a low-frequency edge 308 of the SSB 310. In other words, there is a zero offset between a lowest-frequency RB of the SSB 310 and a lowest-frequency RB of the CORESET 320. The BS 105 may puncture a high-frequency portion 322 of the CORESET 320 shown by the cross ("X") symbol. The CORESET 320 may span one symbol (e.g., the symbols 206) in time (shown in FIG. 4A), two symbols in time (shown in FIG. 4B), or three symbols in time (shown in FIG. 4C). In FIGS. 4A-4C, 6A-6C, and 8A-8C, CCEs that are fully within the channel bandwidth are shown as pattern-filled boxes, and CCEs that are at least partially outside the channel bandwidth are shown as empty-filled boxes. Additionally, PDCCH candidates that are valid (fully within the channel bandwidth) are shown with corresponding aggregation levels, and PDCCH candidates that are invalid (not fully within the channel bandwidth 301) are shown with a cross symbol ("X").

Figure 4A:
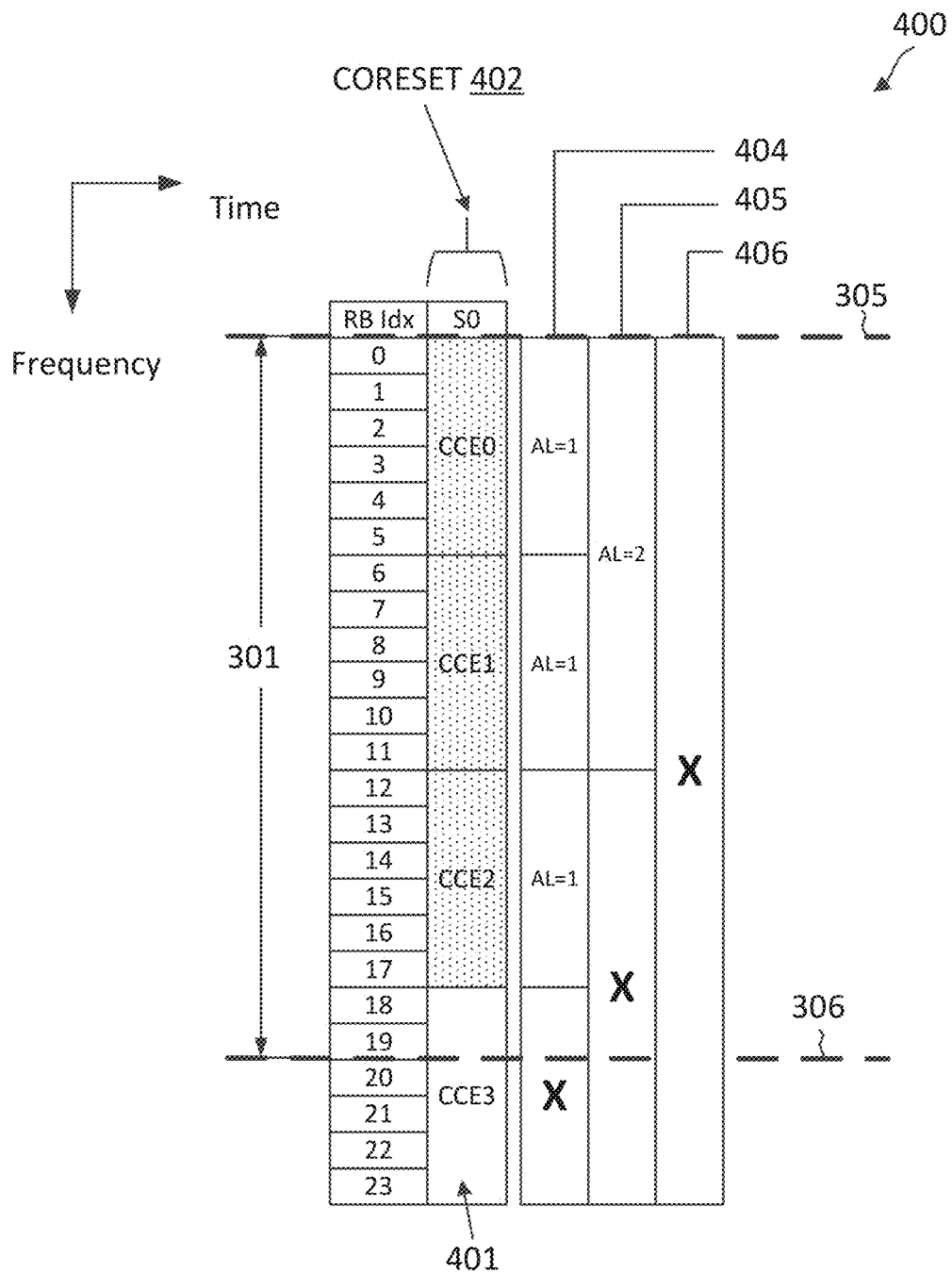
FIG. 4A illustrates a CORESET configuration scheme according to some aspects of the present disclosure.

FIG. 4A illustrates a CORESET configuration scheme 400 according to some aspects of the present disclosure. The scheme 400 may be employed by the network 100. In particular, a BS 105 may operate over a narrowband (e.g., with a bandwidth of about 3.6 MHz) and configure a CORESET as shown in the scheme 400. In FIG. 4A, the x-axis represents time in some arbitrary units, and the y-axis represents frequency in some arbitrary units.

In the illustrated example of FIG. 4A, a CORESET 402 is aligned to the low-frequency edge 305 of a channel bandwidth (of 3.6 MHz). The CORESET 402 may correspond to the CORESET 320 of FIG. 3. The CORESET 402 spans one symbol S0 (e.g., the symbol 206) in time and twenty-four RBs (e.g., the RBs 210) indexed from 0 to 23 at an SCS of 15 kHz in frequency (corresponding to a bandwidth of 4.32 MHz). The CORESET 402 includes four CCEs 401. The CCEs 401 are indexed from 0 to 3 (shown as CCE0 to CCE3). The CORESET 402 is a CORESET #0 for PDCCH-type 0 (or SIB) scheduling and monitoring. Each CCE 401 include six resource element groups (REGs), where a REG is defined as one physical RB in one symbol.

The BS 105 may transmit a SIB scheduled in a PDCCH search space associated with the CORESET 402 using an aggregation of one CCE 401, an aggregation of two CCE 401, or an aggregation of four CCEs 401. For instance, the PDCCH search space may include a plurality of PDCCH candidates. For a PDCCH candidate at an aggregation level of 1 (AL=1), a PDCCH candidate may be in each CCE 401 shown by the reference numeral 404. For a PDCCH candidate at an aggregation level of 2 (AL=2), a PDCCH candidate may be in every two consecutive CCEs 401 shown by the reference numeral 405. For a PDCCH candidate at an aggregation level of 4 (AL=4), a PDCCH candidate may be in every four consecutive CCEs 401 shown by the reference numeral 405. The higher the AL, the more redundancy and more frequency diversity can be provided by the PDCCH transmission, and thus the more robust the PDCCH transmission may be.

Since the CORESET 402 has a wider bandwidth than the channel bandwidth 301, the CORESET 402 may include a first portion fully within the channel bandwidth 301 and a second portion outside the channel bandwidth 301. As shown in FIG. 4A, CCE0 to CCE2 (the first portion) are fully within the channel bandwidth 301, while CCE3 (the second portion) is outside the channel bandwidth 301. The BS 105 may transmit SIB scheduling information using a PDCCH candidate (a valid candidate) that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit the SIB scheduling information using a PDCCH candidate 404 in CCE0, CCE1, or CCE2, but may not use a PDCCH candidate 404 in CCE3 shown by the cross symbol ("X"). When the BS 105 utilizes an AL of 2, the BS 105 may transmit the SIB scheduling information using a PDCCH candidate 405 in CCE0 and CCE0 1, but may not use a PDCCH candidate 405 in CCE2 and CCE3 shown by the cross symbols ("X"). The transmission of SIB scheduling information using a PDCCH candidate may refer to the BS 105 transmitting the SIB scheduling information in the CCE(s) 401 corresponding to the PDCCH candidate. Although the CORESET 402 can accommodate a PDCCH candidate 406 at an AL of 4, the PDCCH candidate 404 is not fully within the channel bandwidth 301. Accordingly, the BS 105 may not transmit SIB scheduling information using the PDCCH candidate 406 shown by the cross symbol ("X"). In some aspects, the BS 105 may select a PDCCH candidate at a certain AL based on a desired coverage.

A UE 115 may monitor for SIB scheduling information by performing blind decoding to search for a PDCCH candidate in the CORESET 402 based on an aggregation level (AL) of 1 or 2. The UE 115 may puncture the portion of the CORESET 402 outside the channel bandwidth 301, and refrain from decoding a PDCCH candidate that is at least partially outside the channel bandwidth 301. In this regard, the UE 115 may identify a subset of the CCEs 401 that is fully within the channel bandwidth 301, and decode PDCCH candidates (e.g., the valid PDCCH candidates 404 and 405) from one or more CCEs 401 in the subset based on an aggregation level of 1 or 2.

Figure 4B:
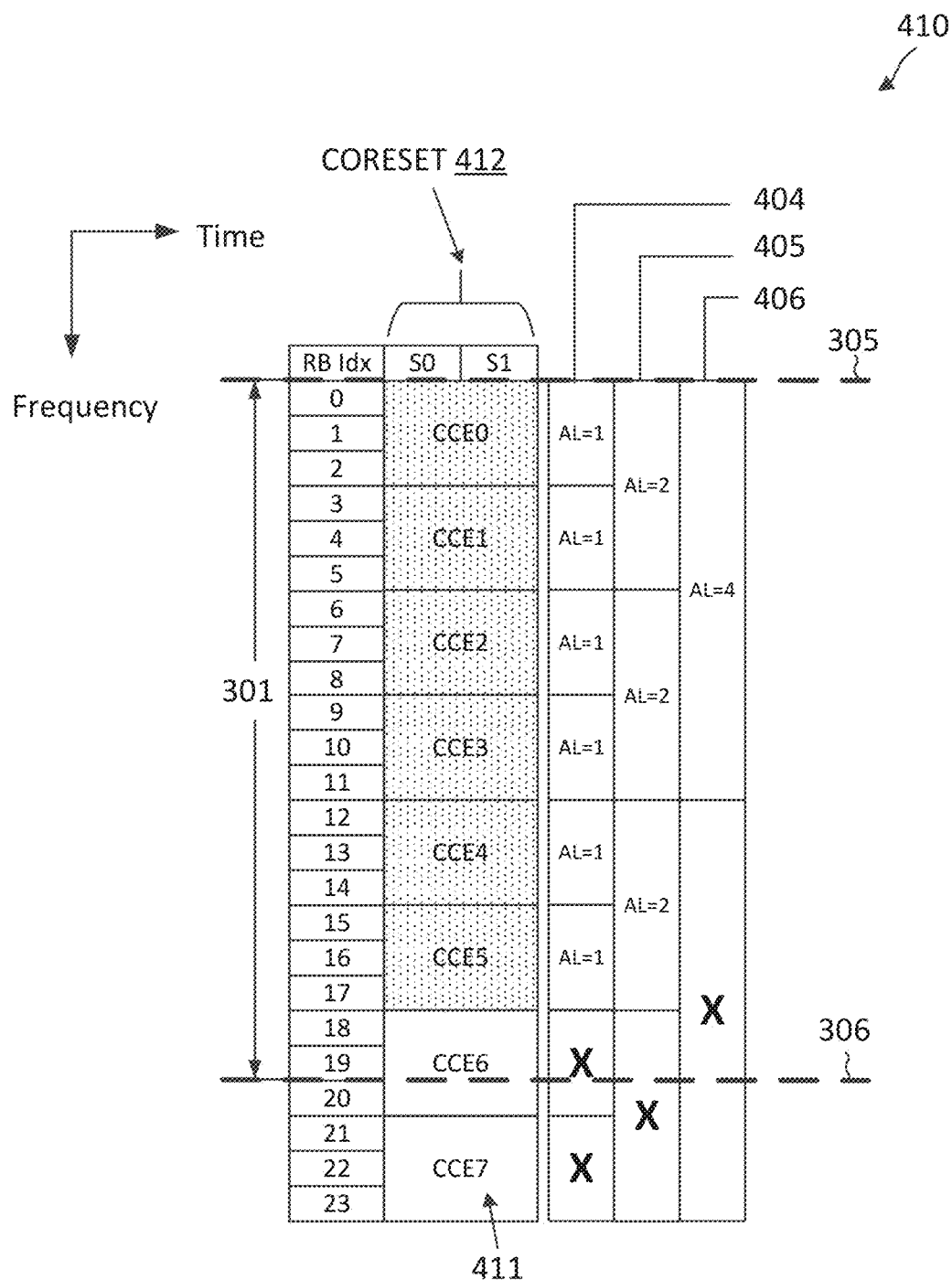
FIG. 4B illustrates a CORESET configuration scheme according to some aspects of the present disclosure.

FIG. 4B illustrates a CORESET configuration scheme 410 according to some aspects of the present disclosure. The scheme 410 may be employed by the network 100. In particular, a BS 105 may operate over a narrowband (e.g., with a bandwidth of about 3.6 MHz) and configure a CORESET as shown in the scheme 410. In FIG. 4B, the x-axis represents time in some arbitrary units, and the y-axis represents frequency in some arbitrary units. The scheme 410 is described using a similar a PDCCH candidate structure as in FIG. 4A, and may use the same reference numerals as in FIG. 4A for simplicity's sake.

In the illustrated example of FIG. 4B, a CORESET 412 is aligned to the low-frequency edge 305 of a channel bandwidth 301 (of 3.6 MHz). The CORESET 412 may correspond to the CORESET 320 of FIG. 3. The CORESET 412 spans two symbols S0 and S1 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 412 includes eight CCEs 411 each including six REGs. The CCEs 411 are indexed from 0 to 7 (shown as CCE0 to CCE7).

Since the CORESET 412 has a wider bandwidth than the channel bandwidth 301, the CORESET 412 may include a first portion fully within the channel bandwidth 301 and a second portion outside the channel bandwidth 301. As shown in FIG. 4B, CCE0 to CCE5 are fully within the channel bandwidth 301, while CCE6 and CCE7 are partially or fully outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any one of CCE0 to CCE5, but may not use a PDCCH candidate 404 in CCE6 or CCE7 shown by the cross symbols ("X"). When the BS 105 utilizes an AL of 2, the BS 105 may transmit the SIB scheduling information using a PDCCH candidate 405 in CCE0 and CCE0 1, CCE2 and CCE3, or CCE4 and CCE5, but may not use a PDCCH candidate 405 in CCE6 and CCE7 shown by the cross symbol ("X"). When the BS 105 utilizes an AL of 4, the BS 105 may transmit the SIB scheduling information using a PDCCH candidate 406 in CCE0 to CCE3, but may not use a PDCCH candidate 406 in CCE4 to CCE7 shown by the cross symbol ("X"). In some aspects, the BS 105 may select a PDCCH candidate at a certain AL based on a desired coverage.

A UE 115 may monitor for SIB scheduling information by performing blind decoding to search for a PDCCH candidate in the CORESET 412 based on an aggregation level (AL) of 1, 2, or 4. The UE 115 may puncture the portion of the CORESET 412 outside the channel bandwidth 301, and refrain from decoding a PDCCH candidate that is at least partially outside the channel bandwidth 301. In this regard, the UE 115 may identify a subset of the CCEs 411 that is fully within the channel bandwidth 301, and decode PDCCH candidates (e.g., the valid PDCCH candidates 404, 405, and 406) from one or more CCEs 411 in the subset based on an aggregation level of 1, 2 or 4.

Figure 4C:
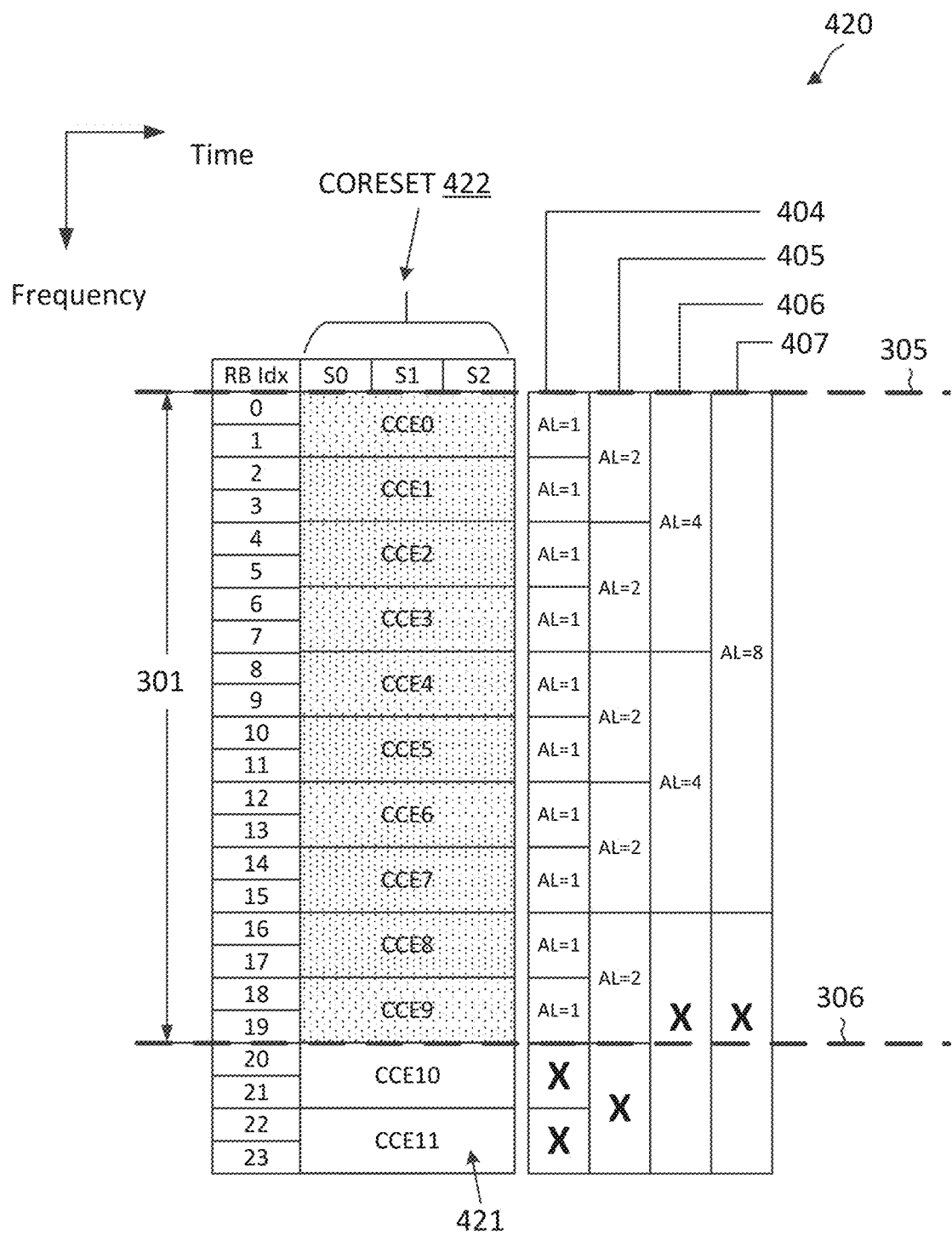
FIG. 4C illustrates a CORESET configuration scheme according to some aspects of the present disclosure.

FIG. 4C illustrates a CORESET configuration scheme 420 according to some aspects of the present disclosure. The scheme 420 may be employed by the network 100. In particular, a BS 105 may operate over a narrowband (e.g., with a bandwidth of about 3.6 MHz) and configure a CORESET as shown in the scheme 420. In FIG. 4C, the x-axis represents time in some arbitrary units, and the y-axis represents frequency in some arbitrary units. The scheme 420 is described using a similar PDCCH candidate structure as in FIG. 4A, and may use the same reference numerals as in FIG. 4A for simplicity's sake.

In the illustrated example of FIG. 4C, a CORESET 422 is aligned to the low-frequency edge 305 of a channel bandwidth 301 (of 3.6 MHz). The CORESET 422 may correspond to the CORESET 320 of FIG. 3. The CORESET 422 spans three symbols S0, S1, and S2 (e.g., the symbol 206) in time and twenty-four RBs (e.g., the RBs 210) (indexed from 0 to 23) at an SCS of 15 kHz in frequency (corresponding to a bandwidth of 4.32 MHz). The CORESET 422 includes twelve CCEs 421 each including six REGs. The CCEs 421 are indexed from 0 to 11 (shown as CCE0 to CCE11).

Since the CORESET 422 has a wider bandwidth than the channel bandwidth 301, the CORESET 422 may include a first portion fully within the channel bandwidth 301 and a second portion outside the channel bandwidth 301. As shown in FIG. 4C, CCE0 to CCE9 (the first portion) are fully within the channel bandwidth 301, while CCE10 and CCE11 (the second portion) are outside the channel bandwidth 301. The BS 105 may transmit SIB scheduling information using a PDCCH candidate that is fully within the channel bandwidth 301, but may not use a PDCCH candidate (a valid candidate) that is partially outside the channel bandwidth 301 or fully outside the channel bandwidth 301. For instance, when the BS 105 utilizes an AL of 1, the BS 105 may transmit SIB scheduling information using a PDCCH candidate 404 in any of one of CCE0 to CCE9, but may not use a PDCCH candidate 404 in CCE10 or CCE11 shown by the cross symbols ("X"). When the BS 105 utilizes an AL of 2, the BS 105 may transmit the SIB scheduling information using a PDCCH candidate 405 in CCE0 and CCE0 1, CCE2 and CCE3, CCE4 and CCE5, CCE 6 and CCE7, or CCE8 and CCE9, but may not use a PDCCH candidate 405 in CCE10 and CCE11 shown by the cross symbol ("X"). When the BS 105 utilizes an AL of 4, the BS 105 may transmit the SIB scheduling information using a PDCCH candidate 406 in CCE0 to CCE3 or CCE4 to CCE7, but may not use a PDCCH candidate 406 in CCE8 to CCE11 shown by the cross symbol ("X"). Additionally, the CORESET 422 can accommodate a PDCCH candidate 407 at an AL of 8 (in CCEs 0 to CCE7). In some aspects, the BS 105 may select a PDCCH candidate at a certain AL based on a desired coverage. For instance, an AL of 8 may provide a good cell-edge coverage.

A UE 115 may monitor for SIB scheduling information by performing blind decoding to search for a PDCCH candidate in the CORESET 422 based on an aggregation level (AL) of 1, 2, 4, or 8. The UE 115 may puncture the portion of the CORESET 422 outside the channel bandwidth 301, and refrain from decoding a PDCCH candidate that is at least partially outside the channel bandwidth 301. In this regard, the UE 115 may identify a subset of the CCEs 421 that is fully within the channel bandwidth 301, and decode PDCCH candidates (e.g., the valid PDCCH candidates 404, 405, 406, and 407) from one or more CCEs 421 in the subset based on an aggregation level of 1, 2, 4 or 8.

Figure 5:
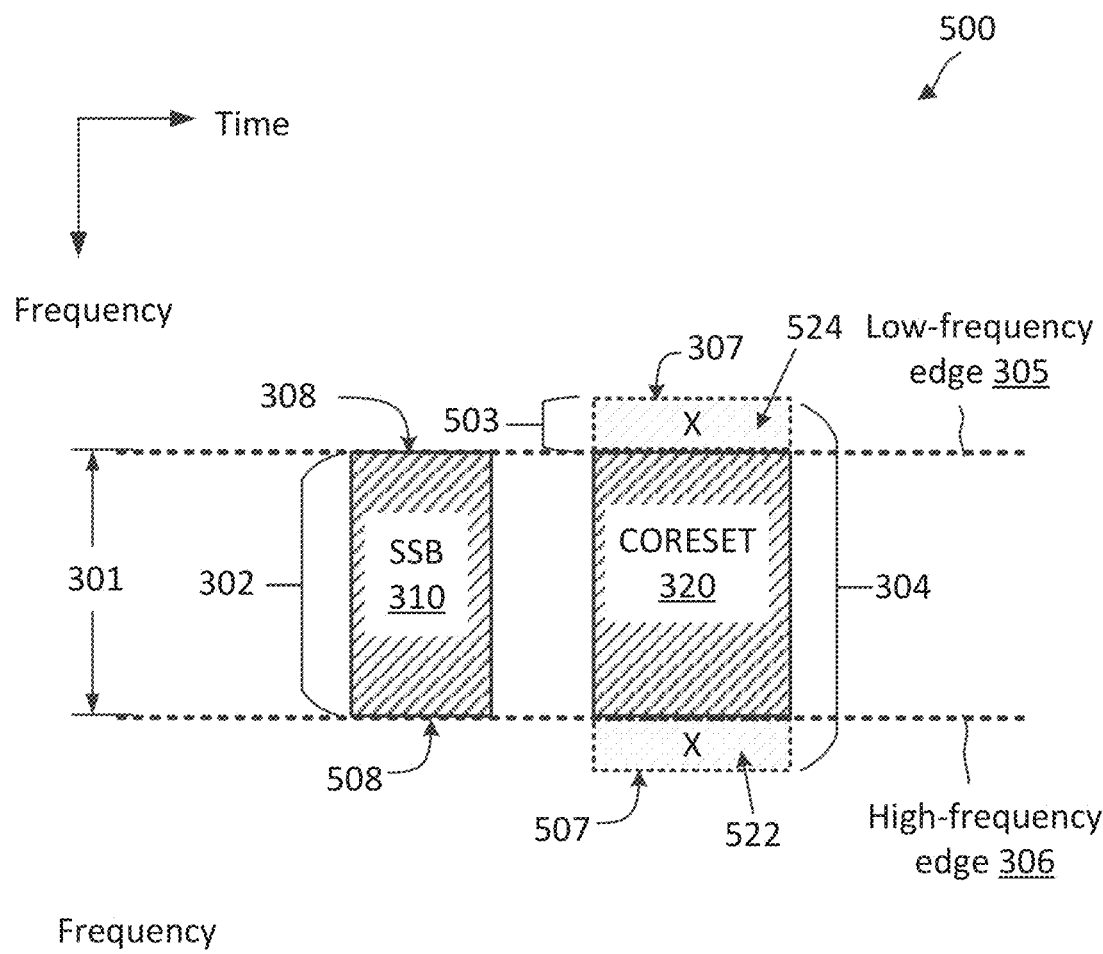
FIG. 5 illustrates an SSB and CORESET configuration scheme according to some aspects of the present disclosure.

FIG. 5 illustrates an SSB and CORESET configuration scheme 500 according to some aspects of the present disclosure. The scheme 500 may be employed by the network 100. In particular, a BS 105 may operate over a narrowband (e.g., with a bandwidth of about 3.6 MHz) and configure and transmit an SSB and a CORESET as shown in the scheme 500. In FIG. 5, the x-axis represents time in some arbitrary units, and the y-axis represents frequency in some arbitrary units. The scheme 500 may use the same channel structure as discussed above with respect to FIG. 3, and may use the same reference numerals as in FIG. 3 for simplicity's sake.

Similar to the scheme 300, the BS 105 may transmit the SSB 310 (including 20 RBs at 15 kHz SCS) in the channel bandwidth 301. However, the BS 105 may configure the CORESET 320 (including 24 RBs at 15 kHz SCS with a bandwidth greater than the channel bandwidth 301) such that a central frequency portion of the CORESET 320 is within the channel bandwidth 301. As shown, a low-frequency edge 307 of the CORESET 320 is offset from a low-frequency edge 308 of the SSB 310 (e.g., by an offset 503 of two RBs) and a high-frequency edge 507 of the CORESET 320 is offset from a high-frequency edge 508 of the SSB 310 (e.g., by two RBs). The BS 105 may puncture a high-frequency portion 522 of the CORESET 320 and a low-frequency portion 524 of the CORESET 320 (outside the channel bandwidth 301) shown by the cross symbols ("X"). The CORESET 320 may span one symbol (e.g., the symbols 206) in time (shown in FIG. 6A), two symbols in time (shown in FIG. 6B), or three symbols in time (shown in FIG. 6C).

Figure 6A:
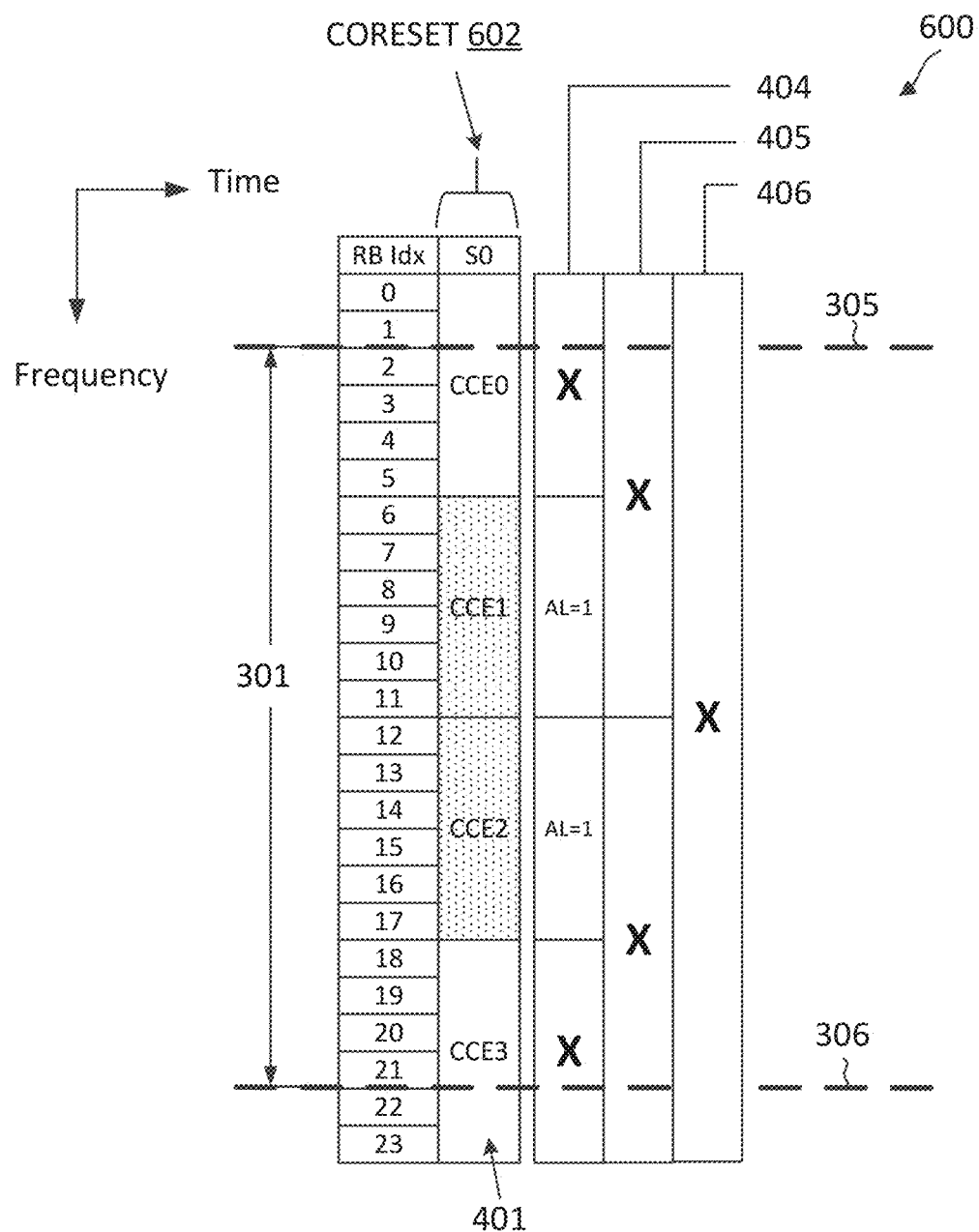
FIG. 6A illustrates a CORESET configuration scheme according to some aspects of the present disclosure.

FIG. 6A illustrates a CORESET configuration scheme 600 according to some aspects of the present disclosure. The scheme 600 may be employed by the network 100. In particular, a BS 105 may operate over a narrowband (e.g., with a bandwidth of about 3.6 MHz) and configure a CORESET as shown in the scheme 600. In FIG. 6A, the x-axis represents time in some arbitrary units, and the y-axis represents frequency in some arbitrary units. The scheme 600 is described using a similar CORESET and PDCCH candidate structure as in FIG. 4A, and may use the same reference numerals as in FIG. 4A for simplicity's sake.

In the illustrated example of FIG. 6A, a CORESET 602 is offset from the low-frequency edge 305 of a channel bandwidth 301 (of 3.6 MHz) by two RBs (e.g., the RBs 210) and offset from the high-frequency edge 306 of a channel bandwidth 301 (of 3.6 MHz) by two RBs. The CORESET 602 may correspond to the CORESET 320 of FIG. 3 and may be substantially similar to the CORESET 402 of FIG. 4A. As shown, the CORESET 602 spans one symbol S0 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 602 includes four CCEs 401 indexed from 0 to 3 (shown as CCE0 to CCE3).

Since the CORESET 602 has a wider bandwidth than the channel bandwidth 301, the CORESET 602 may include a first portion fully within the channel bandwidth 301 and a second portion outside the channel bandwidth 301. As shown in FIG. 6A, CCE1 and CCE2 (the first portion) are fully within the channel bandwidth 301, while CCE0 to CCE3 (the second portion) are partially outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in CCE1 or CCE2, but may not use a PDCCH candidate 404 in CCE0 or CCE3 shown by the cross symbols ("X"). The BS 105 may not use a PDCCH candidate 405 at an AL of 2 or a PDCCH candidate 406 at a AL of 4 shown by the cross symbols ("X") since there is no PDCCH candidate 405 or 406 fully within the channel bandwidth 301. In some aspects, the BS 105 may select a PDCCH candidate at a certain AL based on a desired coverage.

A UE 115 may monitor for SIB scheduling information by performing blind decoding to search for a PDCCH candidate in the CORESET 602 based on an aggregation level (AL) of 1. The UE 115 may puncture the portion of the CORESET 602 outside the channel bandwidth 301, and refrain from decoding a PDCCH candidate that is at least partially outside the channel bandwidth 301. In this regard, the UE 115 may identify a subset of the CCEs 401 that is fully within the channel bandwidth 301, and decode PDCCH candidates (e.g., the valid PDCCH candidates 404) from one or more CCEs 401 in the subset based on an aggregation level of 1.

Figure 6B:
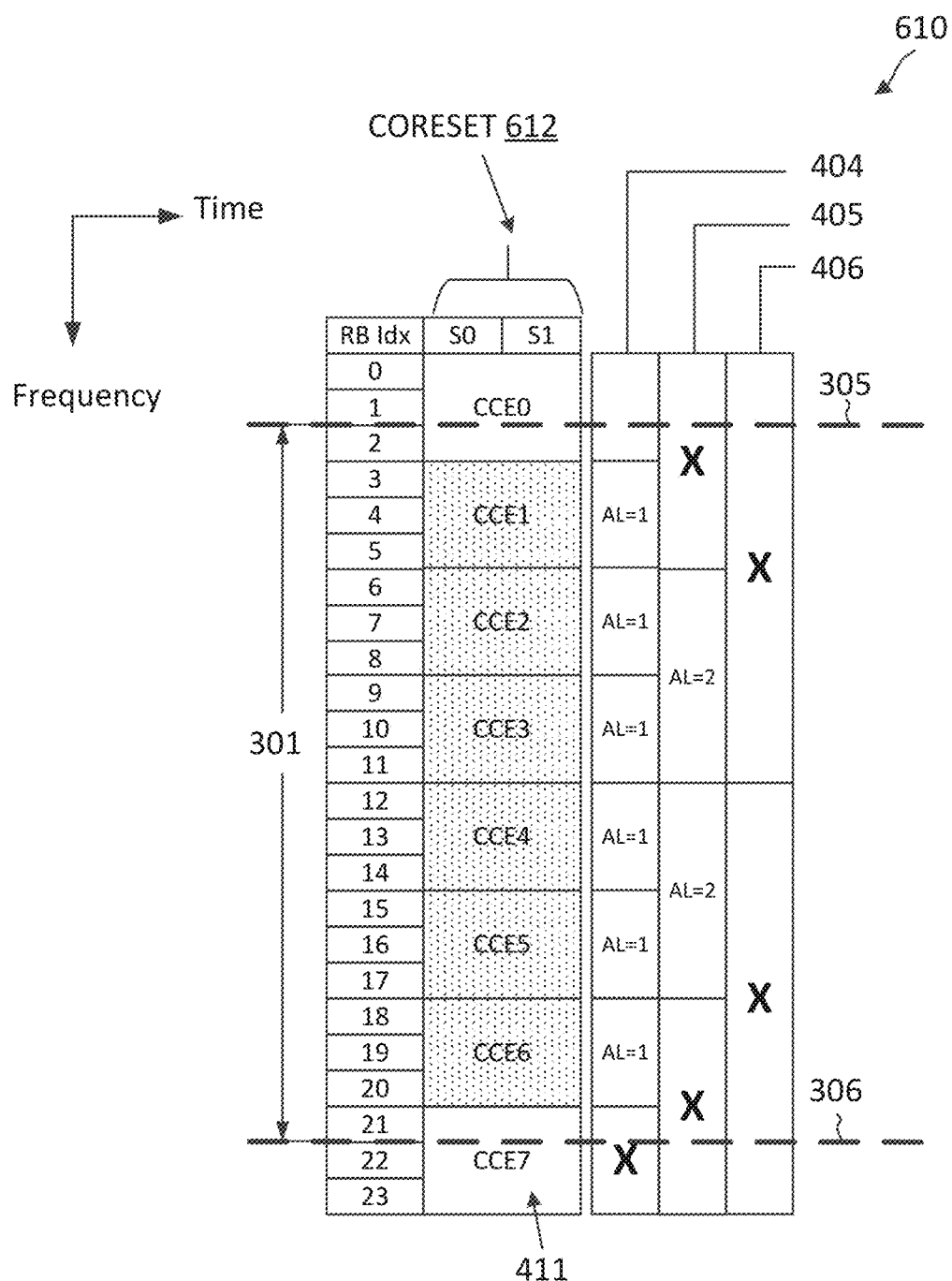
FIG. 6B illustrates a CORESET configuration scheme according to some aspects of the present disclosure.

FIG. 6B illustrates a CORESET configuration scheme 610 according to some aspects of the present disclosure. The scheme 610 may be employed by the network 100. In particular, a BS 105 may operate over a narrowband (e.g., with a bandwidth of about 3.6 MHz) and configure a CORESET as shown in the scheme 610. In FIG. 6B, the x-axis represents time in some arbitrary units, and the y-axis represents frequency in some arbitrary units. The scheme 610 is described using a similar CORESET and PDCCH candidate structure as in FIG. 4B, and may use the same reference numerals as in FIG. 4B for simplicity's sake.

In the illustrated example of FIG. 6B, a CORESET 612 is offset from the low-frequency edge 305 of a channel bandwidth 301 (of 3.6 MHz) by two RBs (e.g., the RBs 210) and offset from the high-frequency edge 306 of a channel bandwidth 301 (of 3.6 MHz) by two RBs. The CORESET 612 may correspond to the CORESET 320 of FIG. 3 and may be substantially similar to the CORESET 412 of FIG. 4B. As shown, the CORESET 612 spans two symbols S0 and S1 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 612 includes eight CCEs 411 are indexed from 0 to 7 (shown as CCE0 to CCE7).

Since the CORESET 612 has a wider bandwidth than the channel bandwidth 301, the CORESET 612 may include a first portion fully within the channel bandwidth 301 and a second portion outside the channel bandwidth 301. As shown in FIG. 6B, CCE1 to CCE6 (the first portion) are fully within the channel bandwidth 301, while CCE0 and CCE7 (the second portion) are partially outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any of one of CCE1 to CCE6, but may not use a PDCCH candidate 404 in CCE0 or CCE7 shown by the cross symbols ("X"). When the BS 105 utilizes an AL of 2, the BS 105 may transmit the SIB scheduling information using a PDCCH candidate 405 in CCE2 and CCE3 or CCE4 and CCE5, but may not use a PDCCH candidate 405 in CCE0 and CCE1 or CCE 6 and CCE7 shown by the cross symbols ("X"). The BS 105 may not use a PDCCH candidate 407 at an AL of 4 shown by the cross symbols ("X") since there is no PDCCH candidate 407 fully within the channel bandwidth 301. In some aspects, the BS 105 may select a PDCCH candidate at a certain AL based on a desired coverage.

A UE 115 may monitor for SIB scheduling information by performing blind decoding to search for a PDCCH candidate in the CORESET 612 based on an aggregation level (AL) of 1 or 2. The UE 115 may puncture the portion of the CORESET 612 outside the channel bandwidth 301, and refrain from decoding a PDCCH candidate that is at least partially outside the channel bandwidth 301. In this regard, the UE 115 may identify a subset of the CCEs 411 that is fully within the channel bandwidth 301, and decode PDCCH candidates (e.g., the valid PDCCH candidates 404 and 405) from one or more CCEs 411 in the subset based on an aggregation level of 1 or 2.

Figure 6C:
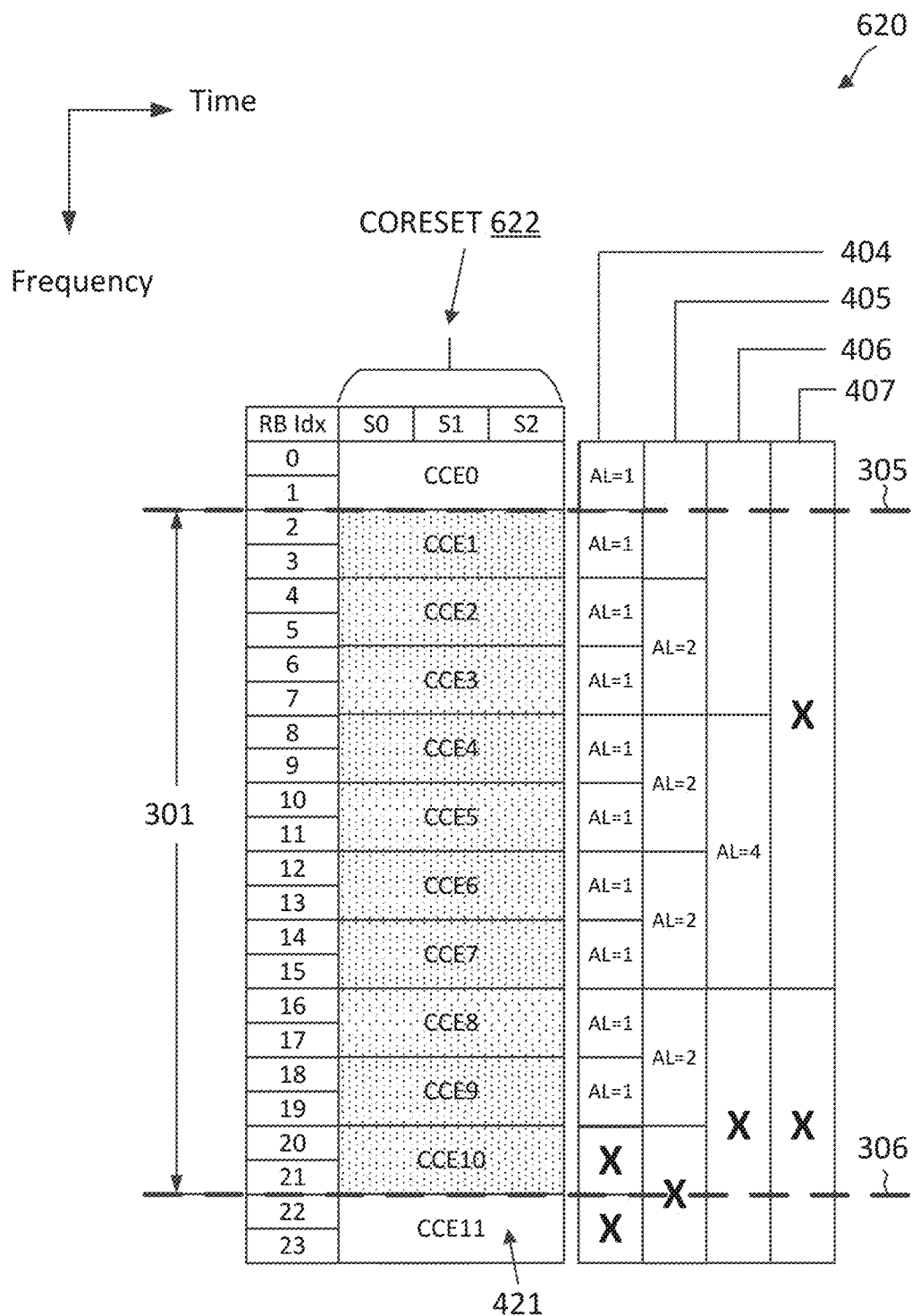
FIG. 6C illustrates a CORESET configuration scheme according to some aspects of the present disclosure.

FIG. 6C illustrates a CORESET configuration scheme 620 according to some aspects of the present disclosure. The scheme 620 may be employed by the network 100. In particular, a BS 105 may operate over a narrowband (e.g., with a bandwidth of about 3.6 MHz) and configure a CORESET as shown in the scheme 620. In FIG. 6C, the x-axis represents time in some arbitrary units, and the y-axis represents frequency in some arbitrary units. The scheme 620 is described using a similar CORESET and PDCCH candidate structure as in FIG. 4C, and may use the same reference numerals as in FIG. 4C for simplicity's sake.

In the illustrated example of FIG. 6C, a CORESET 622 is aligned to the low-frequency edge 305 of a channel bandwidth 301 (of 3.6 MHz). The CORESET 622 may correspond to the CORESET 320 of FIG. 3 and may be substantially similar to the CORESET 422 of FIG. 4C. The CORESET 622 spans three symbols S0, S1, and S2 (e.g., the symbol 206) in time and twenty-four RBs (e.g., the RBs 210) (indexed from 0 to 23) at an SCS of 15 kHz in frequency (corresponding to a bandwidth of 4.32 MHz). The CORESET 622 includes twelve CCEs 421 indexed from 0 to 11 (shown as CCE0 to CCE11).

Since the CORESET 622 has a wider bandwidth than the channel bandwidth 301, the CORESET 622 may include a first portion fully within the channel bandwidth 301 and a second portion outside the channel bandwidth 301. As shown in FIG. 6C, CCE1 to CCE10 (the first portion) are fully within the channel bandwidth 301, while CCE0 and CCE11 (the second portion) are outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any of one of CCE1 to CCE10, but may not use a PDCCH candidate 404 in CCE0 or CCE11 shown by the cross symbols ("X"). When the BS 105 utilizes an AL of 2, the BS 105 may transmit the SIB scheduling information using a PDCCH candidate 405 in CCE2 and CCE3, CCE4 and CCE5, CCE 6 and CCE7, or CCE8 and CCE9, but may not use a PDCCH candidate 405 in CCE0 and CCE1 or CCE10 and CCE11 shown by the cross symbols ("X"). When the BS 105 utilizes an AL of 4, the BS 105 may transmit the SIB scheduling information using a PDCCH candidate 406 in CCE4 to CCE7, but may not use a PDCCH candidate 406 in CCE0 to CCE3 or CCE8 to CCE11 shown by the cross symbols ("X"). The BS 105 may not use a PDCCH candidate 407 at an AL of 8 shown by the cross symbols ("X") since there is no PDCCH candidate 407 fully within the channel bandwidth 301. In some aspects, the BS 105 may select a PDCCH candidate at a certain AL based on a desired coverage. For instance, an AL of 8 may provide a good cell-edge coverage.

A UE 115 may monitor for SIB scheduling information by performing blind decoding to search for a PDCCH candidate in the CORESET 622 based on an aggregation level (AL) of 1, 2, or 4. The UE 115 may puncture the portion of the CORESET 622 outside the channel bandwidth 301, and refrain from decoding a PDCCH candidate that is at least partially outside the channel bandwidth 301. In this regard, the UE 115 may identify a subset of the CCEs 421 that is fully within the channel bandwidth 301, and decode PDCCH candidates (e.g., the valid PDCCH candidates 404, 405, and 406) from one or more CCEs 421 in the subset based on an aggregation level of 1, 2, or 4.

Figure 7:
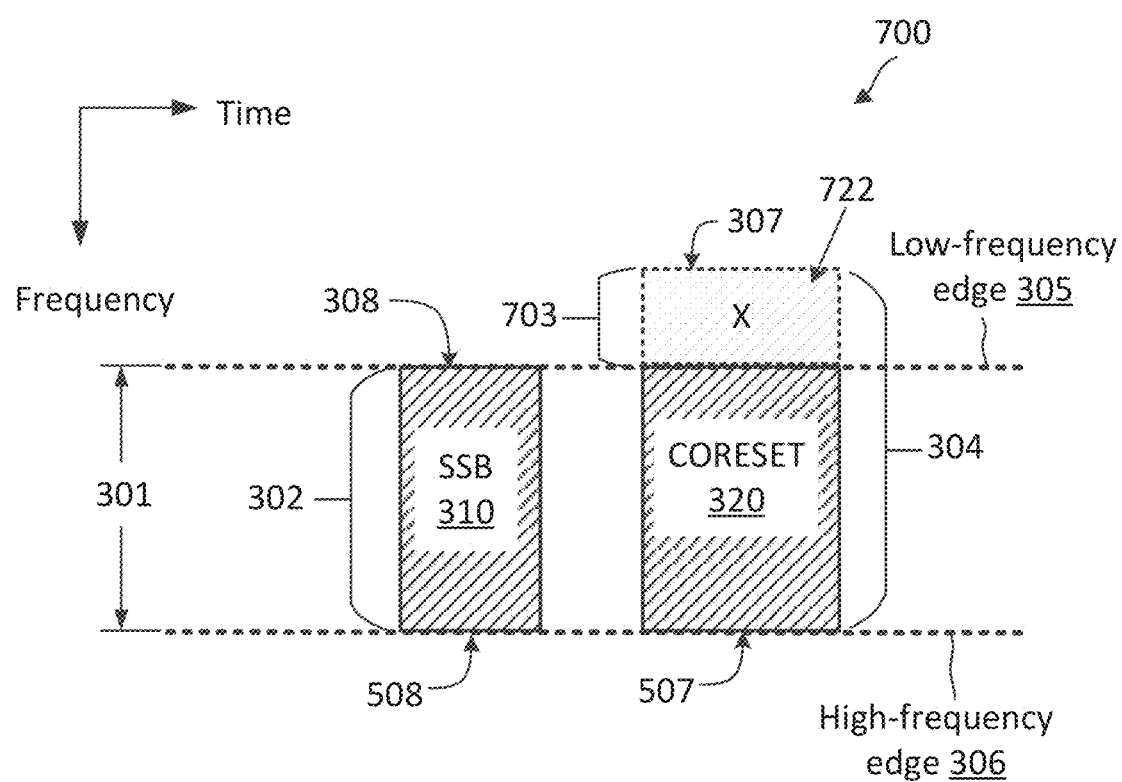
FIG. 7 illustrates an SSB and CORESET configuration scheme according to some aspects of the present disclosure.

FIG. 7 illustrates an SSB and CORESET configuration scheme 700 according to some aspects of the present disclosure. The scheme 700 may be employed by the network 100. In particular, a BS 105 may operate over a narrowband (e.g., with a bandwidth of about 3.6 MHz) and configure and transmit an SSB and a CORESET as shown in the scheme 700. In FIG. 7, the x-axis represents time in some arbitrary units, and the y-axis represents frequency in some arbitrary units. The scheme 700 may use the same channel structure as discussed above with respect to FIGS. 3 and 5, and may use the same reference numerals as in FIGS. 3 and 5 for simplicity's sake.

Similar to the schemes 300 and 500, the BS 105 may transmit the SSB 310 (including 20 RBs at 15 kHz SCS) in the channel bandwidth 301. However, the BS 105 may configure the CORESET 320 (including 24 RBs at 15 kHz SCS with a bandwidth greater than the channel bandwidth 301) such that a high-frequency edge 507 of the CORESET 320 is aligned to a high-frequency edge 508 of the SSB 310. As shown, a low-frequency edge 307 of the CORESET 320 is offset from a low-frequency edge 308 of the SSB 310 (e.g., by an offset 703 of 4 RBs). The BS 105 may puncture a low-frequency portion 722 of the CORESET 320 shown by the cross symbol ("X"). The CORESET 320 may span one symbol (e.g., the symbols 206) in time (shown in FIG. 8A), two symbols in time (shown in FIG. 8B), or three symbols in time (shown in FIG. 8C).

Figure 8A:
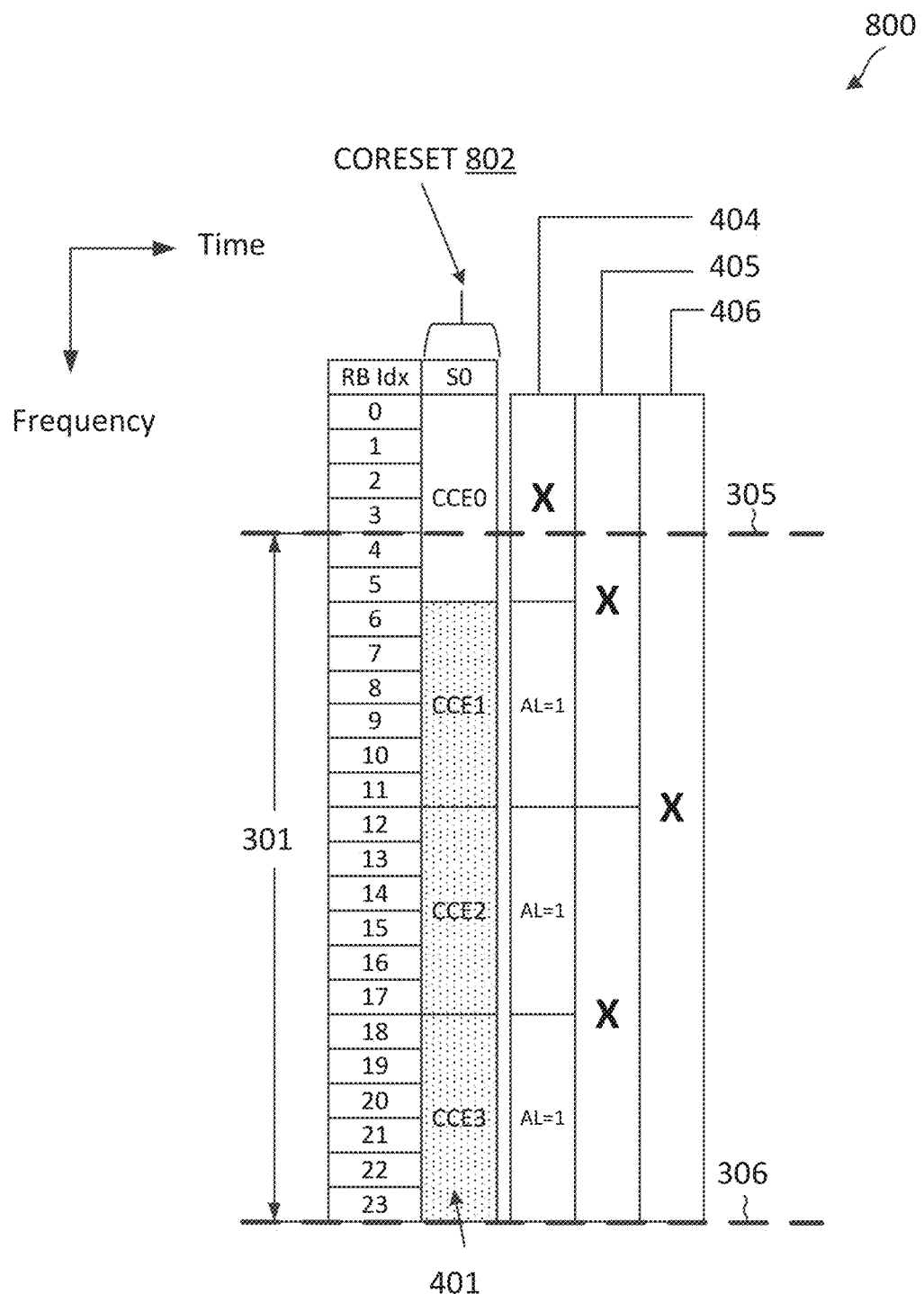
FIG. 8A illustrates a CORESET configuration scheme according to some aspects of the present disclosure.

FIG. 8A illustrates a CORESET configuration scheme 800 according to some aspects of the present disclosure. The scheme 800 may be employed by the network 100. In particular, a BS 105 may operate over a narrowband (e.g., with a bandwidth of about 3.6 MHz) and configure a CORESET as shown in the scheme 800. In FIG. 8A, the x-axis represents time in some arbitrary units, and the y-axis represents frequency in some arbitrary units. The scheme 800 is described using a similar CORESET and PDCCH candidate structure as in FIGS. 4A and 6A, and may use the same reference numerals as in FIGS. 4A and 6A for simplicity's sake.

In the illustrated example of FIG. 8A, a CORESET 802 is offset from the low-frequency edge 305 of a channel bandwidth 301 (of 3.6 MHz) by four RBs (e.g., the RBs 210). The CORESET 802 may correspond to the CORESET 320 of FIG. 3 and may be substantially similar to the CORESET 402 of FIG. 4A and/or the CORESET 602 of 6A. As shown, the CORESET 802 spans one symbol S0 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 802 includes four CCEs 401 indexed from 0 to 3 (shown as CCE0 to CCE3).

Since the CORESET 802 has a wider bandwidth than the channel bandwidth 301, the CORESET 802 may include a first portion fully within the channel bandwidth 301 and a second portion outside the channel bandwidth 301. As shown in FIG. 8A, CCE1 and CCE3 (the first portion) are fully within the channel bandwidth 301, while CCE0 (the second portion) is partially outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any one of the CCE1 to CCE3, but may not use a PDCCH candidate 404 in CCE0 shown by the cross symbol ("X"). The BS 105 may not use a PDCCH candidate 405 at an AL of 2 or a PDCCH candidate 406 at a AL of 4 shown by the cross symbols ("X") since there is no PDCCH candidate 405 or 406 fully within the channel bandwidth 301. In some aspects, the BS 105 may select a PDCCH candidate at a certain AL based on a desired coverage.

A UE 115 may monitor for SIB scheduling information by performing blind decoding to search for a PDCCH candidate in the CORESET 802 based on an aggregation level (AL) of 1. The UE 115 may puncture the portion of the CORESET 802 outside the channel bandwidth 301, and refrain from decoding a PDCCH candidate that is at least partially outside the channel bandwidth 301. In this regard, the UE 115 may identify a subset of the CCEs 401 that is fully within the channel bandwidth 301, and decode PDCCH candidates (e.g., the valid PDCCH candidates 404) from one or more CCEs 401 in the subset based on an aggregation level of 1.

Figure 8B:
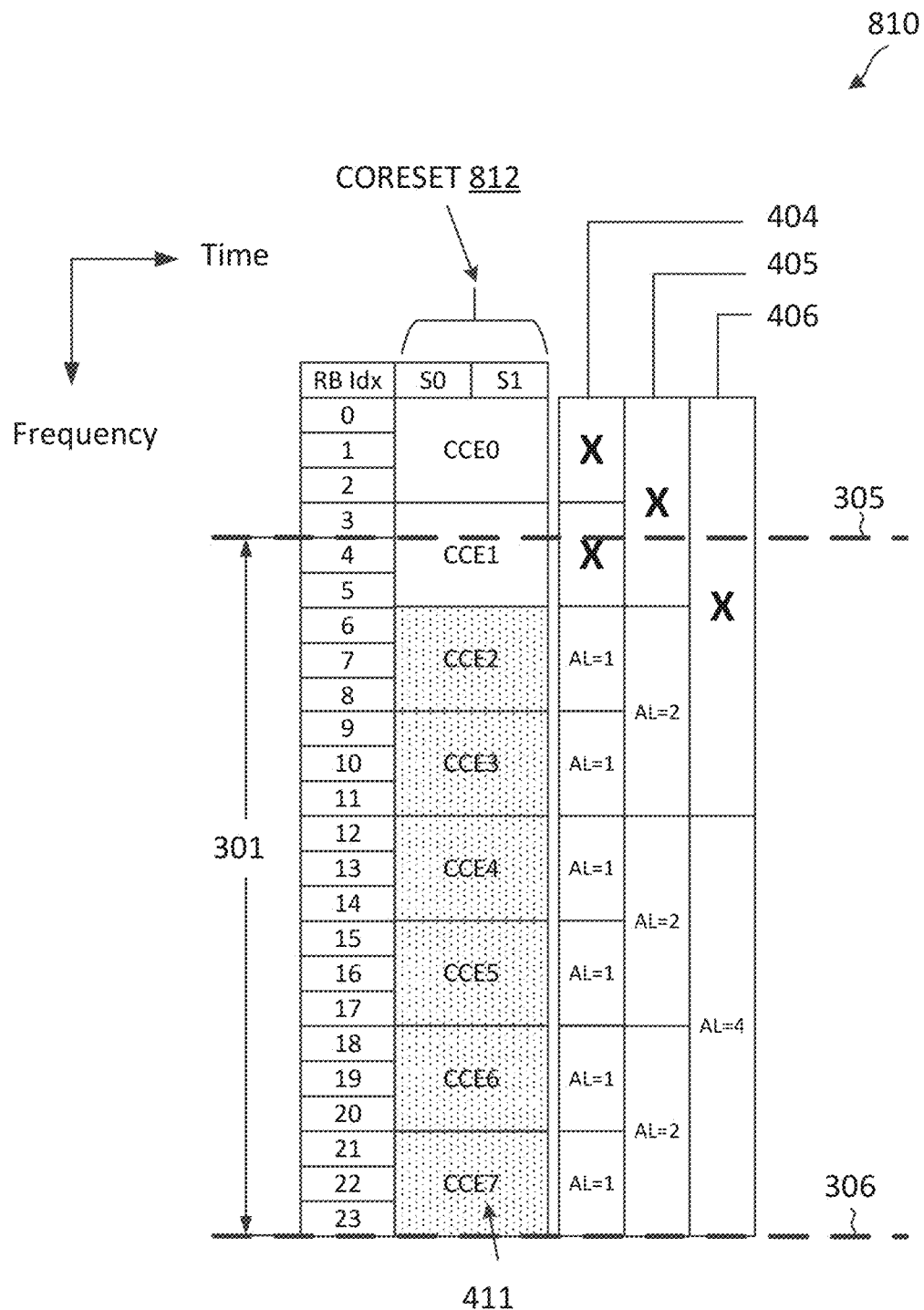
FIG. 8B illustrates a CORESET configuration scheme according to some aspects of the present disclosure.

FIG. 8B illustrates a CORESET configuration scheme 810 according to some aspects of the present disclosure. The scheme 810 may be employed by the network 100. In particular, a BS 105 may operate over a narrowband (e.g., with a bandwidth of about 3.6 MHz) and configure a CORESET as shown in the scheme 810. In FIG. 8B, the x-axis represents time in some arbitrary units, and the y-axis represents frequency in some arbitrary units. The scheme 810 is described using a similar CORESET and PDCCH candidate structure as in FIGS. 4B and 8B, and may use the same reference numerals as in FIGS. 4B and 6B for simplicity's sake.

In the illustrated example of FIG. 8B, a CORESET 812 is offset from the low-frequency edge 305 of a channel bandwidth 301 (of 3.6 MHz) by four RBs (e.g., the RBs 210). The CORESET 812 may correspond to the CORESET 320 of FIG. 3 and may be substantially similar to the CORESET 412 of FIG. 4B and/or the CORESET 612 of FIG. 6B. As shown, the CORESET 812 spans two symbols S0 and S1 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 812 includes eight CCEs 411 are indexed from 0 to 7 (shown as CCE0 to CCE7).

Since the CORESET 812 has a wider bandwidth than the channel bandwidth 301, the CORESET 812 may include a first portion fully within the channel bandwidth 301 and a second portion outside the channel bandwidth 301. As shown in FIG. 8B, CCE2 to CCE7 (the first portion) are fully within the channel bandwidth 301, while CCE0 and CCE1 (the second portion) are partially or fully outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any of one of CCE2 to CCE7, but may not use a PDCCH candidate 404 in CCE0 or CCE1 shown by the cross symbols ("X"). When the BS 105 utilizes an AL of 2, the BS 105 may transmit the SIB scheduling information using a PDCCH candidate 405 in CCE2 and CCE3, CCE4 and CCE5, or CCE 6 and CCE7, but may not use a PDCCH candidate 405 in CCE0 and CCE1 shown by the cross symbol ("X"). When the BS 105 utilizes an AL of 4, the BS 105 may transmit the SIB scheduling information using a PDCCH candidate 406 in CCE4 and CCE7, but may not use a PDCCH candidate 406 in CCE0 to CCE3 shown by the cross symbol ("X"). In some aspects, the BS 105 may select a PDCCH candidate at a certain AL based on a desired coverage.

A UE 115 may monitor for SIB scheduling information by performing blind decoding to search for a PDCCH candidate in the CORESET 812 based on an aggregation level (AL) of 1, 2 or 4. The UE 115 may puncture the portion of the CORESET 812 outside the channel bandwidth 301, and refrain from decoding a PDCCH candidate that is at least partially outside the channel bandwidth 301. In this regard, the UE 115 may identify a subset of the CCEs 411 that is fully within the channel bandwidth 301, and decode PDCCH candidates (e.g., the valid PDCCH candidates 404, 405, and 406) from one or more CCEs 411 in the subset based on an aggregation level of 1, 2, or 4.

Figure 8C:
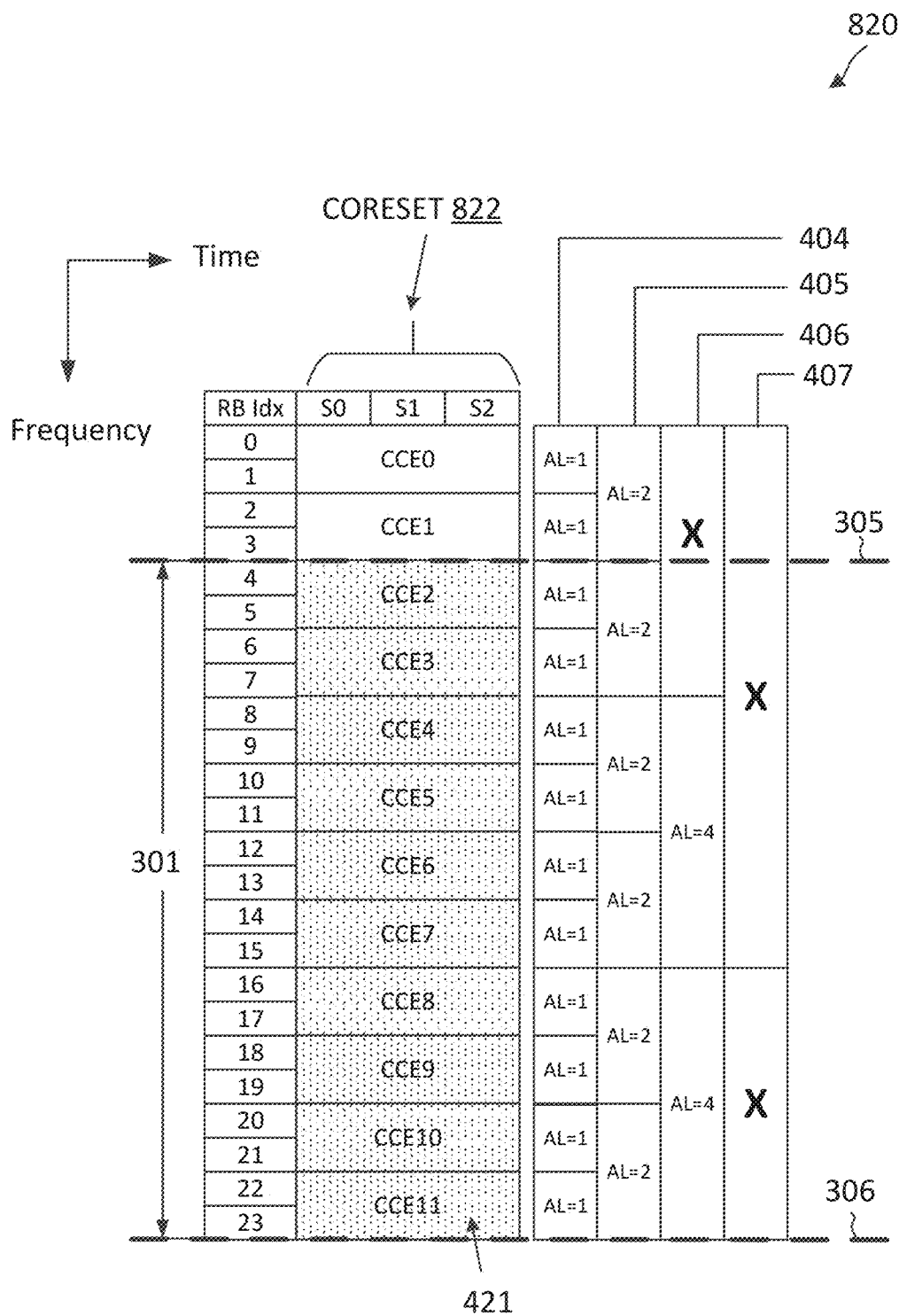
FIG. 8C illustrates a CORESET configuration scheme according to some aspects of the present disclosure.

FIG. 8C illustrates a CORESET configuration scheme 820 according to some aspects of the present disclosure. The scheme 820 may be employed by the network 100. In particular, a BS 105 may operate over a narrowband (e.g., with a bandwidth of about 3.6 MHz) and configure a CORESET as shown in the scheme 820. In FIG. 8C, the x-axis represents time in some arbitrary units, and the y-axis represents frequency in some arbitrary units. The scheme 820 is described using a similar CORESET and PDCCH candidate structure as in FIGS. 4C and 6C, and may use the same reference numerals as in FIGS. 4C and 6C for simplicity's sake.

In the illustrated example of FIG. 8C, a CORESET 822 is aligned to the low-frequency edge 305 of a channel bandwidth 301 (of 3.6 MHz). The CORESET 822 may correspond to the CORESET 320 of FIG. 3 and may be substantially similar to the CORESET 422 of FIG. 4C and/or the CORESET 622 of FIG. 6C. The CORESET 822 spans three symbols S0, S1, and S2 (e.g., the symbol 206) in time and twenty-four RBs (e.g., the RBs 210) (indexed from 0 to 23) at an SCS of 15 kHz in frequency (corresponding to a bandwidth of 4.32 MHz). The CORESET 822 includes twelve CCEs 421 indexed from 0 to 11 (shown as CCE0 to CCE11).

Since the CORESET 822 has a wider bandwidth than the channel bandwidth 301, the CORESET 822 may include a first portion fully within the channel bandwidth 301 and a second portion outside the channel bandwidth 301. As shown in FIG. 8C, CCE2 to CCE11 are fully within the channel bandwidth 301, while CCE0 and CCE1 are outside the channel bandwidth 301. The BS 105 may transmit SIB scheduling information using a PDCCH candidate that is fully within the channel bandwidth 301, but may not use a PDCCH candidate that is partially outside the channel bandwidth 301 or fully outside the channel bandwidth 301. For instance, when the BS 105 utilizes an AL of 1, the BS 105 may transmit SIB scheduling information using a PDCCH candidate 404 in any of one of CCE2 to CCE11, but may not use a PDCCH candidate 404 in CCE0 or CCE1 shown by the cross symbols ("X"). When the BS 105 utilizes an AL of 2, the BS 105 may transmit the SIB scheduling information using a PDCCH candidate 405 in CCE2 and CCE3, CCE4 and CCE5, CCE 6 and CCE7, CCE8 and CCE9, or CCE 10 and CCE 11, but may not use a PDCCH candidate 405 in CCE0 and CCE1 shown by the cross symbol ("X"). When the BS 105 utilizes an AL of 4, the BS 105 may transmit the SIB scheduling information using a PDCCH candidate 406 in CCE4 to CCE7 or CCE8 to CCE11, but may not use a PDCCH candidate 406 in CCE0 to CCE3 shown by the cross symbol ("X"). The BS 105 may not use a PDCCH candidate 407 at an AL of 8 shown by the cross symbols ("X") since there is no PDCCH candidate 407 fully within the channel bandwidth 301. In some aspects, the BS 105 may select a PDCCH candidate at a certain AL based on a desired coverage. For instance, an AL of 8 may provide a good cell-edge coverage.

A UE 115 may monitor for SIB scheduling information by performing blind decoding to search for a PDCCH candidate in the CORESET 822 based on an aggregation level (AL) of 1, 2, or 4. The UE 115 may puncture the portion of the CORESET 822 outside the channel bandwidth 301, and refrain from decoding a PDCCH candidate that is at least partially outside the channel bandwidth 301. In this regard, the UE 115 may identify a subset of the CCEs 421 that is fully within the channel bandwidth 301, and decode PDCCH candidates (e.g., the valid PDCCH candidates 404, 405, and 406) from one or more CCEs 421 in the subset based on an aggregation level of 1, 2, or 4.

As can be observed from FIGS. 4A-4C, 6A-6C, and 8A-8C, the CORESET configurations shown in FIGS. 4A-4C (where the CORESET has a zero offset to the SSB at the low-frequency edge) may provide the BS 105 with the greatest number of valid PDCCH candidates (fully within the channel bandwidth) to select for SIB scheduling information transmission compared to the CORESET configurations shown in FIGS. 6A-6C (where CORESET has a 2 RB offset to the SSB at the low-frequency) and 8A-8C where CORESET has a 4 RB offset to the SSB at the low-frequency). Additionally, the CORESET configurations shown in FIGS. 4A-4C may provide a greatest number of PDCCH candidates with an AL of 8 compared to the CORESET configurations shown in FIGS. 6A-6C and 8A-8C. Accordingly, the CORESET configuration or frequency placement with the zero RB offset relative to the SSB at a low-frequency edge may provide the greatest flexibility (from the number of valid PDCCH candidates) and the greatest coverage (from PDCCH candidates with AL=8).

While the schemes 600, 610, 620, 800, 810, and 820 discussed above utilize a same CCE mapping where a lowest-frequency or lowest-index CCE (CCE0) begins at a lowest-frequency RB of the CORESET, in other aspects, the BS 105 may utilize a different CCE mapping to account for only the portion of the CORESET that is inside the channel bandwidth 301. In this regard, the BS 105 may configure a lowest-frequency or lowest-index CCE (CCE0) to begin at a lowest-frequency RB of the CORESET that is within the channel bandwidth 301. Referring to the example shown in FIGS. 6A-6C, the BS 105 may configure CCE0 to start at RB index 2 (the lowest-frequency RB of the CORESETs 602, 612, 622 that is within the channel bandwidth 301). Referring to the example shown in FIGS. 8A-8C, the BS 105 may configure CCE0 to start at RB index 4 (the lowest-frequency RB of the CORESETs 802, 812, 822 that is within the channel bandwidth 301). The BS 105 may utilize the same PDCCH candidate configuration with AL of 1, 2, 4, or 8 as discussed above. With the new CCE mapping, the number of available PDCCH candidates and/or the number of PDCCH candidates with an AL of 8 may be comparable to the configurations shown in FIGS. 4A-4C. In other words, the BS 105 can utilize the new CCE mapping with CORESET frequency placements as shown in FIGS. 5 and 7 to achieve similar PDCCH candidate selection flexibility and/or coverage as the CORESET frequency placement shown in FIG. 3.

In some aspects, the network 100 may operate over a narrow frequency band, for example, with a channel bandwidth of about 3 MHz. A BS 105 may transmit SSBs in the narrowband to facilitate a UE 115 in performing an initial network access. Each SSB includes a PBCH carrying a MIB indicating information associated with a CORESET (CORESET #0) where a PDCCH type 0 may be located. As discussed above, the minimum bandwidth of an NR SSB may be 3.6 MHz and the minimum bandwidth of an NR CORESET may be 4.32 MHz. According to aspects of the present disclosure, the BS 105 may puncture at least a portion of the SSB and at least a portion of the CORESET based on the channel bandwidth. In some aspects, the BS 105 may configure the SSB such that a low-frequency edge of the SSB is aligned to a low-frequency edge of the channel bandwidth, and may puncture a high-frequency portion of the SSB outside of the channel bandwidth. Additionally, the BS 105 may configure the CORESET such that a low-frequency edge of the CORESET is aligned to a low-frequency edge of the SSB, and may puncture a high-frequency portion of the CORESET outside of the channel bandwidth (shown in FIG. 9 and FIGS. 10A-10C). In some aspects, the BS 105 may configure the SSB such that a high-frequency edge of the SSB is aligned to a high-frequency edge of the channel bandwidth, and may puncture a low-frequency portion of the SSB outside of the channel bandwidth. Additionally, the BS 105 may configure the CORESET such that a high-frequency edge of the CORESET is aligned to a high-frequency edge of the SSB, and may puncture a low-frequency portion of the CORESET outside of the channel bandwidth (shown in FIG. 11 and FIGS. 12A-12C).

Figure 9:
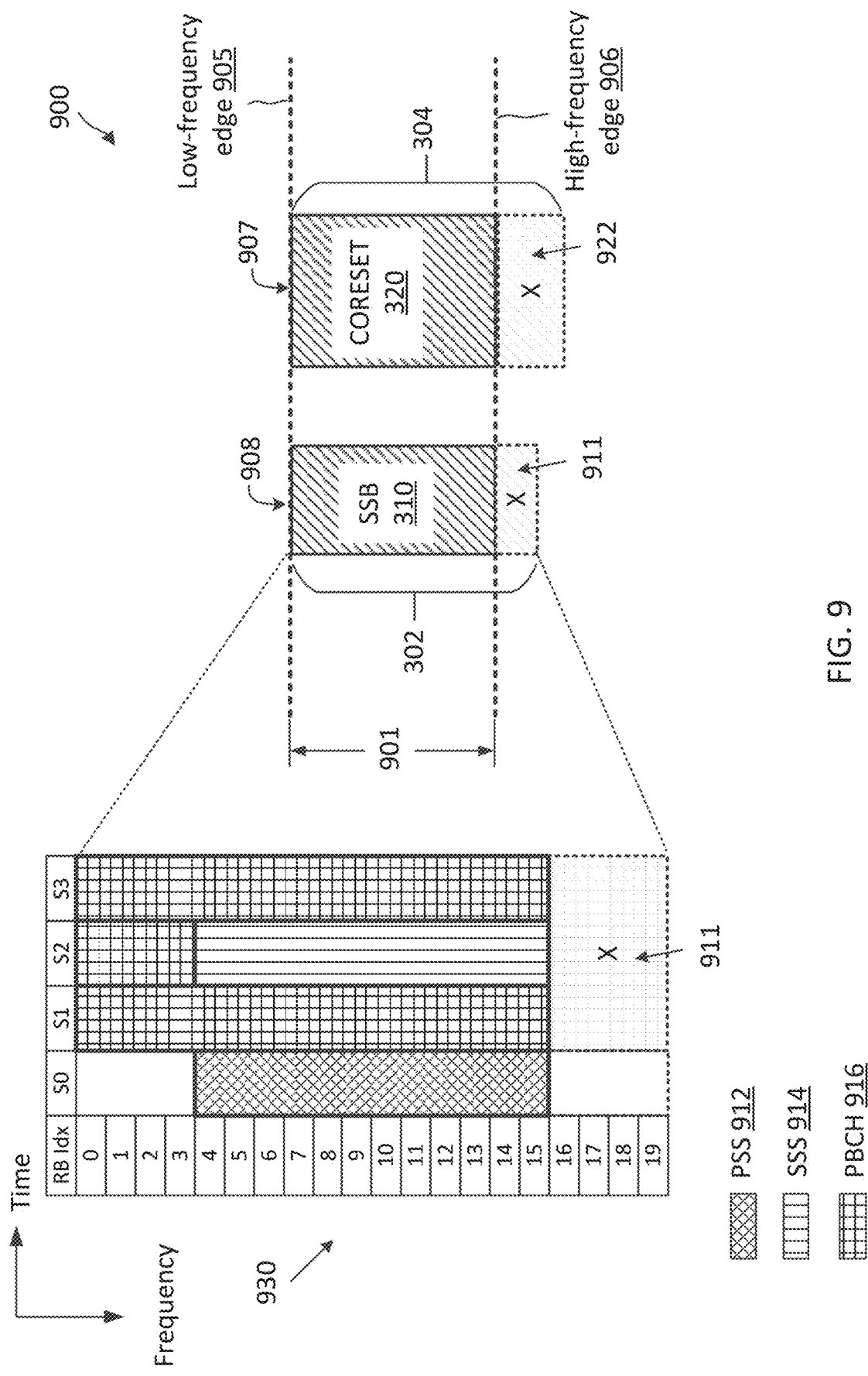
FIG. 9 illustrates an SSB and CORESET configuration scheme according to some aspects of the present disclosure.

FIG. 9 illustrates an SSB and CORESET configuration scheme 900 according to some aspects of the present disclosure. The scheme 900 may be employed by the network 100. In particular, a BS 105 may operate over a narrowband (e.g., with a channel bandwidth 901 of about 3 MHz) and configure and transmit an SSB and a CORESET as shown in the scheme 900. In FIG. 9, the x-axis represents time in some arbitrary units, and the y-axis represents frequency in some arbitrary units.

Similar to the schemes 300, 500, and 700, the SSB 310 may have a bandwidth 302 spanning 20 RBs (e.g., the RBs 210) at an SCS of 15 kHz, and thus the SSB bandwidth 302 is 3.6 MHz (greater than the channel bandwidth 901). FIG. 9 shows an expanded view 930 of the SSB 310. In the expanded view 930, the RBs in the SSB 310 are indexed from 0 to 19. The SSB 310 includes include a PSS 912 in a symbol S0, an SSS 914 in a symbol S2, and a PBCH signal 916 in symbols S1 to S3 multiplexed with the SSS 914. The PBCH signal 916 may carry a MIB including an indication of a CORESET 320. The BS 105 may transmit the SSB 310 by aligning a low-frequency edge 908 of the SSB 310 to a low-frequency edge 905 of the channel bandwidth 901, and puncture a high-frequency portion 911 (e.g., including 4 RBs) of the SSB 310.

The CORESET 320 may have a bandwidth 304 spanning 24 RBs (e.g., the RBs 210) at an SCS of 15 kHz, and thus the CORESET bandwidth 304 is 4.32 MHz (greater than the channel bandwidth 901). The BS 105 may configure the CORESET 320 such that a low-frequency edge 907 of the CORESET 320 is aligned to the low-frequency edge 908 of the SSB 310. In other words, there is a zero offset between a lowest-frequency RB of the SSB 310 and a lowest-frequency RB of the CORESET 320. The BS 105 may puncture a high-frequency portion 922 (e.g., including 8 RBs) of the CORESET 320 shown by the cross symbol ("X"). The CORESET 320 may span one symbol (e.g., the symbols 206) in time (shown in FIG. 10A), two symbols in time (shown in FIG. 10B), or three symbols in time (shown in FIG. 10C). In FIGS. 10A-10C and 12A-12C, CCEs that are fully within the channel bandwidth are shown as pattern-filled boxes, and CCEs that are at least partially outside the channel bandwidth are shown as empty-filled boxes. Additionally, PDCCH candidates that are valid (fully within the channel bandwidth) are shown with corresponding aggregation levels, and PDCCH candidates that are invalid (not fully within the channel bandwidth 301) are shown with a cross symbol ("X").

Figure 10A:
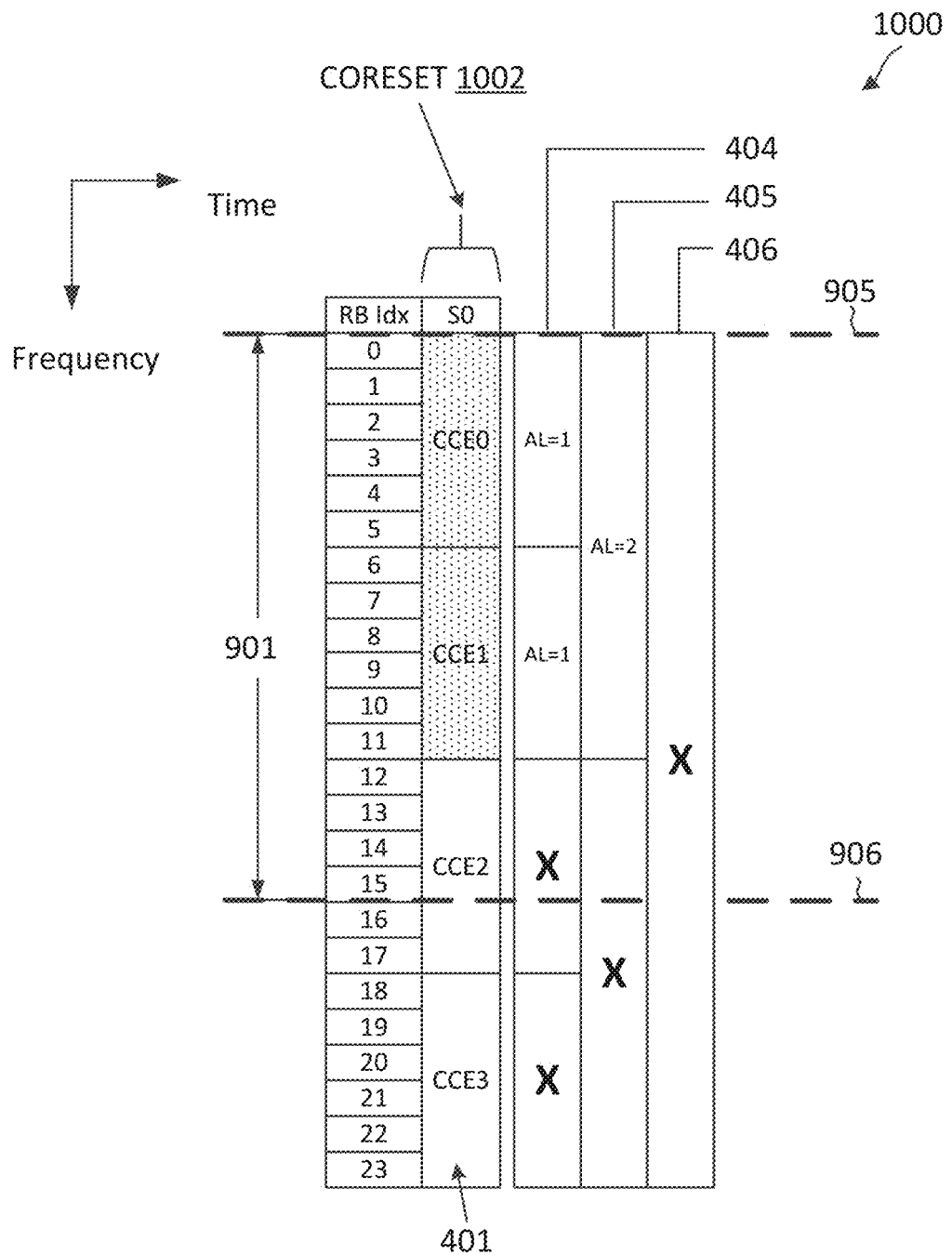
FIG. 10A illustrates a CORESET configuration scheme according to some aspects of the present disclosure.

FIG. 10A illustrates a CORESET configuration scheme 1000 according to some aspects of the present disclosure. The scheme 1000 may be employed by the network 100. In particular, a BS 105 may operate over a narrowband (e.g., with a bandwidth of about 3 MHz) and configure a CORESET as shown in the scheme 1000. In FIG. 10A, the x-axis represents time in some arbitrary units, and the y-axis represents frequency in some arbitrary units. The scheme 1000 is described using a similar CORESET and PDCCH candidate structure as in FIGS. 4A, 6A and 8A and may use the same reference numerals as in FIGS. 4A, 6A and 8A for simplicity's sake.

In the illustrated example of FIG. 10A, a CORESET 1002 is offset from the low-frequency edge 905 of a channel bandwidth 901 (of 3 MHz) by eight RBs (e.g., the RBs 210). The CORESET 1002 may correspond to the CORESET 320 of FIG. 3 and may be substantially similar to the CORESET 402 of FIG. 4A, the CORESET 602 of FIG. 6A, and/or the CORESET 802 of FIG. 8. As shown, the CORESET 1002 spans one symbol S0 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 1002 includes four CCEs 401 indexed from 0 to 3 (shown as CCE0 to CCE3).

Since the CORESET 1002 has a wider bandwidth than the channel bandwidth 901, the CORESET 1002 may include a first portion fully within the channel bandwidth 901 and a second portion outside the channel bandwidth 901. As shown in FIG. 10A, CCE0 and CCE1 (the first portion) are fully within the channel bandwidth 901, while CCE2 and CCE3 (the second portion) is partially outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, when the BS 105 utilizes an AL of 1, the BS 105 may transmit SIB scheduling information using a PDCCH candidate 404 in CCE0 or CCE1, but may not use a PDCCH candidate 404 in CCE2 or CCE3 shown by the cross symbols ("X"). When the BS 105 utilizes an AL of 2, the BS

105 may transmit SIB scheduling information using a PDCCH candidate 405 in CCE0 and CCE1, but may not use a PDCCH candidate 404 in CCE2 and CCE3 shown by the cross symbol ("X"). The BS 105 may not use a PDCCH candidate 406 at a AL of 4 shown by the cross symbol ("X") since there is no PDCCH candidate 406 is not fully within the channel bandwidth 901. In some aspects, the BS 105 may select a PDCCH candidate at a certain AL based on a desired coverage.

A UE 115 may monitor for SIB scheduling information by performing blind decoding to search for a PDCCH candidate in the CORESET 1002 based on an aggregation level (AL) of 1 or 2. The UE 115 may puncture the portion of the CORESET 1002 outside the channel bandwidth 901, and refrain from decoding a PDCCH candidate that is at least partially outside the channel bandwidth 901. In this regard, the UE 115 may identify a subset of the CCEs 401 that is fully within the channel bandwidth 901, and decode PDCCH candidates (e.g., the valid PDCCH candidates 404 and 405) from one or more CCEs 401 in the subset based on an aggregation level of 1 or 2.

Figure 10B:
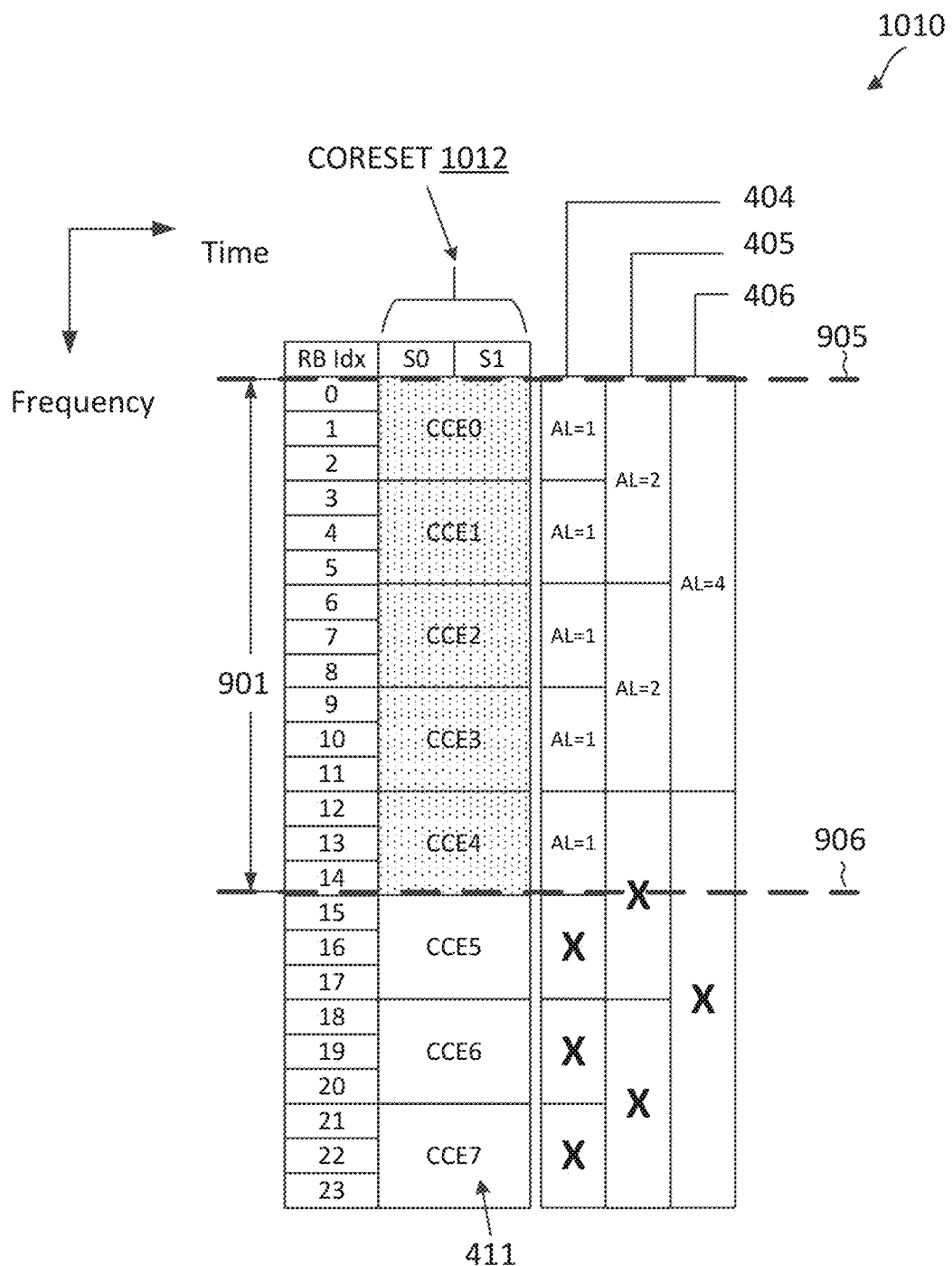
FIG. 10B illustrates a CORESET configuration scheme according to some aspects of the present disclosure.

FIG. 10B illustrates a CORESET configuration scheme 1010 according to some aspects of the present disclosure. The scheme 1010 may be employed by the network 100. In particular, a BS 105 may operate over a narrowband (e.g., with a bandwidth of about 3 MHz) and configure a CORESET as shown in the scheme 1010. In FIG. 10B, the x-axis represents time in some arbitrary units, and the y-axis represents frequency in some arbitrary units. The scheme 1010 is described using a similar CORESET and PDCCH candidate structure as in FIGS. 4B, 6B, and 8B, and may use the same reference numerals as in FIGS. 4B, 6B, and 8B for simplicity's sake.

In the illustrated example of FIG. 10B, a CORESET 1012 is offset from the low-frequency edge 905 of a channel bandwidth 901 (of 3.6 MHz) by four RBs (e.g., the RBs 210). The CORESET 1012 may correspond to the CORESET 320 of FIG. 3 and may be substantially similar to the CORESET 412 of FIG. 4B, the CORESET 612 of FIG. 6B, and/or the CORESET 812 of FIG. 8. As shown, the CORESET 1012 spans two symbols S0 and S1 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 1012 includes eight CCEs 411 are indexed from 0 to 7 (shown as CCE0 to CCE7).

Since the CORESET 1012 has a wider bandwidth than the channel bandwidth 901, the CORESET 1012 may include a first portion fully within the channel bandwidth 901 and a second portion outside the channel bandwidth 901. As shown in FIG. 10B, CCE0 to CCE4 (the first portion) are fully within the channel bandwidth 901, while CCE5 to CCE7 (the second portion) are fully outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, the BS 105 may transmit SIB scheduling information using a PDCCH candidate 404 in any of one of CCE2 to CCE4, but may not use a PDCCH candidate 404 in CCE5 to CCE7 shown by the cross symbols ("X"). When the BS 105 utilizes an AL of 2, the BS 105 may transmit the SIB scheduling information using a PDCCH candidate 405 in CCE0 and CCE1 or CCE2 and CCE5, but may not use a PDCCH candidate 405 in CCE4 and CCE5 or CCE6 and CCE7 shown by the cross symbol ("X"). When the BS 105 utilizes an AL of 4, the BS 105 may transmit the SIB scheduling information using a PDCCH candidate 406 in CCE0 to CCE3, but may not use a PDCCH candidate 406 in CCE4 to CCE7 shown by the cross symbol ("X"). In some aspects, the BS 105 may select a PDCCH candidate at a certain AL based on a desired coverage.

A UE 115 may monitor for SIB scheduling information by performing blind decoding to search for a PDCCH candidate in the CORESET 1012 based on an aggregation level (AL) of 1, 2 or 4. The UE 115 may puncture the portion of the CORESET 1012 outside the channel bandwidth 901, and refrain from decoding a PDCCH candidate that is at least partially outside the channel bandwidth 901. In this regard, the UE 115 may identify a subset of the CCEs 411 that is fully within the channel bandwidth 901, and decode PDCCH candidates (e.g., the valid PDCCH candidates 404, 405, and 406) from one or more CCEs 411 in the subset based on an aggregation level of 1, 2, or 4.

Figure 10C:
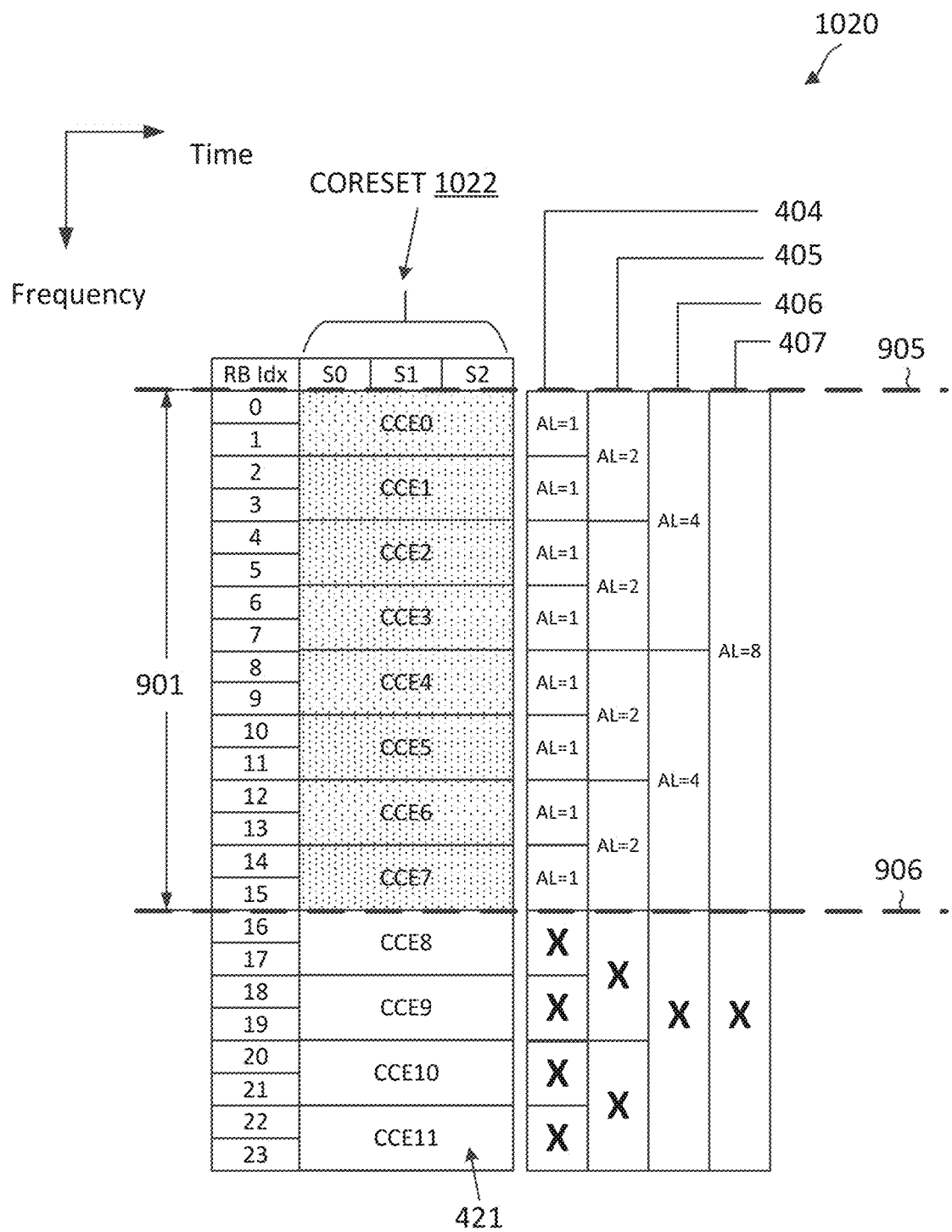
FIG. 10C illustrates a CORESET configuration scheme according to some aspects of the present disclosure.

FIG. 10C illustrates a CORESET configuration scheme 1020 according to some aspects of the present disclosure. The scheme 1020 may be employed by the network 100. In particular, a BS 105 may operate over a narrowband (e.g., with a bandwidth of about 3.6 MHz) and configure a CORESET as shown in the scheme 1020. In FIG. 10C, the x-axis represents time in some arbitrary units, and the y-axis represents frequency in some arbitrary units. The scheme 1020 is described using a similar CORESET and PDCCH candidate structure as in FIGS. 4C, 6C, and 8C, and may use the same reference numerals as in FIGS. 4C, 6C, and 8C for simplicity's sake.

In the illustrated example of FIG. 10C, a CORESET 1022 is aligned to the low-frequency edge 905 of a channel bandwidth 901 (of 3 MHz). The CORESET 1022 may correspond to the CORESET 320 of FIG. 3 and may be substantially similar to the CORESETs 422 of FIG. 4C, the CORESET 622 of FIG. 6C, and/or the CORESET 822 of FIG. 8C. As shown, the CORESET 1022 spans three symbols S0, S1, and S2 (e.g., the symbol 206) in time and twenty-four RBs (e.g., the RBs 210) (indexed from 0 to 23) at an SCS of 15 kHz in frequency (corresponding to a bandwidth of 4.32 MHz). The CORESET 1022 includes twelve CCEs 421 indexed from 0 to 11 (shown as CCE0 to CCE11).

Since the CORESET 1022 has a wider bandwidth than the channel bandwidth 901, the CORESET 1022 may include a first portion fully within the channel bandwidth 901 and a second portion outside the channel bandwidth 901. As shown in FIG. 10C, CCE0 to CCE7 (the first portion) are fully within the channel bandwidth 901, while CCE8 to CCE11 (the second portion) are outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, the BS 105 may transmit SIB scheduling information using a PDCCH candidate 404 in any of one of CCE0 to CCE7, but may not use a PDCCH candidate 404 in CCE8 to CCE11 shown by the cross symbols ("X"). When the BS 105 utilizes an AL of 2, the BS 105 may transmit the SIB scheduling information using a PDCCH candidate 405 in CCE0 and CCE1, CCE2 and CCE3, CCE4 and CCE5, CCE 6 and CCE7, but may not use a PDCCH candidate 405 in CCE8 and CCE9, or CCE 10 and CCE 11 shown by the cross symbol ("X"). When the BS 105 utilizes an AL of 4, the BS 105 may transmit the SIB scheduling information using a PDCCH candidate 406 in CCE0 to CCE3 or CCE4 to CCE7, but may not use a PDCCH candidate 406 in or CCE8 to CCE11 shown by the cross symbol ("X"). When the BS 105 utilizes an AL of 8, the BS 105 may transmit the SIB scheduling information using a PDCCH candidate 407 in CCE0 to CCE7. In some aspects, the BS 105 may select a PDCCH candidate at a certain AL based on a desired coverage. For instance, an AL of 8 may provide a good cell-edge coverage.

A UE 115 may monitor for SIB scheduling information by performing blind decoding to search for a PDCCH candidate in the CORESET 1022 based on an aggregation level (AL) of 1, 2, 4, or 8. The UE 115 may puncture the portion of the CORESET 1022 outside the channel bandwidth 901, and may refrain from decoding a PDCCH candidate that is at least partially outside the channel bandwidth 901. In this regard, the UE 115 may identify a subset of the CCEs 421 that is fully within the channel bandwidth 901, and decode PDCCH candidates (e.g., the valid PDCCH candidates 404, 405, 406, and 407) from one or more CCEs 421 in the subset based on an aggregation level of 1, 2, 4, or 8.

Figure 11:
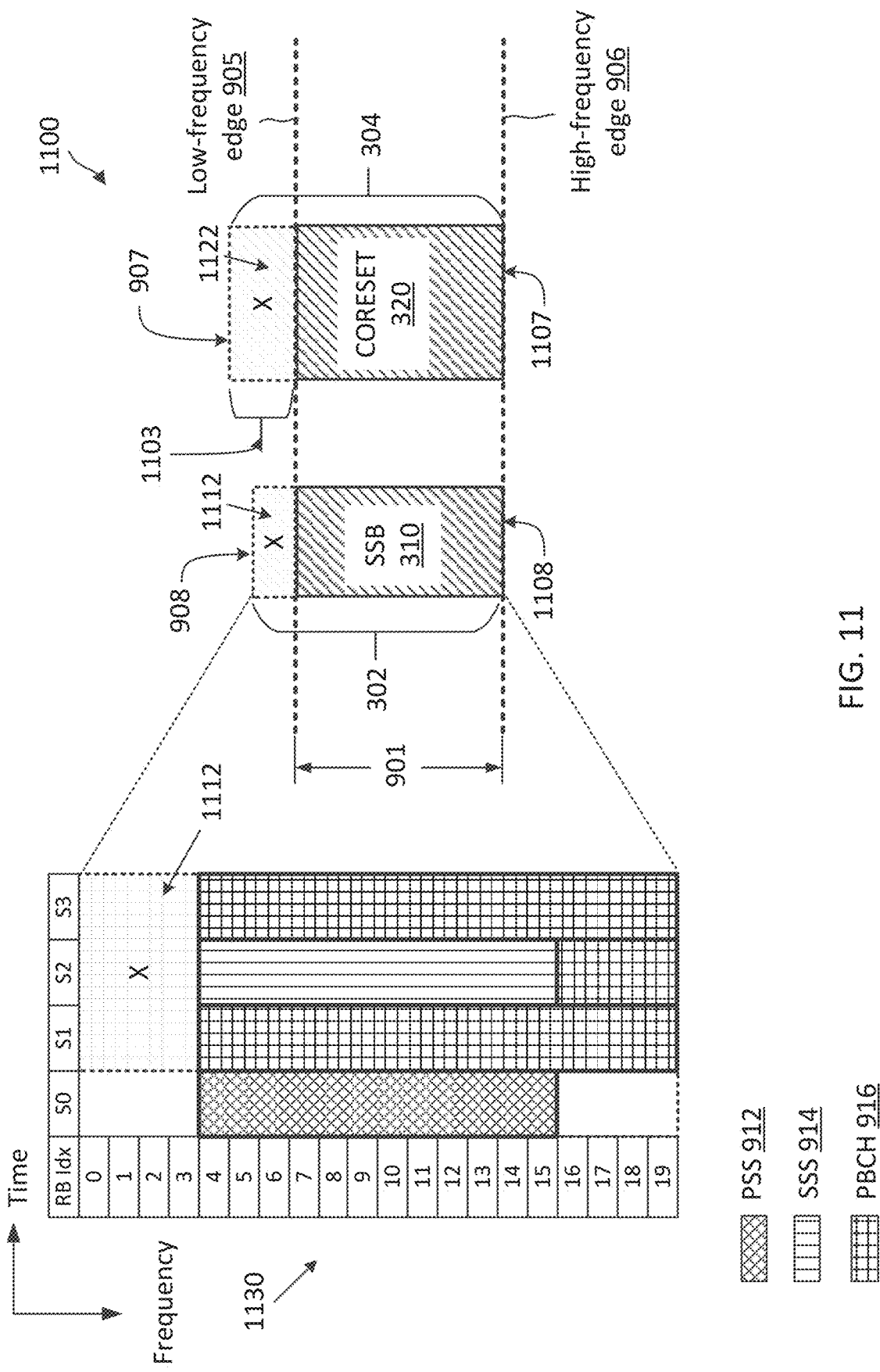
FIG. 11 illustrates an SSB and CORESET configuration scheme according to some aspects of the present disclosure.

FIG. 11 illustrates an SSB and CORESET configuration scheme 1100 according to some aspects of the present disclosure. The scheme 1100 may be employed by the network 100. In particular, a BS 105 may operate over a narrowband (e.g., with a channel bandwidth 901 of about 3 MHz) and configure and transmit an SSB and a CORESET as shown in the scheme 1100. In FIG. 11, the x-axis represents time in some arbitrary units, and the y-axis represents frequency in some arbitrary units. The scheme 1100 may use the same channel structure as discussed above with respect to FIG. 9, and may use the same reference numerals as in FIG. 9 for simplicity's sake.

Similar to the schemes 300, 500, 700, and 900, the SSB 310 may have a bandwidth 302 spanning 20 RBs (e.g., the RBs 210) at an SCS of 15 kHz, and thus the SSB bandwidth 302 is 3.6 MHz (greater than the channel bandwidth 901). FIG. 11 shows an expanded view 1130 of the SSB 310. In the expanded view 1130, the RBs in the SSB 310 are indexed from 0 to 19. The SSB 310 includes include a PSS 912 in a symbol S0, an SSS 914 in a symbol S2, and a PBCH signal 916 in symbols S1 to S3 multiplexed with the SSS 914. The PBCH signal 916 may carry a MIB including an indication of a CORESET 320. The BS 105 may transmit the SSB 310 by aligning a high-frequency edge 1108 of the SSB 310 to a high-frequency edge 906 of the channel bandwidth 901, and puncture a low-frequency portion 1112 (e.g., including 4 RBs) of the SSB 310.

The CORESET 320 may have a bandwidth 304 spanning 24 RBs (e.g., the RBs 210) at an SCS of 15 kHz, and thus the CORESET bandwidth 304 is 4.32 MHz (greater than the channel bandwidth 901). The BS 105 may configure the CORESET 320 such that a high-frequency edge 1107 of the CORESET 320 is aligned to the high-frequency edge 1108 of the SSB 310. As shown, the low-frequency edge 907 of the CORESET 320 is offset from the low-frequency edge 908 of the SSB 310 (e.g., by an offset 1103 of 4 RBs). The BS 105 may puncture a low-frequency portion 1122 of the CORESET 320 shown by the cross symbol ("X"). The CORESET 320 may span one symbol (e.g., the symbols 206) in time (shown in FIG. 12A), two symbols in time (shown in FIG. 12B), or three symbols in time (shown in FIG. 12C).

Figure 12A:
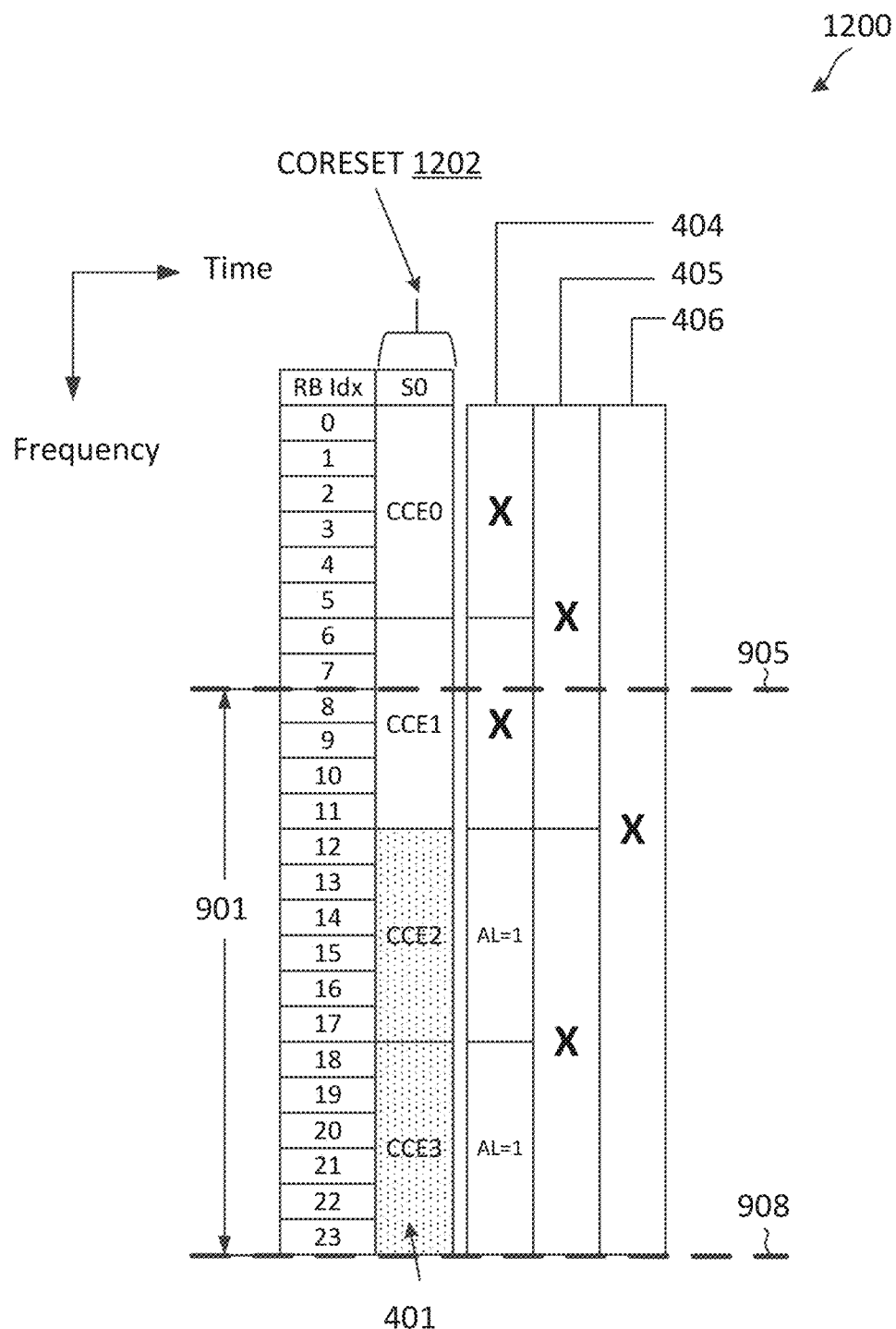
FIG. 12A illustrates a CORESET configuration scheme according to some aspects of the present disclosure.

FIG. 12A illustrates a CORESET configuration scheme 1200 according to some aspects of the present disclosure. The scheme 1200 may be employed by the network 100. In particular, a BS 105 may operate over a narrowband (e.g., with a bandwidth of about 3 MHz) and configure a CORESET as shown in the scheme 1200. In FIG. 12A, the x-axis represents time in some arbitrary units, and the y-axis represents frequency in some arbitrary units. The scheme 1200 is described using a similar CORESET and PDCCH candidate structure as in FIGS. 4A, 6A, 8A, and 10A, and may use the same reference numerals as in FIGS. 4A, 6A, 8A, and 10A for simplicity's sake.

In the illustrated example of FIG. 12A, a CORESET 1202 is offset from the high-frequency edge 906 of a channel bandwidth 901 (of 3 MHz) by four RBs (e.g., the RBs 210). The CORESET 1202 may correspond to the CORESET 320 of FIG. 3 and may be substantially similar to the CORESET 402 of FIG. 4A, the CORESET 602 of FIG. 6A, the CORESET 802 of FIG. 8A, and/or the CORESET 1002 of FIG. 10A. As shown, the CORESET 1202 spans one symbol S0 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 1202 includes four CCEs 401 indexed from 0 to 3 (shown as CCE0 to CCE3).

Since the CORESET 1202 has a wider bandwidth than the channel bandwidth 901, the CORESET 1202 may include a first portion fully within the channel bandwidth 901 and a second portion outside the channel bandwidth 901. As shown in FIG. 8A, CCE2 and CCE3 (the first portion) are fully within the channel bandwidth 901, while CCE0 and CCE1 (the second portion) are partially outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, when the BS 105 utilizes an AL of 1, the BS 105 may transmit SIB scheduling information using a PDCCH candidate 404 in any one of the CCE2 to CCE3, but may not use a PDCCH candidate 404 in CCE0 or CCE1 shown by the cross symbols ("X"). The BS 105 may not use a PDCCH candidate 405 at an AL of 2 or a PDCCH candidate 406 at a AL of 4 shown by the cross symbols ("X") since there is no PDCCH candidate 405 or 406 fully within the channel bandwidth 901.

A UE 115 may monitor for SIB scheduling information by performing blind decoding to search for a PDCCH candidate in the CORESET 1202 based on an aggregation level (AL) of 1. The UE 115 may puncture the portion of the CORESET 1202 outside the channel bandwidth 901, and refrain from decoding a PDCCH candidate that is at least partially outside the channel bandwidth 901. In this regard, the UE 115 may identify a subset of the CCEs 401 that is fully within the channel bandwidth 901, and decode PDCCH candidates (e.g., the valid PDCCH candidates 404) from one or more CCEs 401 in the subset based on an aggregation level of 1.

Figure 12B:
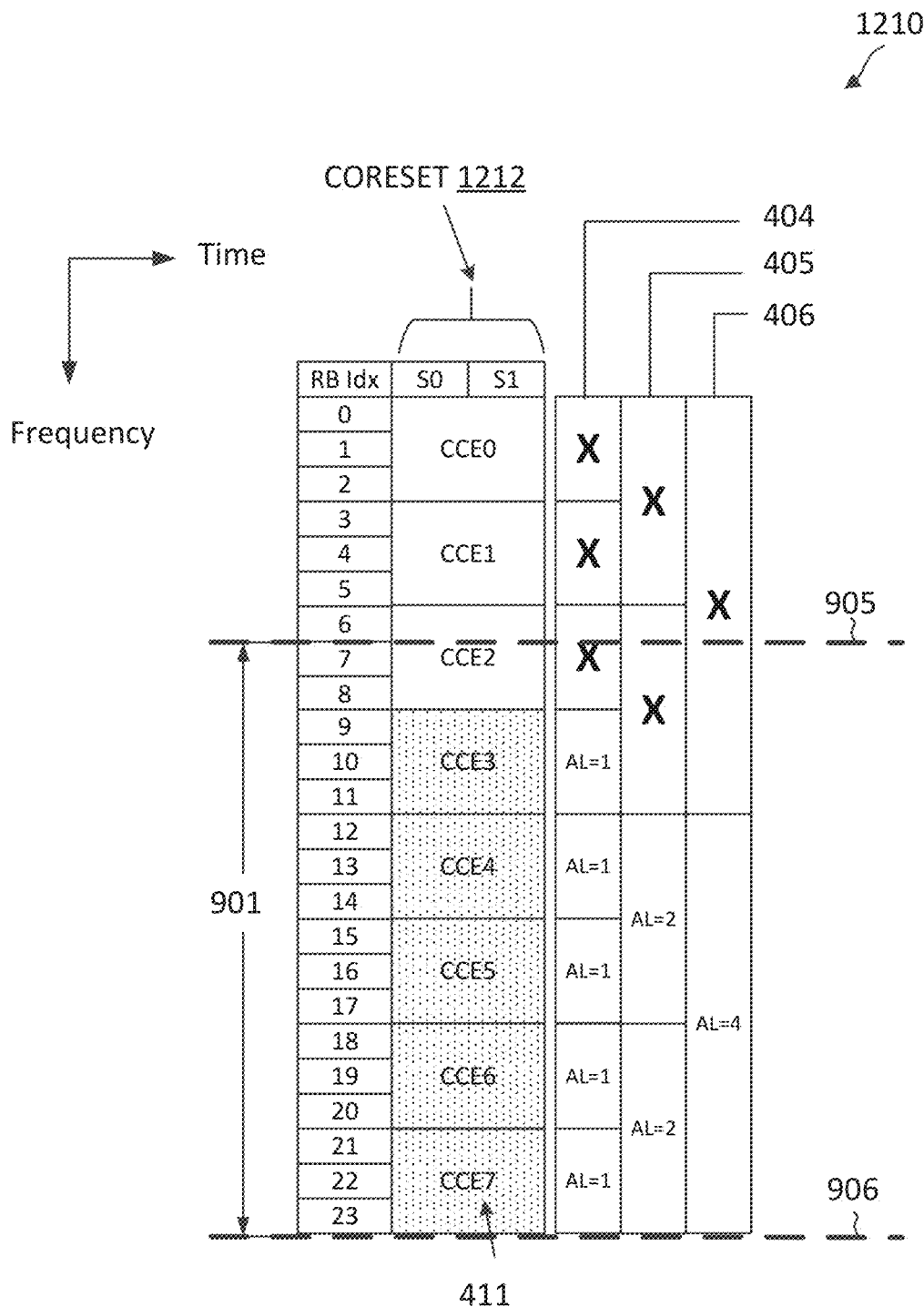
FIG. 12B illustrates a CORESET configuration scheme according to some aspects of the present disclosure.

FIG. 12B illustrates a CORESET configuration scheme 1210 according to some aspects of the present disclosure. The scheme 1210 may be employed by the network 100. In particular, a BS 105 may operate over a narrowband (e.g., with a bandwidth of about 3.6 MHz) and configure a CORESET as shown in the scheme 1210. In FIG. 12B, the x-axis represents time in some arbitrary units, and the y-axis represents frequency in some arbitrary units. The scheme 1210 is described using a similar CORESET and PDCCH candidate structure as in FIGS. 4B, 6B, 8B, and 10B, and may use the same reference numerals as in FIGS. 4B, 6B, 8B, and 10B for simplicity's sake.

In the illustrated example of FIG. 12B, a CORESET 1212 is offset from the high-frequency edge 906 of a channel bandwidth 901 (of 3 MHz) by four RBs (e.g., the RBs 210). The CORESET 1212 may correspond to the CORESET 320 of FIG. 3 and may be substantially similar to the CORESET 412 of FIG. 4B, the CORESET 612 of FIG. 6B, the CORESET 812 of FIG. 8B, and/or the CORESET 1012 of FIG. 10B. As shown, the CORESET 1212 spans two symbols S0 and S1 (e.g., the symbol 206) in time and twenty-four RBs (e.g., the RBs 210) (indexed from 0 to 23) at an SCS of 15 kHz) in frequency (corresponding to a bandwidth of 4.32 MHz. The CORESET 1212 includes eight CCEs 411 are indexed from 0 to 7 (shown as CCE0 to CCE7).

Since the CORESET 1212 has a wider bandwidth than the channel bandwidth 901, the CORESET 1212 may include a first portion fully within the channel bandwidth 901 and a second portion outside the channel bandwidth 901. As shown in FIG. 12B, CCE3 to CCE7 (the first portion) are fully within the channel bandwidth 901, while CCE0 to CCE2 (the second portion) are partially or fully outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, when the BS 105 utilizes an AL of 1, the BS 105 may transmit SIB scheduling information using a PDCCH candidate 404 in any of one of CCE3 to CCE7, but may not use a PDCCH candidate 404 in CCE0 shown by the cross symbols ("X"). When the BS 105 utilizes an AL of 2, the BS 105 may transmit the SIB scheduling information using a PDCCH candidate 405 in CCE4 and CCE5 or CCE 6 and CCE7, but may not use a PDCCH candidate 405 in CCE0 and CCE1 or CCE2 and CCE3 shown by the cross symbol ("X"). When the BS 105 utilizes an AL of 4, the BS 105 may transmit the SIB scheduling information using a PDCCH candidate 406 in CCE4 and CCE7, but may not use a PDCCH candidate 406 in CCE0 to CCE3 shown by the cross symbol ("X"). In some aspects, the BS 105 may select a PDCCH candidate at a certain AL based on a desired coverage.

A UE 115 may monitor for SIB scheduling information by performing blind decoding to search for a PDCCH candidate in the CORESET 1212 based on an aggregation level (AL) of 1, 2 or 4. The UE 115 may puncture the portion of the CORESET 1212 outside the channel bandwidth 901, and refrain from decoding a PDCCH candidate that is at least partially outside the channel bandwidth 901. In this regard, the UE 115 may identify a subset of the CCEs 411 that is fully within the channel bandwidth 901, and decode PDCCH candidates (e.g., the valid PDCCH candidates 404, 405, and 406) from one or more CCEs 411 in the subset based on an aggregation level of 1, 2, or 4.

Figure 12C:
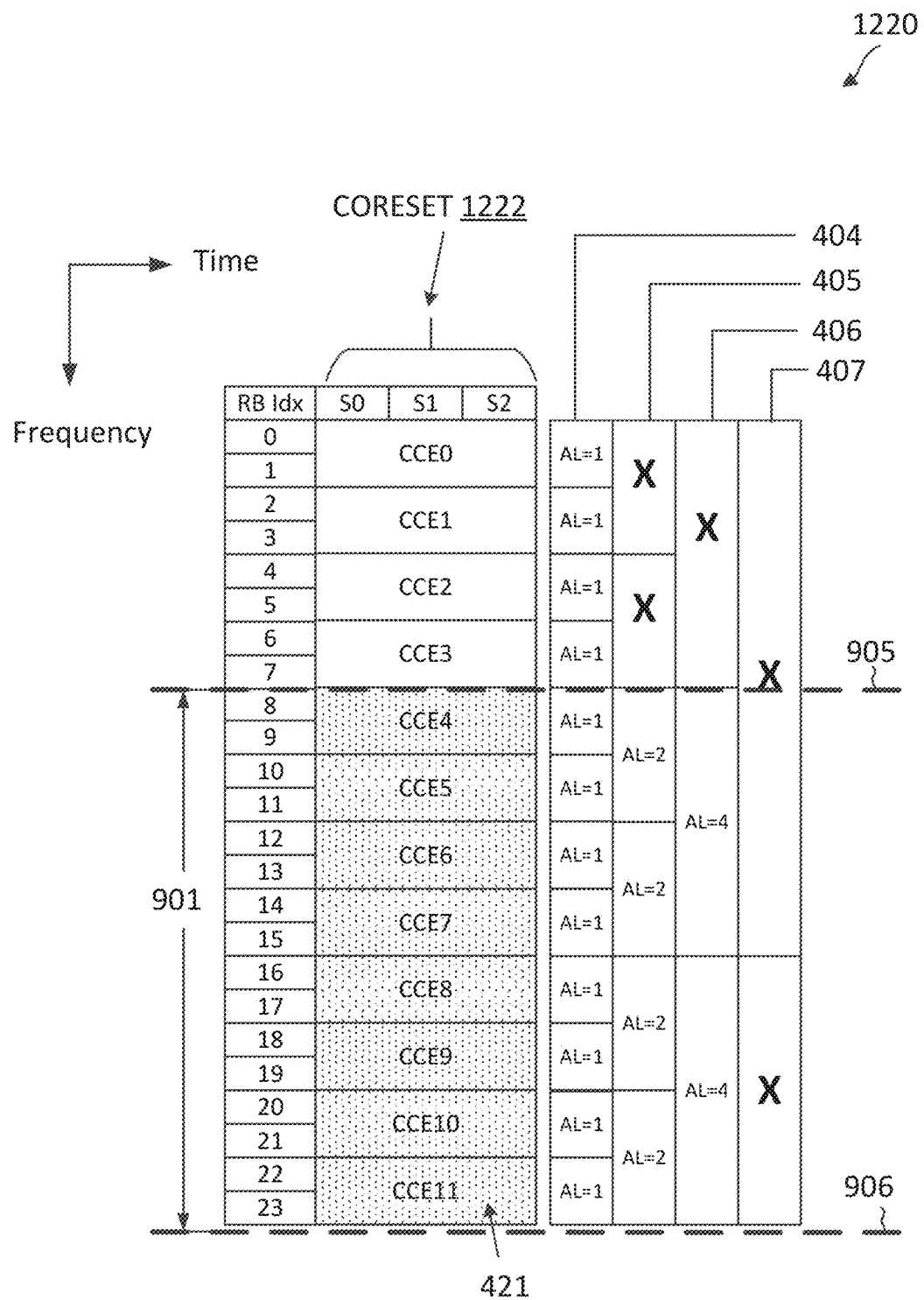
FIG. 12C illustrates a CORESET configuration scheme according to some aspects of the present disclosure.

FIG. 12C illustrates a CORESET configuration scheme 1220 according to some aspects of the present disclosure. The scheme 1220 may be employed by the network 100. In particular, a BS 105 may operate over a narrowband (e.g., with a bandwidth of about 3 MHz) and configure a CORESET as shown in the scheme 1220. In FIG. 12C, the x-axis represents time in some arbitrary units, and the y-axis represents frequency in some arbitrary units. The scheme 1220 is described using a similar CORESET and PDCCH candidate structure as in FIGS. 4C, 6C, 8C, and 10C, and may use the same reference numerals as in FIGS. 4C, 6C, 8C, and 10C for simplicity's sake.

In the illustrated example of FIG. 12C, a CORESET 1222 is aligned to the high-frequency edge 906 of a channel bandwidth 901 (of 3 MHz). The CORESET 1222 may correspond to the CORESET 320 of FIG. 3 and may be substantially similar to the CORESET 422 of FIG. 4C, the CORESET 622 of FIG. 6C, the CORESET 822 of FIG. 8C, and/or the CORESET 1022 of FIG. 10C. The CORESET 1222 spans three symbols S0, S1, and S2 (e.g., the symbol 206) in time and twenty-four RBs (e.g., the RBs 210) (indexed from 0 to 23) at an SCS of 15 kHz in frequency (corresponding to a bandwidth of 4.32 MHz). The CORESET 1222 includes twelve CCEs 421 indexed from 0 to 11 (shown as CCE0 to CCE11).

Since the CORESET 1222 has a wider bandwidth than the channel bandwidth 901, the CORESET 1222 may include a first portion fully within the channel bandwidth 901 and a second portion outside the channel bandwidth 901. As shown in FIG. 12C, CCE4 to CCE11 (the first portion) are fully within the channel bandwidth 901, while CCE0 to CCE3 (the second portion) are outside the channel bandwidth 901. The BS 105 may transmit SIB scheduling information using a PDCCH candidate that is fully within the channel bandwidth 901, but may not use a PDCCH candidate that is partially outside the channel bandwidth 901 or fully outside the channel bandwidth 901. For instance, when the BS 105 utilizes an AL of 1, the BS 105 may transmit SIB scheduling information using a PDCCH candidate 404 in any of one of CCE4 to CCE11, but may not use a PDCCH candidate 404 in CCE0 to CCE3 shown by the cross symbols ("X"). When the BS 105 utilizes an AL of 2, the BS 105 may transmit the SIB scheduling information using a PDCCH candidate 405 in CCE4 and CCE5, CCE 6 and CCE7, CCE8 and CCE9, or CCE 10 and CCE 11, but may not use a PDCCH candidate 405 in CCE0 and CCE1 or CCE2 and CCE3 shown by the cross symbol ("X"). When the BS 105 utilizes an AL of 4, the BS 105 may transmit the SIB scheduling information using a PDCCH candidate 406 in CCE4 to CCE7 or CCE8 to CCE11, but may not use a PDCCH candidate 406 in CCE0 to CCE3 shown by the cross symbol ("X"). The BS 105 may not use a PDCCH candidate 407 at an AL of 8 shown by the cross symbols ("X") since there is no PDCCH candidate 407 fully within the channel bandwidth 901. In some aspects, the BS 105 may select a PDCCH candidate at a certain AL based on a desired coverage.

A UE 115 may monitor for SIB scheduling information by performing blind decoding to search for a PDCCH candidate in the CORESET 1222 based on an aggregation level (AL) of 1, 2, 4, or 8. The UE 115 may puncture the portion of the CORESET 1222 outside the channel bandwidth 901, and refrain from decoding a PDCCH candidate that is at least partially outside the channel bandwidth 901. In this regard, the UE 115 may identify a subset of the CCEs 421 that is fully within the channel bandwidth 901, and decode PDCCH candidates (e.g., the valid PDCCH candidates 404, 405, 406, and 407) from one or more CCEs 421 in the subset based on an aggregation level of 1, 2, 4, or 8.

Figure 13:
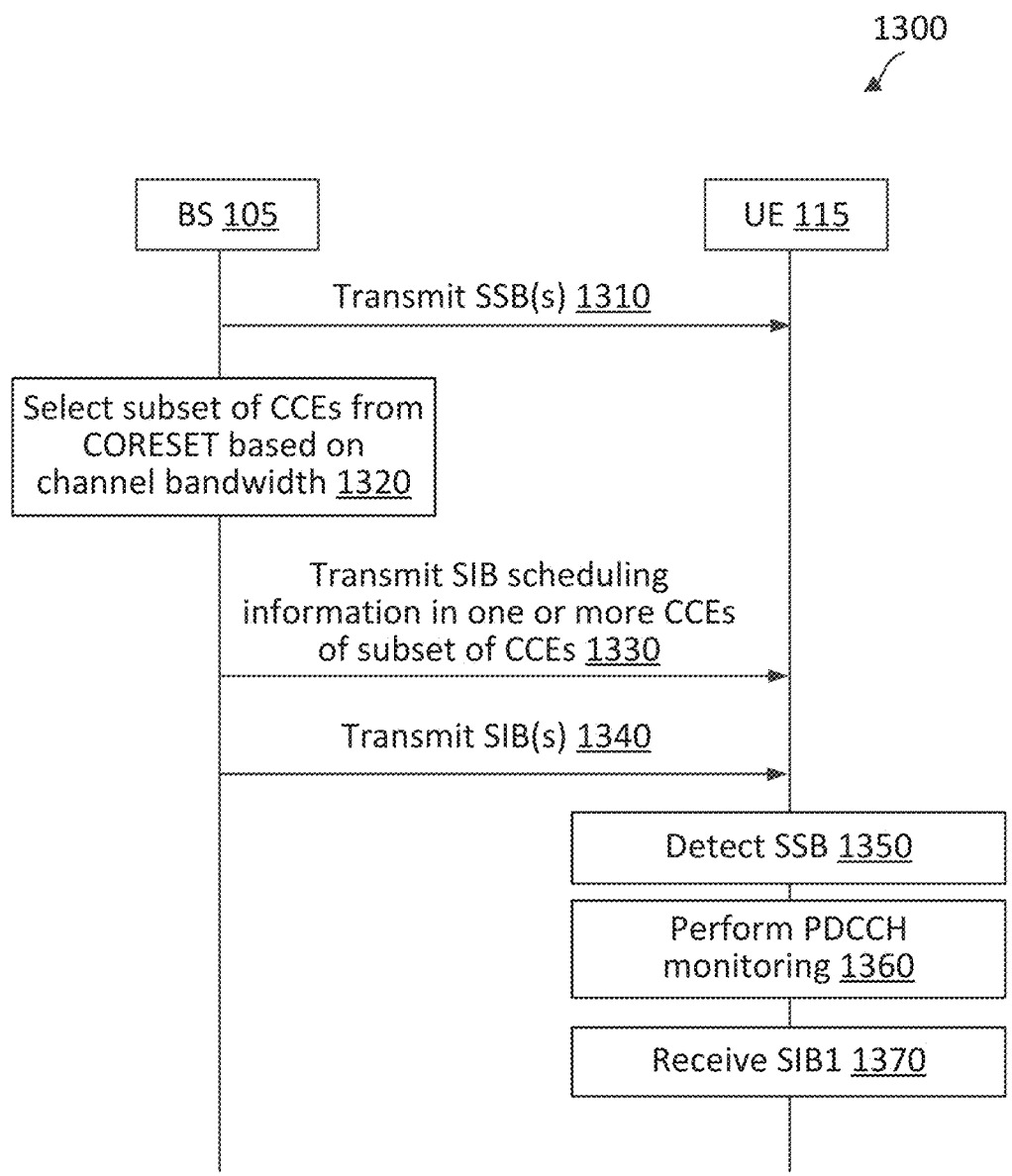
FIG. 13 is a sequence diagram illustrating a communication method according to some aspects of the present disclosure.

FIG. 13 is a sequence diagram illustrating a communication method 1300 according to some aspects of the present disclosure. The method 1300 may be performed by a network such as the network 100. More specifically, the method 1300 is performed by a BS 105 and a UE 115 when communicating over a narrow frequency band, for example, with a channel bandwidth narrower than the minimum bandwidth of a CORESET and/or an SSB. The method 1300 may utilize similar mechanisms as discussed above with respect to FIGS. 3, 4A-4C, 5, 6A-6C, 7, 8A-8C, 9, 10A-10C, 11, and 12A-12C. In some aspects, the BS 105 may utilize one or more components, such as the processor 1402, the memory 1404, the SSB/CORESET module 1408, the transceiver 1410, the modem 1412, and the one or more antennas 1416 shown in FIG. 14, to execute the actions of the method 1300. The UE 115 may utilize one or more components, such as the processor 1502, the memory 1504, the CORESET module 1508, the transceiver 1510, the modem 1512, and the one or more antennas 1516 shown in FIG. 15, to execute the actions of the method 1300.

At action 1310, the BS 105 transmits one or more SSBs over a narrow frequency band, for example, to facilitate initial network access. The BS 105 may transmit the SSBs periodically, for example, at a periodicity of about 10 ms, 20 ms, 40 ms, 80 ms or more. The SSBs may be similar to the SSBs 310. Each SSB may include a PSS, an SSS, and/or a PBCH signal. In some aspects, the SSBs may span 20 RBs (e.g., the RBs 210) at an SCS of 15 kHz in frequency, and thus the SSBs may have a frequency bandwidth of 3.6 MHz. In one aspect, the narrow frequency band may have a channel bandwidth of 3.6 MHz. Accordingly, the BS 105 may transmit the SSBs fully within the channel bandwidth as discussed above with respect to FIGS. 3, 5, and 7. In another aspect, the narrow frequency band may have a channel bandwidth of 3 MHz, which is less than the SSB bandwidth of 3.6 MHz. The BS 105 may transmit the SSB with the same SSB signal structure, but may puncture a portion of the SSB that is outside the channel bandwidth. For instance, the BS 105 may align a lowest-frequency RB of the SSB to a lowest-frequency RB in the channel bandwidth, and puncture a high-frequency portion of the SSB as shown in FIG. 9. Alternatively, the BS 105 may align a highest-frequency RB of the SSB to a highest-frequency RB in the channel bandwidth, and puncture a low-frequency portion of the SSB as shown in FIG. 11.

The SSBs may include an indication of a CORESET where SIB scheduling information may be transmitted. The CORESET may be similar to the CORESETs 320, 402, 412, 422, 602, 612, 622, 802, 812, 822, 1002, 1012, 1022, 1202, 1212, and/or 1222. The CORESET may span 24 RBs (e.g., the RBs 210) at an SCS of 15 kHz in frequency, and thus the CORESET may have a frequency bandwidth of 4.32 MHz, which is greater than the channel bandwidth of 3.6 MHz or 3 MHz. The BS 105 may place the CORESET relative to the SSB in various ways.

In one aspect, the BS 105 may align a low-frequency edge (a lowest-frequency RB) of the CORESET to a low-frequency edge (a lowest-frequency RB) of the SSB, for example, as discussed above with respect to FIGS. 3, 4A-4C, 9, and 10A-10C. Thus, the CORESET may include a first portion fully within the channel bandwidth and a second portion outside the channel bandwidth, where the first portion may be lower in frequency than the second portion. In some instance, the SSB may indicate a zero RB offset for the CORESET relative to the SSB at the low-frequency edge. For instance, the SSB may indicate a starting RB offset of 0 for the CORESET relative to the SSB, where a start RB may refer to a lowest-frequency RB.

In another aspect, the BS 105 may align a high-frequency edge (a highest-frequency RB) of the CORESET to a high-frequency edge (a highest-frequency RB) of the SSB, for example, as discussed above with respect to FIGS. 7, 8A-8C, 11, and 12A-12C. Thus, the CORESET may include a first portion fully within the channel bandwidth and a second portion outside the channel bandwidth, where the first portion may be higher in frequency than the second portion. In some instance, the SSB may indicate an offset of 4 RBs for the CORESET relative to the SSB at the low-frequency edge. For instance, the SSB may indicate a starting RB offset of 4 for the CORESET relative to the SSB.

In yet another aspect, the BS 105 may align the SSB to a central frequency portion of the CORESET, for example, as discussed above with respect to FIGS. 5, 6A-6C. Thus, the CORESET may include a first portion fully within the channel bandwidth and a second portion outside the channel bandwidth, where the first portion may be between a first sub-portion and a second sub-portion of the second portion in frequency. In some instance, the SSB may indicate an offset of 2 RBs for the CORESET relative to the SSB at the low-frequency edge. For instance, the SSB may indicate a starting RB offset of 2 for the CORESET relative to the SSB. Accordingly, the first portion and the second portion of the CORESET are dependent on the starting RB offset for the CORESET relative to the SSB.

At action 1320, the BS 105 selects a subset of CCEs from the CORESET based on the channel bandwidth. For instance, the CORESET may span one symbol, two symbols, or three symbols in time. The CORESET may include a plurality of CCEs (e.g., the CCEs 401, 411, 421). The first portion of the CORESET may include a subset of the CCEs less than all CCEs of the plurality of CCEs. The BS 105 may select the subset of CCEs from the first portion (that is within the channel bandwidth).

At action 1330, the BS 105 transmits SIB scheduling information (e.g., a PDCCH DCI) in one or more CCEs of the subset of CCEs. The SIB scheduling information indicate a resource (e.g., a time-frequency resource in a PDSCH) where the BS 105 may transmit a SIB. The BS 105 may transmit the SIB scheduling information using a PDCCH candidate formed from an aggregation of the one or more CCEs. The aggregation level can be 1, 2, 4, or 8 depending on the CORESET placement. As explained above, the BS 105 may use a PDCCH candidate that is fully within the channel bandwidth for transmitting the SIB scheduling information.

In some aspects, the BS 105 may also transmit a DMRS in the CORESET to facilitate PDCCH decoding at the UE 115. The DMRS may be a predetermined sequence. The DMRS may include one or more pilot symbols distributed in frequency (e.g., occupying) one or more frequency subcarriers (e.g., the subcarriers 204) within the CORESET and/or distributed in time (e.g., occupying one or more symbols (e.g., the symbols 206) within the CORESET. Since the second portion of the CORESET is outside the channel bandwidth, the BS 105 may puncture the portion of the DMRS that is within the second portion. In other words, the DMRS may have a smaller bandwidth after the puncture. As such, the BS 105 can apply power boosting to the DMRS transmission. For instance, a DMRS in a PDCCH or CORESET may be transmitted with am EPRE that is relative to an EPRE of an SSS in an SSB in a range between [−8, 8] decibels. An EPRE of a signal may refer to a linear average transmit power over the power contributions of all REs (e.g., the REs 212) that carry the signal. The BS 105 may apply a power boosting offset, denoted as K decibel, to the range [−8, 8] decibels. In other words, the BS 105 may use a reference transmit power based on the EPRE ratio (e.g., in the range [−8, 8] decibels) between the PDCCH DMRS and the SSS when there is no puncturing applied to the PDCCH DMRS, and may use a first transmit power higher than the reference transmit power when puncturing is applied to the PDCCH DMRS. Referring to the example discussed above where the CORESET includes 24 RBs and the first portion includes 20 RBs, the BS 105 may increase the transmit power for the PDCCH DMRS by a factor of 10×log 10(24/20) from the reference transmit power.

At action 1340, the BS 105 transmit one or more SIBs (in a PDSCH) as scheduled by the SIB scheduling information.

At action 1340, the UE 115 may monitor for SSB and may detect an SSB from the one or more SSBs transmitted by the BS 105. In some instances, depending on the channel bandwidth, the UE 115 may receive the SSB based on puncturing a portion of the SSB, for example, when the channel bandwidth (e.g., 3 MHz) is narrower than the SSB bandwidth (e.g., 3.6 MHz) as discussed above. The UE 115 may obtain a configuration of the CORESET based on the CORESET indication include in the SSB.

At action 1360, the UE 115 performs PDCCH monitoring in the first portion (within the channel bandwidth) of the CORESET. In this regard, the UE 115 may identify the subset of CCEs of the CORESET that are within the first portion (or channel bandwidth). The UE 115 may decode a PDCCH candidate from one or more CCEs of the subset of CCEs based on an aggregation level of 1, 2, 4, or 8. The aggregation level may be dependent on the configuration or placement of the CORESET in frequency. The UE 115 may decode a PDCCH candidate that is fully within the channel bandwidth. Thus, in some instances, the UE 115 may perform decoding for a set of PDCCH candidate at an aggregation level of 1, but not for a higher aggregation level. In some other instances, the UE 115 may perform decoding for a set of PDCCH candidate at an aggregation level of 1 or 2, but not for a higher aggregation level. In yet some other instances, the UE 115 may perform decoding for a set of PDCCH candidate at an aggregation level of 1, 2, or 4, but not for a higher aggregation level. In further instances, the UE 115 may perform decoding for a set of PDCCH candidate at an aggregation level of 1, 2, 4, or 8. If the UE 115 successfully decoded a PDCCH candidate, the UE 115 may obtain SIB scheduling information from the decoded PDCCH.

At action 1370, upon receiving the SIB scheduling information, the UE 115 may receive one or more SIBs (e.g., SIB1) in a PDSCH according to the SIB scheduling information. In some aspects, the SIB may provide information about perform a random access procedure and/or various other information about the network. For instance, the SIB may indicate random access parameters (e.g., a range of random access preamble indices related to random access sequence generation) and/or random access resources. Accordingly, the UE 115 may proceed to perform a random access procedure with the BS 105 in accordance with the random access parameters and/or resources indicated by the SIB, for example, as discussed above with respect to FIG. 1.

Figure 14:
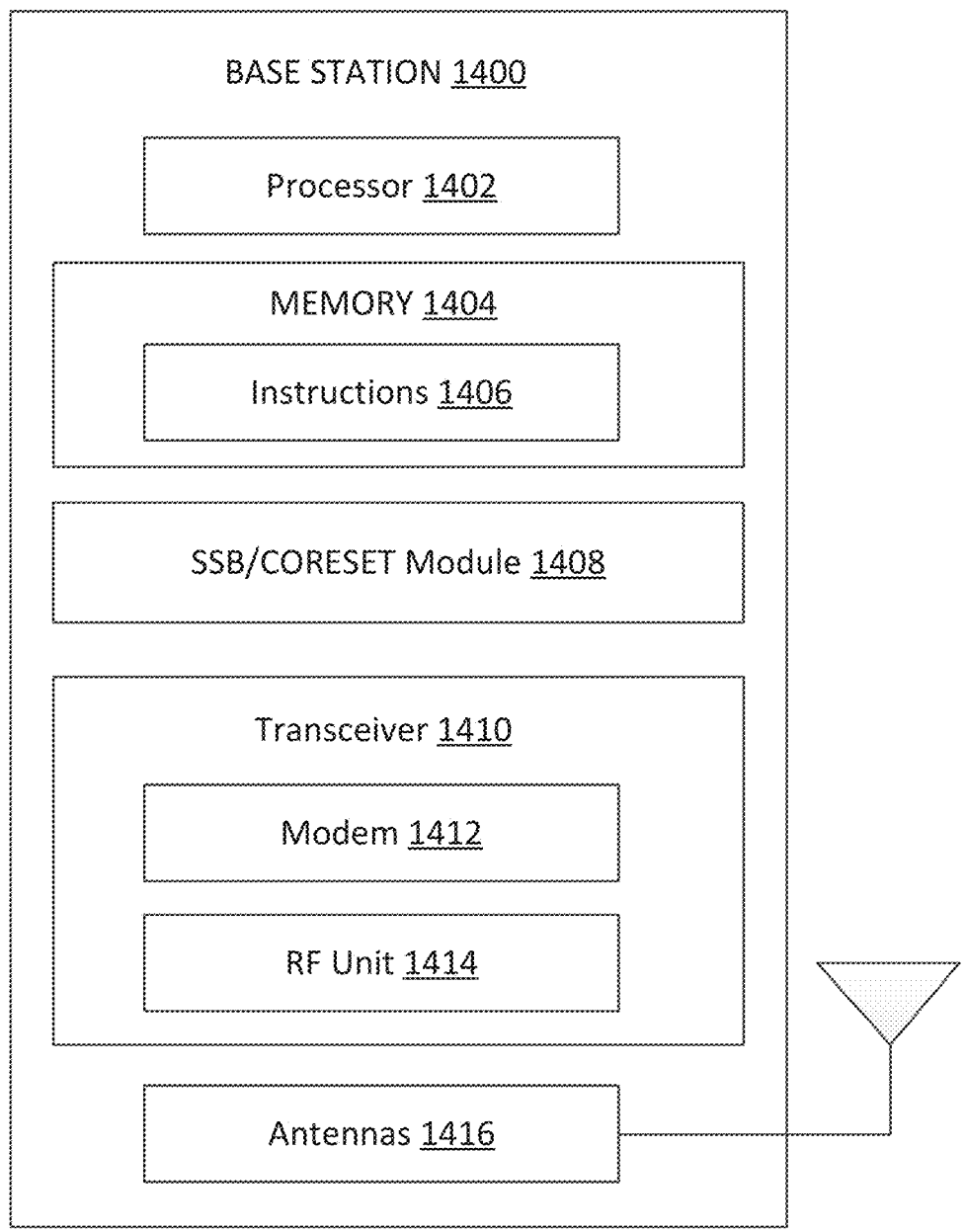
FIG. 14 illustrates a block diagram of a base station (BS) according to some aspects of the present disclosure.

FIG. 14 is a block diagram of an exemplary BS 1400 according to some aspects of the present disclosure. The BS 1400 may be a BS 115 as discussed in FIGS. 1-3, 4A-4C, 5, 6A-6C, 7, 8A-8C, 9, 10A-10C, 11, 12A-12C, 13, and 17. A shown, the BS 1400 may include a processor 1402, a memory 1404, a SSB/CORESET module 1408, a transceiver 1410 including a modem subsystem 1412 and a RF unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1-3, 4A-4C, 5, 6A-6C, 7, 8A-8C, 9, 10A-10C, 11, 12A-12C, 13, and 17. Instructions 1406 may also be referred to as program code. The program code may be for causing a wireless communication device to perform these operations, for example by causing one or more processors (such as processor 1402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SSB/CORESET module 1408 may be implemented via hardware, software, or combinations thereof. For example, the SSB/CORESET module 1408 may be implemented as a processor, circuit, and/or instructions 1406 stored in the memory 1404 and executed by the processor 1402. In some examples, the SSB/CORESET module 1408 can be integrated within the modem subsystem 1412. For example, the SSB/CORESET module 1408 can be implemented by a combination of software components (e.g., executed by a DSP or a general processor) and hardware components (e.g., logic gates and circuitry) within the modem subsystem 1412. The SSB/CORESET module 1408 may communicate with one or more components of BS 1400 to implement various aspects of the present disclosure, for example, aspects of FIGS. 1-3, 4A-4C, 5, 6A-6C, 7, 8A-8C, 9, 10A-10C, 11, 12A-12C, 13, and 17.

For instance, the SSB/CORESET module 1408 is configured to determine a first portion of a CORESET based on a channel bandwidth. The first portion is within the channel bandwidth, and the CORESET includes a second portion outside the channel bandwidth. In other words, the CORESET may have a frequency bandwidth wider than the channel bandwidth. For instance, the CORESET may have a bandwidth of about 4.32 MHz, and the channel bandwidth may be about 3 MHz or 3.6 MHz. In some aspects, the CORESET includes a plurality of CCEs, and the first portion of the CORESET includes a subset of the plurality of CCEs less than all CCEs of the plurality of CCEs. In some aspects, as part of determining the first portion of the CORESET, the SSB/CORESET module 1408 is configured to select the subset of the plurality of CCEs from the first portion of the CORESET. In one aspect, the first portion is at a lower frequency than the second portion of the CORESET, for example, as discussed above with respect to FIGS. 3, 4A-4C, 9, and 10A-10C. In another aspect, the first portion is at a higher frequency than the second portion of the CORESET, for example, as discussed above with respect to FIGS. 7, 8A-8C, 11 and 12A-12C. In yet another aspect, the first portion is between a first sub-portion and a second sub-portion of the second portion of the CORESET in frequency, for example, as discussed above with respect to FIGS. 5 and 6A-6C.

The SSB/CORESET module 1408 is further configured to transmit SIB scheduling information in the first portion of the CORESET. The SIB scheduling information indicate a resource (e.g., a time-frequency resource in a PDSCH) where the BS 1400 may transmit a SIB. In some aspects, as part of transmitting the SIB scheduling information, the SSB/CORESET module 1408 is configured to transmit the SIB scheduling information in one or more CCEs of the subset of the plurality of CCEs based on an aggregation level of 1, 2, 4, or 8. In some aspects, as part of transmitting the SIB scheduling information, the SSB/CORESET module 1408 is configured to transmit a reference signal (e.g., a DMRS) in the CORESET. The BS may puncture a portion of the reference signal in the second portion of the CORESET. The BS may also increase a transmit power for the reference signal from a reference transmit power based on the puncturing of the reference signal, for example, as discussed above with respect to action 1330 of the method 1300. For instance, the BS may use the reference transmit power if there is no puncturing applied to the reference signal. The SSB/CORESET module 1408 is further configured to transmit a SIB according to the SIB scheduling information.

In some aspects, the SSB/CORESET module 1408 is further configured to transmit an SSB (e.g., the SSBs 310) including an indication of the CORESET, where at least one of a lowest-frequency RB associated with the CORESET is offset from a lowest frequency RB associated with the SSB or a highest-frequency RB associated with the CORESET is offset from a highest frequency RB associated with the SSB. In some aspects, the SSB may indicate a RB offset for a lowest-frequency RB of the CORESET relative to a lowest-frequency RB of the SSB. For instance, the SSB may indicate an RB offset of 0 for the CORESET placement as shown in FIGS. 3, 4A-4C, 9, and 10A-10C. Alternatively, the SSB may indicate an RB offset of 2 for the CORESET placement as shown in FIGS. 5 and 6A-6C. Yet alternatively, the SSB may indicate an RB offset of 4 for the CORESET placement as shown in FIGS. 7, 8A-8C, 11 and 12A-12C. In some aspects, as part of transmitting the SSB, the SSB/CORESET module 1408 is configured to puncture a portion of the SSB based on the channel bandwidth, for example, when the SSB bandwidth is greater than the channel bandwidth. For instance, the SSB may have a frequency bandwidth of 3.6 MHz and the channel bandwidth may be 3 MHz as discussed above with respect to FIGS. 9 and 11.

As shown, the transceiver 1410 may include the modem subsystem 1412 and the RF unit 1414. The transceiver 1410 can be configured to communicate bi-directionally with other devices, such as the UEs 115 and/or 1400 and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., SSB, SIB, RRC configuration, PDCCH signals, etc.) from the modem subsystem 1412 (on outbound transmissions) or of transmissions originating from another source such as a UE 115 and/or UE 1400. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the BS 1400 to enable the BS 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices and provide the received data messages for processing and/or demodulation at the transceiver 1410. The transceiver 1410 may provide the demodulated and decoded data to the SSB/CORESET module 1408 for processing. The antennas 1416 may include multiple antennas of similar or different designs in order to sustain multiple transmission links.

In an aspect, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 1410 can include various components, where different combinations of components can implement different RATs.

In an example, the processor 1402 is configured to determine, based on a channel bandwidth, a first portion of a control resource set (CORESET), where the first portion is within a channel bandwidth and the CORESET includes a second portion outside the channel bandwidth. The transceiver 1410 is coupled to the processor 1402 and configured to transmit system information block (SIB) scheduling information in the first portion of the CORESET and transmit a SIB based on the SIB scheduling information.

Figure 15:
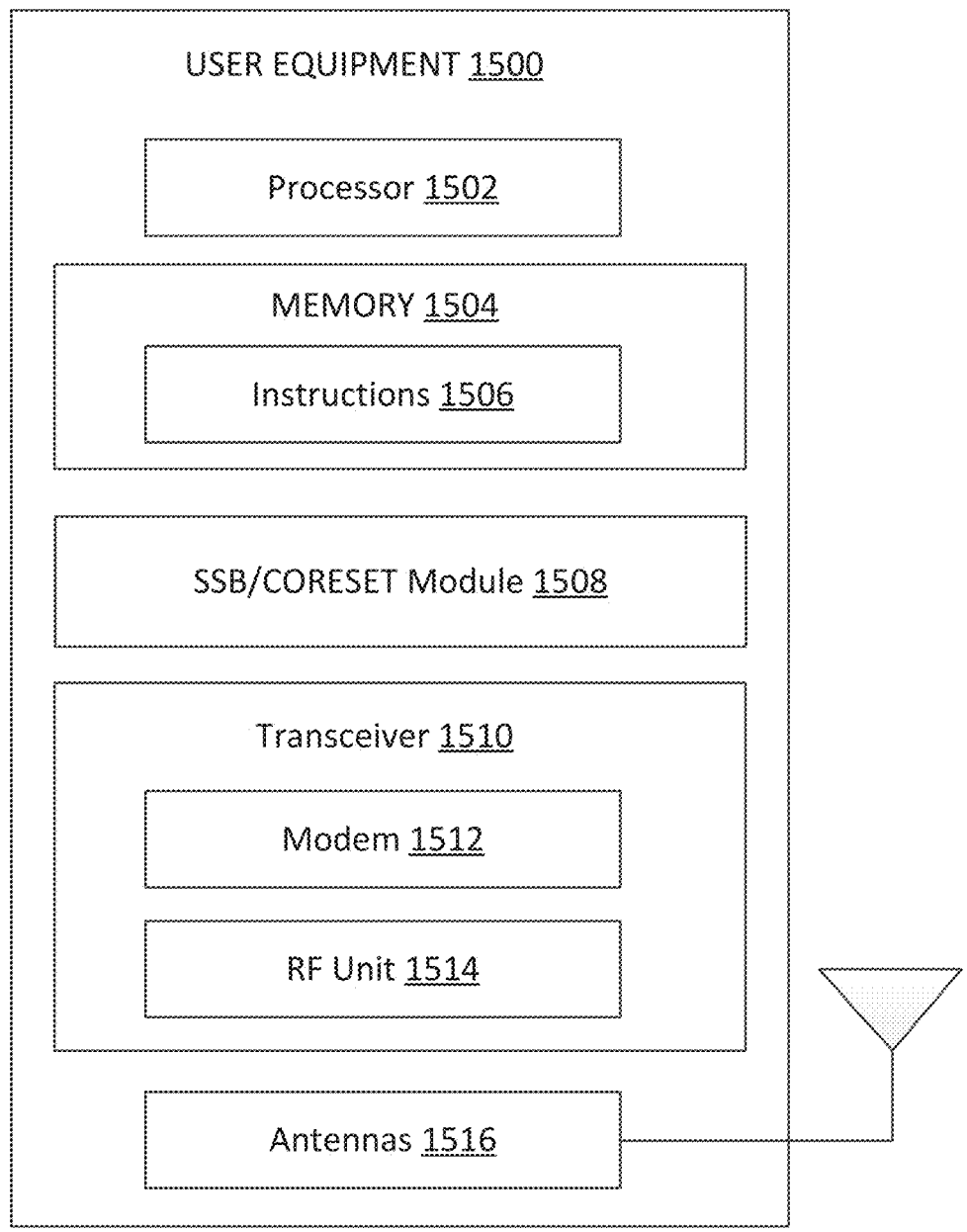
FIG. 15 illustrates a block diagram of a user equipment (UE) according to some aspects of the present disclosure.

FIG. 15 is a block diagram of an exemplary UE 1500 according to some aspects of the present disclosure. The UE 1500 may be a UE 155 as discussed above in FIGS. 1-3, 4A-4C, 5, 6A-6C, 7, 8A-8C, 9, 10A-10C, 11, 12A-12C, 13, and 16. As shown, the UE 1500 may include a processor 1502, a memory 1504, a SSB/CORESET module 1508, a transceiver 1510 including a modem subsystem 1512 and a radio frequency (RF) unit 1514, and one or more antennas 1516. These elements may be coupled with one another. The term "coupled" may refer to directly or indirectly coupled or connected to one or more intervening elements. For instance, these elements may be in direct or indirect communication with each other, for example via one or more buses.

The processor 1502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1504 includes a non-transitory computer-readable medium. The memory 1504 may store, or have recorded thereon, instructions 1506. The instructions 1506 may include instructions that, when executed by the processor 1502, cause the processor 1502 to perform the operations described herein with reference to a UE 155 or an anchor in connection with aspects of the present disclosure, for example, aspects of FIGS. 1-3, 4A-4C, 5, 6A-6C, 7, 8A-8C, 9, 10A-10C, 11, 12A-12C, 13, and 16. Instructions 1506 may also be referred to as code, which may be interpreted broadly to include any type of computer-readable statement(s) as discussed above with respect to FIG. 14.

The SSB/CORESET module 1508 may be implemented via hardware, software, or combinations thereof. For example, the SSB/CORESET module 1508 may be implemented as a processor, circuit, and/or instructions 1506 stored in the memory 1504 and executed by the processor 1502. In some aspects, the SSB/CORESET module 1508 can be integrated within the modem subsystem 1512. For example, the SSB/CORESET module 1508 can be implemented by a combination of software components (e.g., executed by a DSP or a general processor) and hardware components (e.g., logic gates and circuitry) within the modem subsystem 1512. The SSB/CORESET module 1508 may communicate with one or more components of UE 1500 to implement various aspects of the present disclosure, for example, aspects of FIGS. 1-3, 4A-4C, 5, 6A-6C, 7, 8A-8C, 9, 10A-10C, 11, 12A-12C, 13, and 16.

For instance, the SSB/CORESET module 1508 is configured to perform PDCCH monitoring in a first portion of a CORESET. The first portion is within a channel bandwidth. The CORESET includes a second portion outside the channel bandwidth. In other words, the CORESET may have a frequency bandwidth wider than the channel bandwidth. For instance, the CORESET may have a bandwidth of about 4.32 MHz, and the channel bandwidth may be about 3 MHz or 3.6 MHz. In some aspects, the CORESET includes a plurality of CCEs, and the first portion of the CORESET includes a subset of the plurality of CCEs less than all CCEs of the plurality of CCEs.

In some aspects, as part of performing the PDCCH monitoring, the SSB/CORESET module 1508 is configured to decode a PDCCH candidate from one or more CCEs of the subset of the plurality of CCEs based on an aggregation level of 1, 2, 4, or 8. In some aspects, as part of the performing the PDCCH monitoring, the SSB/CORESET module 1508 is configured to puncture one or more CCEs of the plurality of CCEs in the second portion of the CORESET. In some aspects, as part of the performing the PDCCH monitoring, the SSB/CORESET module 1508 is configured to perform the PDCCH monitoring from the subset of the plurality of CCEs in the first portion of the CORESET. In one aspect, the first portion is at a lower frequency than the second portion of the CORESET, for example, as discussed above with respect to FIGS. 3, 4A-4C, 9, and 10A-10C. In another aspect, the first portion is at a higher frequency than the second portion of the CORESET, for example, as discussed above with respect to FIGS. 7, 8A-8C, 11 and 12A-12C. In yet another aspect, the first portion is between a first sub-portion and a second sub-portion of the second portion of the CORESET in frequency, for example, as discussed above with respect to FIGS. 5 and 6A-6C.

In some aspects, as part of PDCCH monitoring, the SSB/CORESET module 1508 may successfully decode a PDCCH candidate. The decoded PDCCH candidate may include SIB scheduling information, for example, indicating a resource (e.g., a time-frequency resource in a PDSCH) where a SIB may be transmitted. In some aspects, as part of the PDCCH monitoring, the SSB/CORESET module 1508 may receive the SIB scheduling information along with a reference signal (e.g., DMRS) in the CORESET. The UE may determine that the DMRS has a first received signal power (e.g., a reference signal received power (RSRP)) that is higher than a reference received signal power, for example, due to power boosting being applied at the BS 105 as discussed above with respect to action 1330 of the method 1300.

In some aspects, the SSB/CORESET module 1508 is further configured to receive a SIB based on the PDCCH monitoring. For instance, the SSB/CORESET module 1508 is configured to receive the SIB from the PDSCH in accordance with the received SIB scheduling information.

In some aspects, the SSB/CORESET module 1508 is further configured to receive an SSB (e.g., the SSBs 310) including an indication of the CORESET, where at least one of a lowest-frequency RB associated with the CORESET is offset from a lowest frequency RB associated with the SSB or a highest-frequency RB associated with the CORESET is offset from a highest frequency RB associated with the SSB. In some aspects, the SSB may indicate a RB offset for a lowest-frequency RB of the CORESET relative to a lowest-frequency RB of the SSB. For instance, the SSB may indicate an RB offset of 0 for the CORESET placement as shown in FIGS. 3, 4A-4C, 9, and 10A-10C. Alternatively, the SSB may indicate an RB offset of 2 for the CORESET placement as shown in FIGS. 5 and 6A-6C. Yet alternatively, the SSB may indicate an RB offset of 4 for the CORESET placement as shown in FIGS. 7, 8A-8C, 11 and 12A-12C. In some aspects, as part of receiving the SSB, the SSB/CORESET module 1508 is further configured to puncture a portion of the SSB based on the channel bandwidth.

As shown, the transceiver 1510 may include the modem subsystem 1512 and the RF unit 1514. The transceiver 1510 can be configured to communicate bi-directionally with other devices, such as the BSs 105 and 1400. The modem subsystem 1512 may be configured to modulate and/or encode the data from the memory 1504 and/or the SSB/CORESET module 1508 according to a modulation and coding scheme (MCS), e.g., a low-density parity check (LDPC) coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data from the modem subsystem 1512 (on outbound transmissions) or of transmissions originating from another source such as a UE 115, a BS 105, or an anchor. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 115 to enable the UE 115 to communicate with other devices.

The RF unit 1514 may provide the modulated and/or processed data, e.g. data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., SSB, SIB, RRC configuration, etc.) to the SSB/CORESET module 1508 for processing. The antennas 1516 may include multiple antennas of similar or different designs in order to sustain multiple transmission links.

In an aspect, the UE 1500 can include multiple transceivers 1510 implementing different RATs (e.g., NR and LTE). In an aspect, the UE 1500 can include a single transceiver 1510 implementing multiple RATs (e.g., NR and LTE). In an aspect, the transceiver 1510 can include various components, where different combinations of components can implement different RATs.

In an example, the processor 1502 is configured to perform physical downlink control channel (PDCCH) monitoring in a first portion of a control resource set (CORESET), where the first portion is within a channel bandwidth and the CORESET includes a second portion outside the channel bandwidth. The transceiver 1510 is coupled to the processor and configured to receive a system information block (SIB) based on the PDCCH monitoring.

Figure 16:
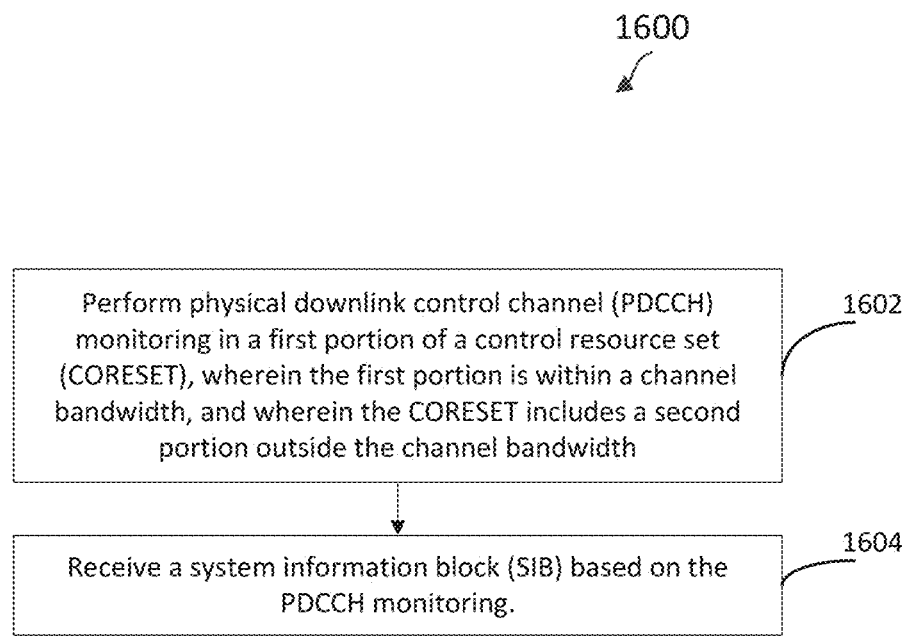
FIG. 16 is a flow diagram of a wireless communication method according to some aspects of the present disclosure.

FIG. 16 is a flow diagram illustrating a wireless communication method 1600 according to some aspects of the present disclosure. Aspects of the method 1600 can be executed by a computing device (e.g., a processor, processing circuit, and/or other suitable component) of a wireless communication device or other suitable means for performing the blocks. For example, a wireless communication device, such as the UE 115 or the UE 1500, may utilize one or more components, such as the processor 1502, the memory 1504, the SSB/CORESET module 1508, the transceiver 1510, the modem 1512, the RF unit 1514, and the one or more antennas 1516, to execute the blocks of method 1600. The method 1600 may employ similar mechanisms as described in FIGS. 1-3, 4A4C, 5, 6A-6C, 7, 8A-8C, 9, 10A-10C, 11, 12A-12C, and 13. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1602, a UE (e.g., the UE 115 or 1500) performs PDCCH monitoring in a first portion of a CORESET. The first portion is within a channel bandwidth. The CORESET includes a second portion outside the channel bandwidth. In other words, the CORESET may have a frequency bandwidth wider than the channel bandwidth. For instance, the CORESET may have a bandwidth of about 4.32 MHz, and the channel bandwidth may be about 3 MHz or 3.6 MHz. In some aspects, the CORESET includes a plurality of CCEs, and the first portion of the CORESET includes a subset of the plurality of CCEs less than all CCEs of the plurality of CCEs.

In some aspects, as part of performing the PDCCH monitoring, the UE decodes a PDCCH candidate from one or more CCEs of the subset of the plurality of CCEs based on an aggregation level of 1, 2, 4, or 8. In this regard, the UE may decode a set of one or more PDCCH candidates each from one CCE for an aggregation level of 1. The UE may additionally decode a set of one or more PDCCH candidates each from two consecutive CCEs for an aggregation level of 2, if available. The UE may further decode a set of one or more PDCCH candidates each from four consecutive CCEs for an aggregation level of 4, if available. The UE may further decode a set of one or more PDCCH candidates each from eight consecutive CCEs for an aggregation level of 8, if available. In some aspects, as part of the performing the PDCCH monitoring, the UE punctures one or more CCEs of the plurality of CCEs in the second portion of the CORESET. In some aspects, as part of the performing the PDCCH monitoring, the UE performs the PDCCH monitoring from the subset of the plurality of CCEs in the first portion of the CORESET. In one aspect, the first portion is at a lower frequency than the second portion of the CORESET, for example, as discussed above with respect to FIGS. 3, 4A-4C, 9, and 10A-10C. In another aspect, the first portion is at a higher frequency than the second portion of the CORESET, for example, as discussed above with respect to FIGS. 7, 8A-8C, 11 and 12A-12C. In yet another aspect, the first portion is between a first sub-portion and a second sub-portion of the second portion of the CORESET in frequency, for example, as discussed above with respect to FIGS. 5 and 6A-6C.

In some aspects, as part of PDCCH monitoring, the UE may successfully decode a PDCCH candidate. The decoded PDCCH candidate may include SIB scheduling information, for example, indicating a resource (e.g., a time-frequency resource in a PDSCH) where a SIB may be transmitted. In some aspects, as part of the PDCCH monitoring, the UE may receive the SIB scheduling information along with a reference signal (e.g., DMRS) in the CORESET. The UE may determine that the DMRS has a first received signal power (e.g., a reference signal received power (RSRP)) that is higher than a reference received signal power, for example, due to power boosting being applied at the BS 105 as discussed above with respect to action 1330 of the method 1300. In some aspects, means for performing the operations of block 1602 can, but not necessarily, include, the processor 1502, the memory 1504, the SSB/CORESET module 1508, the transceiver 1510, the modem 1512, the RF unit 1514, and the one or more antennas 1516 with reference to FIG. 15.

At block 1604, the UE receives a SIB based on the PDCCH monitoring. For instance, The UE may receive the SIB from the PDSCH in accordance with the received SIB scheduling information. In some aspects, means for performing the operations of block 1604 can, but not necessarily, include, the processor 1502, the memory 1504, the SSB/CORESET module 1508, the transceiver 1510, the modem 1512, the RF unit 1514, and the one or more antennas 1516 with reference to FIG. 15.

In some aspects, the UE further receives an SSB (e.g., the SSBs 310) including an indication of a starting RB offset for the CORESET relative to the SSB, where the first portion and the second portion of the CORESET are based on the starting RB offset. For instance, the SSB may indicate a starting RB offset of 0 for the CORESET placement as shown in FIGS. 3, 4A-4C, 9, and 10A-10C. Alternatively, the SSB may indicate a starting RB offset of 2 for the CORESET placement as shown in FIGS. 5 and 6A-6C. Yet alternatively, the SSB may indicate a starting RB offset of 4 for the CORESET placement as shown in FIGS. 7, 8A-8C, 11 and 12A-12C. In some aspects, as part of receiving the SSB, the UE may puncture a portion of the SSB based on the channel bandwidth.

Figure 17:
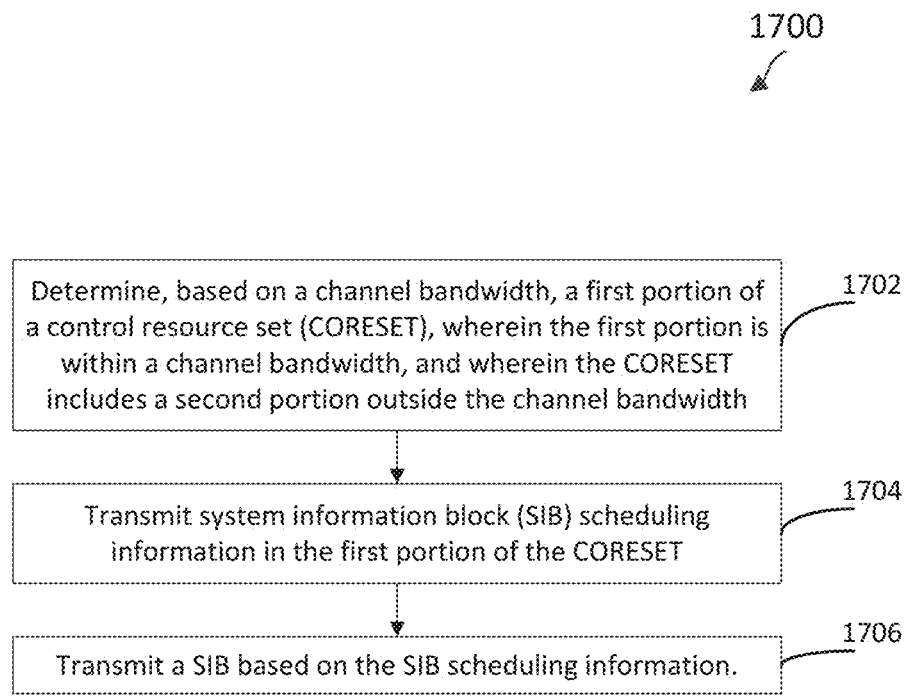
FIG. 17 is a flow diagram of a wireless communication method according to some aspects of the present disclosure.

FIG. 17 is a flow diagram illustrating a wireless communication method 1700 according to some aspects of the present disclosure. Aspects of the method 1700 can be executed by a computing device (e.g., a processor, processing circuit, and/or other suitable component) of a wireless communication device or other suitable means for performing the blocks. For example, a wireless communication device, such as the BS 105 or the BS 1400, may utilize one or more components, such as the processor 1402, the memory 1404, the SSB/CORESET module 1408, the transceiver 1410, the modem 1412, the RF unit 1414, and the one or more antennas 1416, to execute the blocks of method 1700. The method 1700 may employ similar mechanisms as described in FIGS. 1-3, 4A4C, 5, 6A-6C, 7, 8A-8C, 9, 10A-10C, 11, 12A-12C, and 13. As illustrated, the method 1700 includes a number of enumerated blocks, but aspects of the method 1700 may include additional blocks before, after, and in between the enumerated blocks. In some aspects, one or more of the enumerated blocks may be omitted or performed in a different order.

At block 1702, a BS (e.g., the BS 105 or 1400) determines, based on a channel bandwidth, a first portion of a CORESET. The first portion is within the channel bandwidth, and the CORESET includes a second portion outside the channel bandwidth. In other words, the CORESET may have a frequency bandwidth wider than the channel bandwidth. For instance, the CORESET may have a bandwidth of about 4.32 MHz, and the channel bandwidth may be about 3 MHz or 3.6 MHz. In some aspects, the CORESET includes a plurality of CCEs, and the first portion of the CORESET includes a subset of the plurality of CCEs less than all CCEs of the plurality of CCEs. In some aspects, as part of determining the first portion of the CORESET, the BS selects the subset of the plurality of CCEs from the first portion of the CORESET. In one aspect, the first portion is at a lower frequency than the second portion of the CORESET, for example, as discussed above with respect to FIGS. 3, 4A-4C, 9, and 10A-10C. In another aspect, the first portion is at a higher frequency than the second portion of the CORESET, for example, as discussed above with respect to FIGS. 7, 8A-8C, 11 and 12A-12C. In yet another aspect, the first portion is between a first sub-portion and a second sub-portion of the second portion of the CORESET in frequency, for example, as discussed above with respect to FIGS. 5 and 6A-6C. In some aspects, means for performing the operations of block 1702 can, but not necessarily, include, the processor 1402, the memory 1404, the SSB/CORESET module 1408, the transceiver 1410, the modem 1412, the RF unit 1414, and the one or more antennas 1416 with reference to FIG. 14.

At block 1704, the BS transmits SIB scheduling information in the first portion of the CORESET. The SIB scheduling information indicate a resource (e.g., a time-frequency resource in a PDSCH) where the BS may transmit a SIB. In some aspects, as part of transmitting the SIB scheduling information, the BS transmits the SIB scheduling information in one or more CCEs of the subset of the plurality of CCEs based on an aggregation level of 1, 2, 4, or 8. In this regard, for an aggregation level of 1, the BS may transmit the SIB scheduling information using a PDCCH candidate in one CCE. For an aggregation level of 2, the BS may transmit the SIB scheduling information using a PDCCH candidate in two consecutive CCEs. For an aggregation level of 4, the BS may transmit the SIB scheduling information using a PDCCH candidate in four consecutive CCEs. For an aggregation level of 8, the BS may transmit the SIB scheduling information using a PDCCH candidate in eight consecutive CCEs. In some aspects, as part of transmitting the SIB scheduling information, the BS transmits a reference signal (e.g., a DMRS) in the CORESET. The BS may puncture a portion of the reference signal in the second portion of the CORESET. The BS may also increase a transmit power for the reference signal from a reference transmit power based on the puncturing of the reference signal, for example, as discussed above with respect to action 1330 of the method 1300. For instance, the BS may use the reference transmit power if there is no puncturing applied to the reference signal. In some aspects, means for performing the operations of block 1704 can, but not necessarily, include, the processor 1402, the memory 1404, the SSB/CORESET module 1408, the transceiver 1410, the modem 1412, the RF unit 1414, and the one or more antennas 1416 with reference to FIG. 14.

At block 1706, the BS transmits a SIB based on the SIB scheduling information (e.g., in a PDSCH). In some aspects, means for performing the operations of block 1706 can, but not necessarily, include, the processor 1402, the memory 1404, the SSB/CORESET module 1408, the transceiver 1410, the modem 1412, the RF unit 1414, and the one or more antennas 1416 with reference to FIG. 14.

In some aspects, the BS further transmits an SSB (e.g., the SSBs 310) including an indication of a starting RB offset for the CORESET relative to the SSB, where the first portion and the second portion of the CORESET are based on the starting RB offset. For instance, the SSB may indicate a starting RB offset of 0 for the CORESET placement as shown in FIGS. 3, 4A-4C, 9, and 10A-10C. Alternatively, the SSB may indicate a starting RB offset of 2 for the CORESET placement as shown in FIGS. 5 and 6A-6C. Yet alternatively, the SSB may indicate a starting RB of 4 for the CORESET placement as shown in FIGS. 7, 8A-8C, 11 and 12A-12C. In some aspects, as part of transmitting the SSB, the BS may puncture a portion of the SSB based on the channel bandwidth, for example, when the SSB bandwidth is greater than the channel bandwidth. For instance, the SSB may have a frequency bandwidth of 3.6 MHz and the channel bandwidth may be 3 MHz as discussed above with respect to FIGS. 9 and 11.

Further aspects of the present disclosure include the following:

1. A method of wireless communication performed by a user equipment (UE), the method comprising:

performing physical downlink control channel (PDCCH) monitoring in a first portion of a control resource set (CORESET), wherein the first portion is within a channel bandwidth, and wherein the CORESET includes a second portion outside the channel bandwidth; and receiving a system information block (SIB) based on the PDCCH monitoring.

2. The method of aspect 1, wherein the CORESET includes a plurality of control channel elements (CCEs), and wherein the first portion of the CORESET includes a subset of the plurality of CCEs less than all CCEs of the plurality of CCEs.

3. The method of any of aspects 1-2, wherein the performing the PDCCH monitoring comprises:

decoding a PDCCH candidate from one or more CCEs of the subset of the plurality of CCEs based on an aggregation level of 1, 2, 4, or 8.

4. The method of any of aspects 1-3, wherein the performing the PDCCH monitoring is further based on puncturing one or more CCEs of the plurality of CCEs in the second portion of the CORESET.

5. The method of any of aspects 1-4, wherein the performing the PDCCH monitoring comprises:

performing the PDCCH monitoring from the subset of the plurality of CCEs in the first portion of the CORESET, wherein the first portion is at a lower frequency than the second portion of the CORESET.

6. The method of any of aspects 1-4, wherein the performing the PDCCH monitoring comprises:

performing the PDCCH monitoring from the subset of the plurality of CCEs in the first portion of the CORESET, wherein the first portion is at a higher than the second portion of the CORESET.

7. The method of any of aspects 1-4, wherein the performing the PDCCH monitoring comprises:
performing the PDCCH monitoring from the subset of the plurality of CCEs in the first portion of the CORESET, wherein the first portion is between a first sub-portion and a second sub-portion of the second portion of the CORESET in frequency.

8. The method of any of aspects 1-7, further comprising:
receiving a synchronization signal block (SSB) including an indication of a starting resource block (RB) offset associated with the CORESET relative to the SSB, wherein the first portion and the second portion of the CORESET are based the offset.

9. The method of any of aspects 1-8, further comprising:
receiving a synchronization signal block (SSB) including an indication of the CORESET, wherein the receiving the SSB comprises puncturing a portion of the SSB based on the channel bandwidth.

10. A method of wireless communication performed by a base station (BS), the method comprising:
determining, based on a channel bandwidth, a first portion of a control resource set (CORESET), wherein the first portion is within a channel bandwidth, and wherein the CORESET includes a second portion outside the channel bandwidth;
transmitting system information block (SIB) scheduling information in the first portion of the CORESET; and
transmitting a SIB based on the SIB scheduling information.

11. The method of aspect 10, wherein the CORESET includes a plurality of control channel elements (CCEs), and wherein the first portion of the CORESET includes a subset of the plurality of CCEs less than all CCEs of the plurality of CCEs.

12. The method of any of aspects 10-11, wherein the transmitting the SIB scheduling information comprises:
transmitting the SIB scheduling information in one or more CCEs of the subset of the plurality of CCEs based on an aggregation level of 1, 2, 4, or 8.

13. The method of any of aspects 10-12, wherein the transmitting the SIB scheduling information is further based on puncturing one or more CCEs of the plurality of CCEs in the second portion of the CORESET.

14. The method of any of aspects 10-13, wherein the determining the first portion of the CORESET comprises:
selecting the subset of the plurality of CCEs from the first portion of the CORESET, wherein the first portion is at lower frequency than the second portion of the CORESET.

15. The method of any of aspects 10-13, wherein the determining the first portion of the CORESET comprises:
selecting the subset of the plurality of CCEs from the first portion of the CORESET, wherein the first portion is at a higher frequency than the second portion of the CORESET.

16. The method of any of aspects 10-13, wherein the determining the first portion of the CORESET comprises:
selecting the subset of the plurality of CCEs from the first portion of the CORESET, wherein the first portion is between a first sub-portion and a second sub-portion of the second portion of the CORESET in frequency.

17. The method of any of aspects 10-16, further comprising:
transmitting a synchronization signal block (SSB) including an indication a starting resource block (RB) offset associated with the CORESET relative to the SSB, wherein the first portion and the second portion of the CORESET are based the offset.

18. The method of any of aspects 10-17, further comprising:
transmitting a synchronization signal block (SSB) including an indication of the CORESET, wherein the transmitting the SSB comprises puncturing a portion of the SSB based on the channel bandwidth.

19. The method of any of aspects 10-18, wherein the transmitting the SIB scheduling information comprises:
transmitting a reference signal in the CORESET, wherein the transmitting the reference signal comprises:
puncturing a portion of the reference signal in the second portion of the CORESET; and
increasing a transmit power for the reference signal from a reference transmit power based on the puncturing.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
performing physical downlink control channel (PDCCH) monitoring in a first portion of a control resource set (CORESET) including a first set of control channel elements (CCEs), wherein the first portion is within a channel bandwidth, and wherein the CORESET includes a second portion including a second set of CCEs outside the channel bandwidth, wherein the PDCCH monitoring is based on puncturing one or more CCEs of the second set of CCEs based on the channel bandwidth;
receiving a synchronization signal block (SSB) including an indication of a starting RB offset associated with the CORESET, wherein the starting RB offset comprises a number of RBs relative to the SSB; and
receiving a system information block (SIB) based on the PDCCH monitoring.

2. The method of claim 1, wherein the performing the PDCCH monitoring comprises:
decoding a PDCCH candidate from one or more CCEs of the first set of CCEs based on an aggregation level of 1, 2, 4, or 8.

3. The method of claim 1, wherein the performing the PDCCH monitoring comprises:
performing the PDCCH monitoring from the first set of CCEs in the first portion of the CORESET, wherein the first portion is at a lower frequency than the second portion of the CORESET.

4. The method of claim 1, wherein the performing the PDCCH monitoring comprises:
performing the PDCCH monitoring from the first set of CCEs in the first portion of the CORESET, wherein the first portion is at a higher than the second portion of the CORESET.

5. The method of claim 1, wherein the performing the PDCCH monitoring comprises:
performing the PDCCH monitoring from the first set of CCEs in the first portion of the CORESET, wherein the first portion is between a first sub-portion and a second sub-portion of the second portion of the CORESET in frequency.

6. The method of claim 1, wherein the first portion and the second portion of the CORESET are based on the starting RB offset.

7. The method of claim 1, further comprising:
receiving the synchronization signal block (SSB) including an indication of the CORESET, wherein the receiving the SSB comprises puncturing a portion of the SSB based on the channel bandwidth.

8. A method of wireless communication performed by a base station (BS), the method comprising:
determining, based on a channel bandwidth, a first portion of a control resource set (CORESET), wherein the first portion is within a channel bandwidth, and wherein the CORESET includes a second portion outside the channel bandwidth;
transmitting system information block (SIB) scheduling information in the first portion of the CORESET including a reference signal, wherein the transmitting the reference signal comprises:
puncturing a portion of the reference signal in the second portion of the CORESET; and
increasing a transmit power for the reference signal from a reference transmit power based on the puncturing;
transmitting a synchronization signal block (SSB) including an indication of a starting RB offset associated with the CORESET, wherein the starting RB offset comprises a number of RBs relative to the SSB; and
transmitting a SIB based on the SIB scheduling information.

9. The method of claim 8, wherein the CORESET includes a plurality of control channel elements (CCEs), and wherein the first portion of the CORESET includes a subset of the plurality of CCEs less than all CCEs of the plurality of CCEs.

10. The method of claim 9, wherein the transmitting the SIB scheduling information comprises:
transmitting the SIB scheduling information in one or more CCEs of the subset of the plurality of CCEs based on an aggregation level of 1, 2, 4, or 8.

11. The method of claim 9, wherein the transmitting the SIB scheduling information is further based on puncturing one or more CCEs of the plurality of CCEs in the second portion of the CORESET.

12. The method of claim 9, wherein the determining the first portion of the CORESET comprises:
selecting the subset of the plurality of CCEs from the first portion of the CORESET, wherein the first portion is at lower frequency than the second portion of the CORESET.

13. The method of claim 9, wherein the determining the first portion of the CORESET comprises:
selecting the subset of the plurality of CCEs from the first portion of the CORESET, wherein the first portion is at a higher frequency than the second portion of the CORESET.

14. The method of claim 9, wherein the determining the first portion of the CORESET comprises:
selecting the subset of the plurality of CCEs from the first portion of the CORESET, wherein the first portion is between a first sub-portion and a second sub-portion of the second portion of the CORESET in frequency.

15. The method of claim 8, wherein the first portion and the second portion of the CORESET are based on the starting RB offset.

16. The method of claim 8, further comprising:
transmitting the synchronization signal block (SSB) including an indication of the CORESET, wherein the transmitting the SSB comprises puncturing a portion of the SSB based on the channel bandwidth.

17. A user equipment (UE) comprising:
a processor configured to:
perform physical downlink control channel (PDCCH) monitoring in a first portion of a control resource set (CORESET) including a first set of control channel elements (CCEs), wherein the first portion is within a channel bandwidth, and wherein the CORESET includes a second portion including a second set of CCEs outside the channel bandwidth, wherein the PDCCH monitoring is based on puncturing one or more CCEs of the second set of CCEs based on the channel bandwidth; and
a transceiver coupled to the processor, wherein the transceiver is configured to:
receive a synchronization signal block (SSB) including an indication of a starting RB offset associated with the CORESET, wherein the starting RB offset comprises a number of RBs relative to the SSB; and
receive a system information block (SIB) based on the PDCCH monitoring.

18. The UE of claim 17, wherein:
the processor configured to perform the PDCCH monitoring is configured to:
perform the PDCCH monitoring from the first set of CCEs in the first portion of the CORESET, wherein the first portion is at a lower frequency than the second portion of the CORESET.

19. The UE of claim 17, wherein the first portion and the second portion of the CORESET are based on the starting RB offset.

20. The UE of claim 17, wherein the transceiver is further configured to:
receive the synchronization signal block (SSB) including an indication of the CORESET, wherein the transceiver configured to receive the SSB is configured to puncture a portion of the SSB based on the channel bandwidth.

21. The UE of claim 17, wherein the transceiver is further configured to:
decode a PDCCH candidate from one or more CCEs of the first set of CCEs based on an aggregation level of 1, 2, 4, or 8.

22. The UE of claim 17, wherein the transceiver is further configured to:
perform the PDCCH monitoring from the first set of CCEs in the first portion of the CORESET, wherein the first portion is at a higher than the second portion of the CORESET.

23. The UE of claim 17, wherein the transceiver is further configured to:
perform the PDCCH monitoring from the first set of CCEs in the first portion of the CORESET, wherein the first portion is between a first sub-portion and a second sub-portion of the second portion of the CORESET in frequency.

24. A base station (BS) comprising:
a processor configured to:
determine, based on a channel bandwidth, a first portion of a control resource set (CORESET), wherein the first portion is within a channel bandwidth, and wherein the CORESET includes a second portion outside the channel bandwidth; and
a transceiver coupled to the processor, wherein the transceiver is configured to:
transmit system information block (SIB) scheduling information in the first portion of the CORESET including a reference signal, wherein the transceiver configured to transmit the reference signal is configured to:
puncture a portion of the reference signal in the second portion of the CORESET; and
increase a transmit power for the reference signal from a reference transmit power based on the puncturing;
transmit a synchronization signal block (SSB) including an indication of a starting RB offset associated with the CORESET, wherein the starting RB offset comprises a number of RBs relative to the SSB; and
transmit a SIB based on the SIB scheduling information.

25. The BS of claim 24, wherein the CORESET includes a plurality of control channel elements (CCEs), wherein the first portion of the CORESET includes a subset of the plurality of CCEs less than all CCEs of the plurality of CCEs.

26. The BS of claim 25, wherein:
the processor configured to determine the first portion of the CORESET is configured to:
select the subset of the plurality of CCEs from the first portion of the CORESET, wherein the first portion is at lower frequency than the second portion of the CORESET, and
the transceiver configured to transmit the SIB scheduling information is configured to
transmit the SIB scheduling information based on puncturing one or more CCEs of the plurality of CCEs in the second portion of the CORESET.

27. The BS of claim 24, wherein the first portion and the second portion of the CORESET are based on the starting RB offset.

28. The BS of claim 24, wherein the transceiver is further configured to:
transmit the synchronization signal block (SSB) including an indication of the CORESET, wherein the transceiver configured to transmit the SSB is configured to puncture a portion of the SSB based on the channel bandwidth.

29. The BS of claim 25, wherein the transceiver is further configured to:
transmit the SIB scheduling information in one or more CCEs of the subset of the plurality of CCEs based on an aggregation level of 1, 2, 4, or 8.

30. The BS of claim 25, wherein the transceiver is further configured to
select the subset of the plurality of CCEs from the first portion of the CORESET, wherein the first portion is at a higher frequency than the second portion of the CORESET.

* * * * *